(12) United States Patent
Nagai et al.

(10) Patent No.: US 7,443,121 B2
(45) Date of Patent: Oct. 28, 2008

(54) ACTUATOR CONTROL SYSTEM

(75) Inventors: Shigekazu Nagai, Adachi-ku (JP); Akio Saitoh, Kawaguchi (JP); Toru Sugiyama, Abiko (JP); Ryuichi Masui, Bando (JP); Takeshi Hirose, Moriya (JP); Masaki Miyahara, Moriya (JP)

(73) Assignee: SMC Kabushiki Kaisha, Tokyo (JP)

( * ) Notice: Subject to any disclaimer, the term of this patent is extended or adjusted under 35 U.S.C. 154(b) by 251 days.

(21) Appl. No.: 11/266,348

(22) Filed: Nov. 4, 2005

(65) Prior Publication Data

US 2006/0102697 A1 May 18, 2006

(30) Foreign Application Priority Data

Nov. 18, 2004 (JP) ............... 2004-335196
Sep. 30, 2005 (JP) ............... 2005-289199

(51) Int. Cl.
*H02K 17/32* (2006.01)
(52) U.S. Cl. ......................... 318/434; 310/80
(58) Field of Classification Search ................. 318/434
See application file for complete search history.

(56) References Cited

U.S. PATENT DOCUMENTS

| 3,823,577 A | * | 7/1974 | Smith ..................... 464/88 |
| 3,858,458 A | * | 1/1975 | Hunter ................... 74/606 R |
| 4,232,562 A | * | 11/1980 | Perkins .................. 74/89.43 |
| 4,910,419 A | * | 3/1990 | Hayashi et al. ............ 310/13 |
| 4,917,653 A | * | 4/1990 | Collucci .................. 464/85 |
| 4,925,431 A | * | 5/1990 | Pokrandt et al. ........... 464/54 |
| 4,938,101 A | * | 7/1990 | Maki et al. ............... 60/446 |
| 5,660,591 A |   | 8/1997 | Reynolds |
| 5,738,585 A | * | 4/1998 | Hoyt, III et al. ........... 464/88 |
| 5,908,355 A | * | 6/1999 | Hoyt, III et al. ........... 464/88 |
| 6,196,926 B1 | * | 3/2001 | Goebel et al. ............. 464/80 |
| 6,273,194 B1 | * | 8/2001 | Hiron et al. .............. 166/373 |
| 6,636,384 B2 |   | 10/2003 | Inoguchi et al. |
| 6,670,734 B2 | * | 12/2003 | Morishima et al. .......... 310/80 |
| 6,979,962 B2 | * | 12/2005 | Cavarec et al. ............. 318/9 |
| 7,118,507 B2 | * | 10/2006 | Tomita et al. ............. 475/263 |
| 2005/0206334 A1 | * | 9/2005 | Cavarec et al. ........... 318/139 |

FOREIGN PATENT DOCUMENTS

| DE | 19519948 A1 | 12/1996 |
| DE | 4322133 C3 | 1/1999 |
| DE | 10235078 A1 | 3/2004 |
| DE | 10301460 A1 | 8/2004 |
| JP | 11-30234 | 2/1999 |
| JP | 2002-66969 | 3/2002 |
| JP | 2002-354883 | 12/2002 |

* cited by examiner

*Primary Examiner*—Lincoln Donovan
*Assistant Examiner*—Michael Brandt
(74) *Attorney, Agent, or Firm*—Paul A. Guss

(57) ABSTRACT

An actuator control system comprises an electric actuator, a driver, and a controller. The electric actuator is provided with a buffering mechanism which absorbs impact applied to a piston rod. The buffering mechanism includes piston dampers which absorb impact applied to a piston, a first end damper which is provided at an end of a housing facing the piston, and a second end damper which is provided on a rod cover separated from the housing by a predetermined distance.

8 Claims, 64 Drawing Sheets

(COMPARATIVE EXAMPLE 1)

(COMPARATIVE EXAMPLE 2)

ACTUATOR CONTROL SYSTEM

BACKGROUND OF THE INVENTION

1. Field of the Invention

The present invention relates to an actuator control system comprising, for example, an electric actuator which allows a displacement member to make linear reciprocating motion under the rotary driving action of a rotary driving source, and a control unit which protects the rotary driving source for driving the electric actuator.

2. Description of the Related Art

A transport means such as an actuator has been hitherto used, for example, in order to transport a workpiece.

An electric actuator concerning the conventional technique is shown in FIGS. 63 and 64 (see, for example, Japanese Laid-Open Patent Publication No. 11-30234).

The electric actuator 1 concerning the conventional technique has a slider 4 which is displaceable along a recess 3 of a frame 2, and a screw shaft 6 which is driven by an unillustrated motor and which is screwed to a nut member 5 that is detachable with respect to the slider 4. Screw shaft support members 7a, 7b, which rotatably support the screw shaft 6, are provided at both ends of the screw shaft 6 respectively. The screw shaft support members 7a, 7b are attached to an upper surface 8 of the frame 2.

In general, when an installation type industrial robot is used, a base is fixed by bolts or the like. When any excessive pressing action or some kind of collision occurs at the forward end of the robot due to an error in the interlock or the like, the operation of the robot is stopped by detecting an overcurrent. That is, the robot and the workpiece are mainly prevented from being destroyed by detecting the overcurrent in the installation type industrial robot, and positional deviation of the robot itself is not taken into consideration.

In view of the above, Japanese Laid-Open Patent Publication No. 2002-66969 discloses a technical concept which is directed to prevent an automatic or unmanned transport vehicle from floating even when a forward end of a robot arm is subjected to excessive pressing action or collision with respect to any equipment.

That is, Japanese Laid-Open Patent Publication No. 2002-66969 discloses a control apparatus which executes the operation for limiting the current for a servo motor for driving the joint of the robot arm when the limit value of the joint torque applied to the joint of the robot arm satisfies a predetermined value when the forward end of the robot arm is moved in response to the control of the attitude and the position with respect to the forward end of the robot arm.

However, when the electric actuator, according to the conventional technique disclosed in Japanese Laid-Open Patent Publication No. 11-30234 as described above, is applied, for example, to the pressing operation for the workpiece, for example, at any intermediate position between one stroke end and the other stroke end in accordance with the back and forth movement performed similarly to a piston rod of a fluid pressure cylinder without using any complicated control apparatus or the like, the durability of the electric actuator is deteriorated, because the shock or impact, which is caused upon abutment against the workpiece, is transmitted to the screw shaft or the like via the slider.

Further, when the technical concept disclosed in the Japanese Laid-Open Patent Publication No. 2002-66969 is applied, for example, to an electric actuator for converting the rotary motion of a motor into the rectilinear motion of a slider or the like, it is necessary to provide a detector such as an encoder and a resolver as well as a control circuit in order to control, for example, the position and the operation speed of the slider, in which the production cost becomes expensive.

SUMMARY OF THE INVENTION

A general object of the present invention is to provide an actuator control system which makes it possible to maintain the durability by appropriately absorbing the impact applied to a displacement member upon abutment against a workpiece, for example, when the actuator control system is applied to a pressing abutment operation for the workpiece.

A principal object of the present invention is to provide an actuator control system which makes it possible to limit the current applied to a rotary driving source by a simple circuit even when a high load is applied to the rotary driving source for driving an electric actuator.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
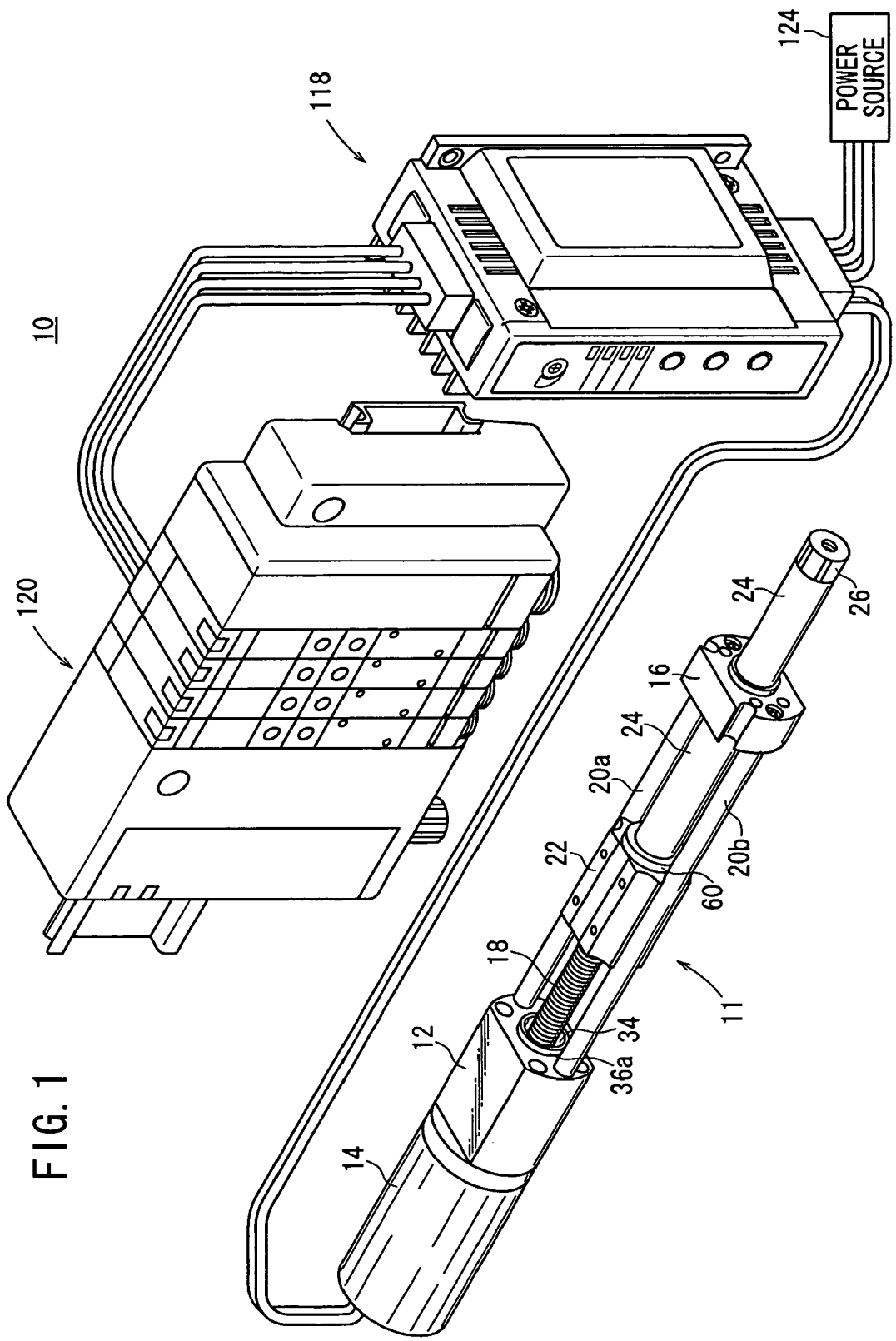
FIG. 1 is a perspective view illustrating an actuator control system according to an embodiment of the present invention.

With reference to FIG. 1, reference numeral 10 indicates an actuator control system according to an embodiment of the present invention.

The actuator control system 10 comprises an electric actuator 11 in which a piston 22 and a piston rod 24 make linear reciprocating motion under the driving action of a rotary driving source 14, a driver 118 which energizes/deenergizes the rotary driving source 14 equipped for the electric actuator 11, a controller 120 which derives the direction instruction signal to the driver 118, and a power source 124 which is connected to the driver 118 via a connector.

Figure 2:
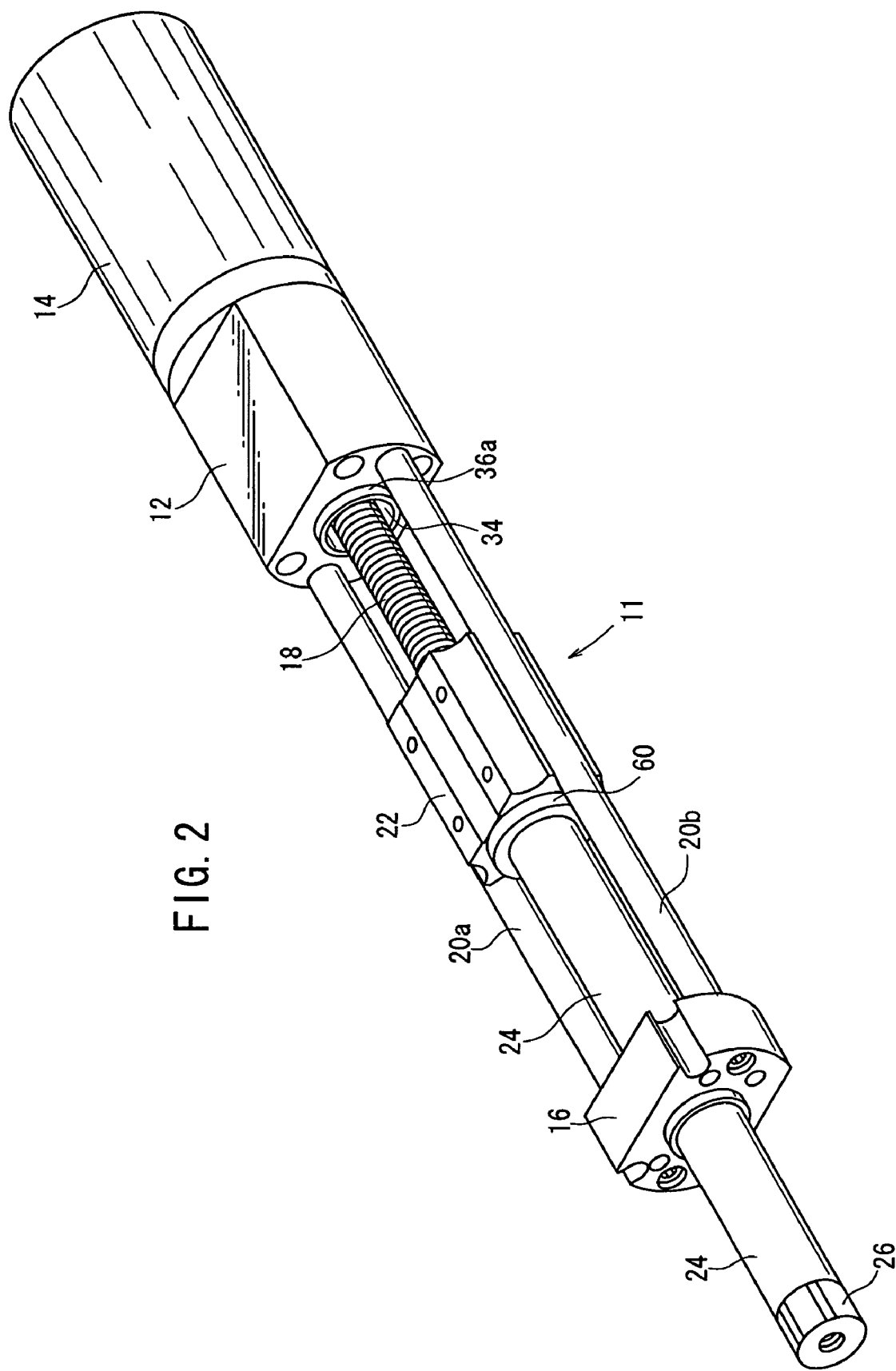
FIG. 2 is a perspective view illustrating an electric actuator for the system.

As shown in FIG. 2, the electric actuator 11 includes a housing 12 which is composed of a substantially flat block member, a rotary driving source 14 which is connected to one end of the housing 12, a rod cover (end block) 16 which is arranged at a predetermined distance from the housing 12 on the side opposite to the side on which the rotary driving source 14 is connected, and a feed screw shaft (driving force-transmitting shaft) 18 which transmits the rotary driving force of the rotary driving source 14 by a coupling member as described later on.

The rotary driving source 14 is preferably constructed by a servo motor including, for example, a brush-equipped DC motor, a brushless DC motor, or a stepping motor. A linear motor such as a solenoid may also be used as the rotary driving source 14.

The electric actuator 11 further includes a pair of guide rods 20a, 20b which are arranged in parallel with the feed screw shaft 18 interposed therebetween, and which have first ends connected to the housing 12 by first screw members 19a, 19b (see FIG. 3), and second ends connected to the rod cover 16 by second screw members 21a, 21b (see FIG. 3), a piston 22 which is displaceable along the pair of guide rods 20a, 20b under the driving force transmitted by the feed screw shaft 18, a hollow cylindrical piston rod 24 which penetrates through the rod cover 16 and which moves back and forth integrally with the piston 22, and a socket 26 which is installed to the forward end of the piston rod 24 to close the hole.

It is preferable that an electroless nickel plating treatment is applied as a surface treatment for the feed screw shaft 18. The feed screw shaft 18 may be commonly used as the drive shaft for the rotary driving source 14 without using the coupling member 28.

Figure 3:
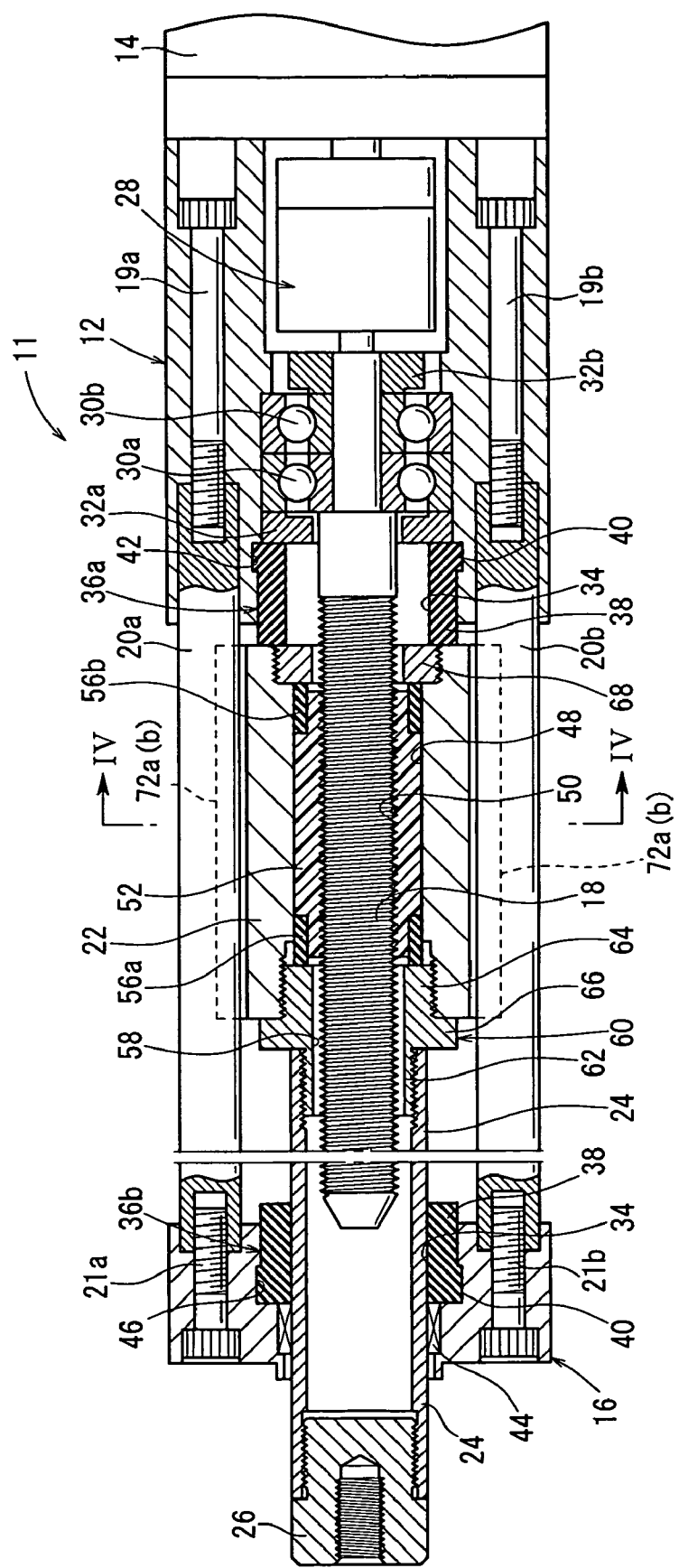
FIG. 3 is a partial magnified longitudinal sectional view taken along the axial direction of the electric actuator shown in FIG. 2.

As shown in FIG. 3, a first bearing 30a and a second bearing 30b are provided and juxtaposed respectively at the ends of the feed screw shaft 18 disposed closely to the coupling member 28 in the housing 12. The first bearing 30a and the second bearing 30b are retained by a first bearing holder 32a and a second bearing holder 32b respectively.

Figure 6:
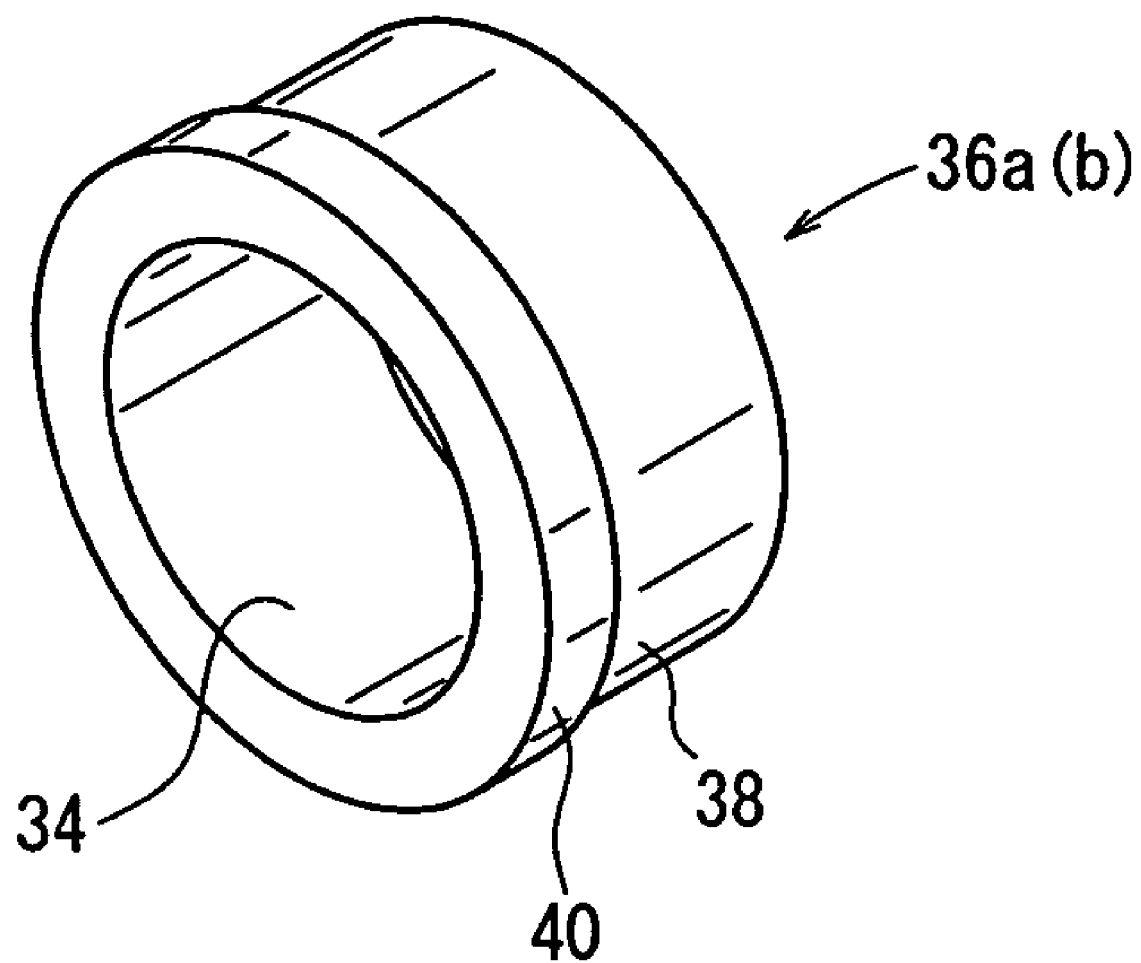
FIG. 6 is a perspective view illustrating an end damper for the electric actuator.

A first end damper 36a, which has a through-hole 34 for allowing the feed screw shaft 18 to penetrate therethrough, is retained at the end of the housing 12 which faces the piston 22. As shown in FIG. 6, the first end damper 36a integrally comprises a cylindrical section 38 which has a predetermined wall thickness, and a flange section 40 which is diametrally expanded slightly in the radially outward direction as compared with the outer diameter of the cylindrical section 38.

In this arrangement, the flange section 40 of the first end damper 36a is fastened by an annular recess 42 formed on the inner wall of the housing 12. Accordingly, the first end damper 36a is retained in a state in which a part (end) of the cylindrical section 38 protrudes toward the piston 22 by a predetermined length from the end surface of the housing 12 (see FIG. 3).

A second end damper 36b and a bush 44 are provided on the inner wall of the rod cover 16 through which the piston rod 24 penetrates. The second end damper 36b has approximately the same shape as that of the first end damper 36a. The flange section 40 is fastened by an annular recess 46 formed on the inner wall of the rod cover 16. Accordingly, the second end damper 36b is retained in a state in which a part (end) of the cylindrical section 38 protrudes toward the piston 22 by a predetermined length from the end surface of the rod cover 16 (see FIG. 3).

Figure 13:
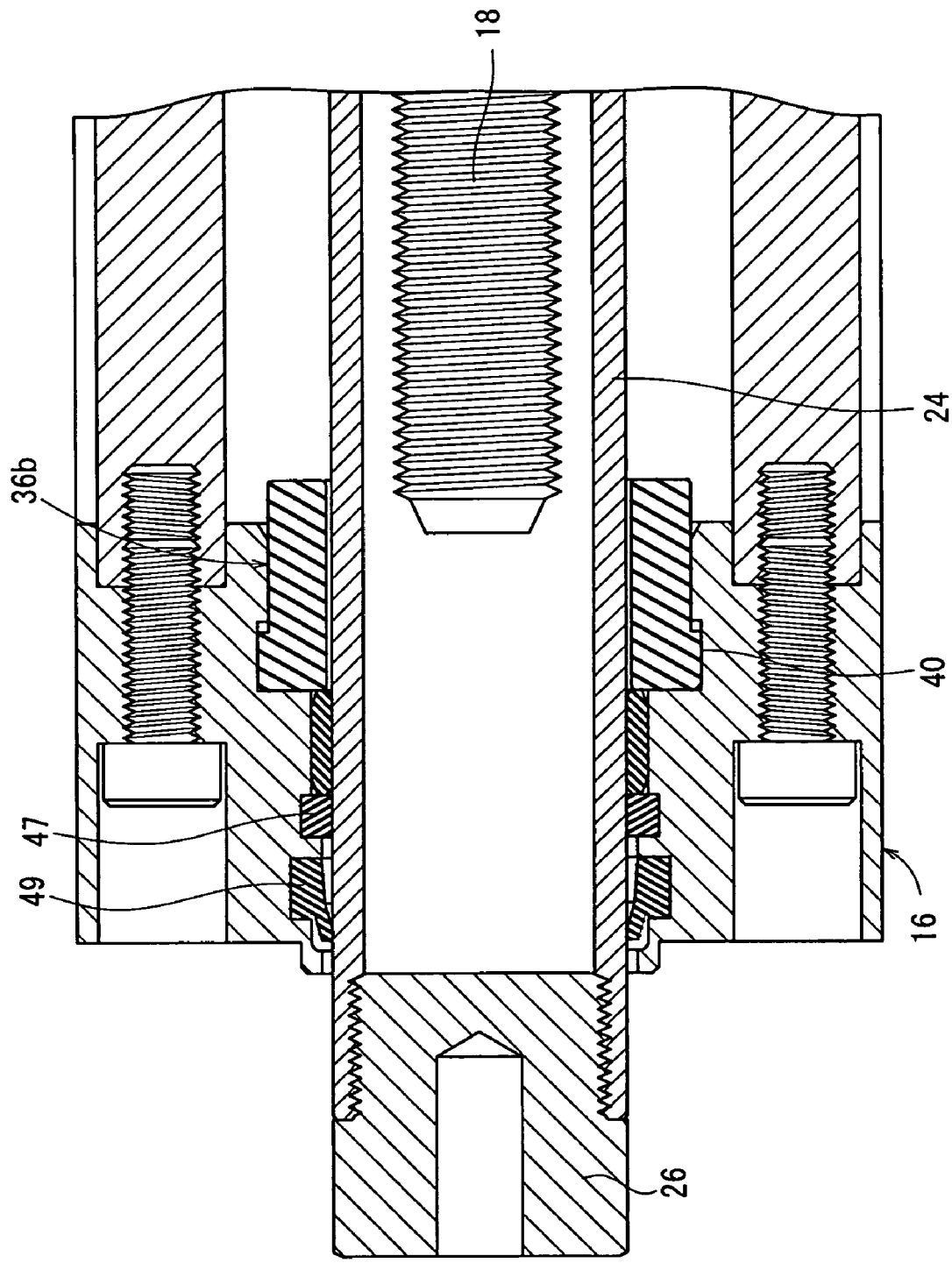
FIG. 13 is a partial magnified longitudinal sectional view illustrating a state in which a scraper and a dust seal are provided at a sliding movement portion with respect to the piston rod.

It is preferable that each of the first end damper 36a and the second end damper 36b is an energy absorber, which is formed of an elastic member such as urethane rubber. As shown in FIG. 13, a dust seal 47 and a scraper 49 are provided at the sliding movement portion with respect to the piston rod 24 to avoid any foreign matter from entering.

Figure 4:
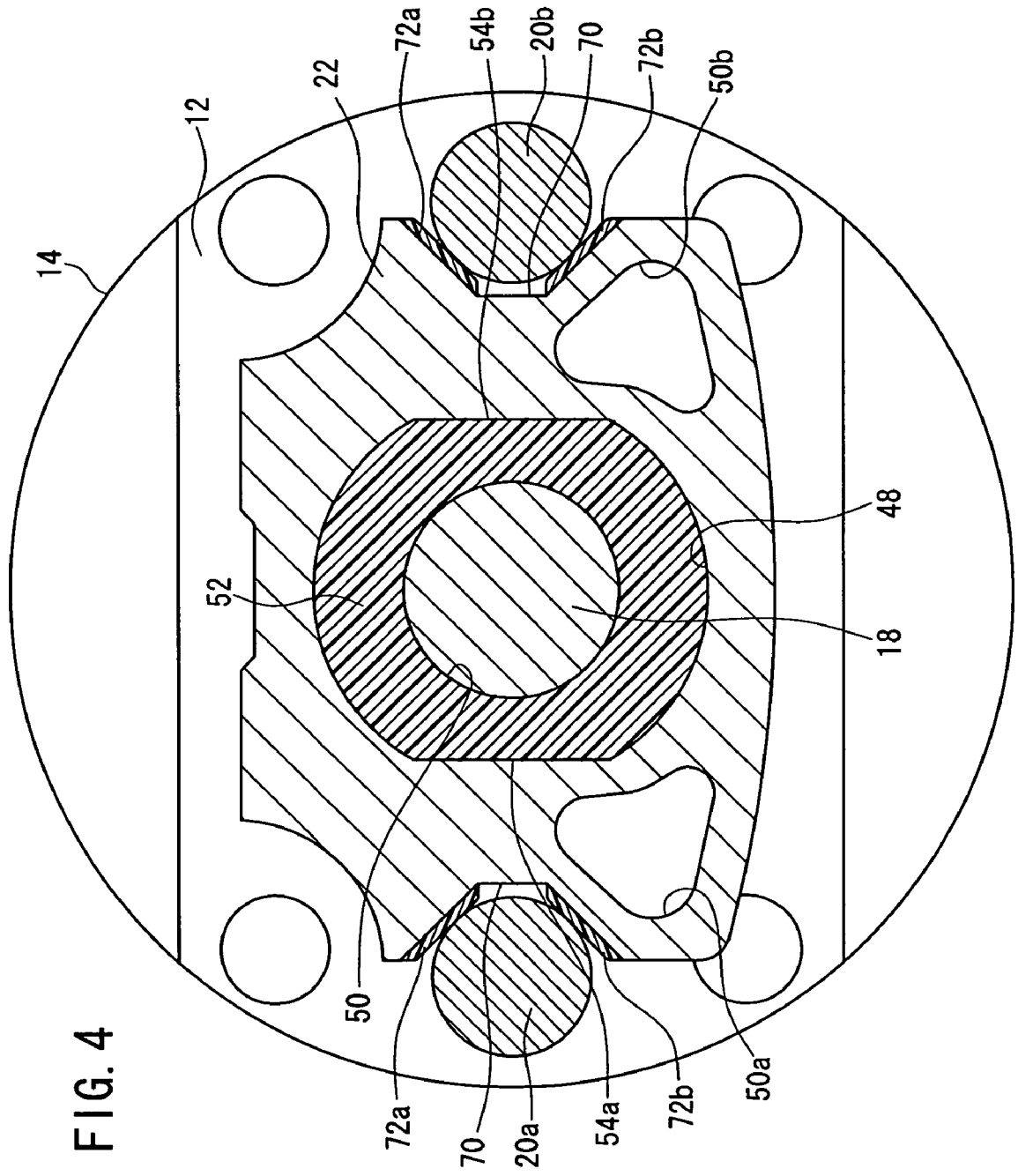
FIG. 4 is a magnified vertical sectional view taken along a line IV-IV shown in FIG. 3.

As shown in FIG. 4, the piston 22 includes a through-hole 48 which is formed to have a substantially elliptical vertical cross section at a central portion thereof to penetrating in the axial direction, and a pair of lightening holes 50a, 50b which are formed on both sides of the through-hole 48 in order to realize a light weight. The piston 22 is integrally formed of, for example, a metal material such as aluminum. A substantially cylindrical sliding nut 52, which has a screw hole 50 into which the feed screw shaft 18 is screwed, is inserted into the through-hole 48 of the piston 22 so that the sliding nut 52 slides in the axial direction of the feed screw shaft 18.

In this arrangement, the sliding nut 52 and the piston 22 are provided relatively slidably in the axial direction of the feed screw shaft 18. Further, the piston 22 is prevented from rotating in the circumferential direction by a pair of flat surface sections 54a, 54b which are formed on the outer circumferential surface of the sliding nut 52. The function to stop the rotation may be effected by forming an unillustrated spline on the outer circumferential surface of the sliding nut 52 or by forming an unillustrated key groove, in place of the pair of flat surface sections 54a, 54b.

Figure 5:
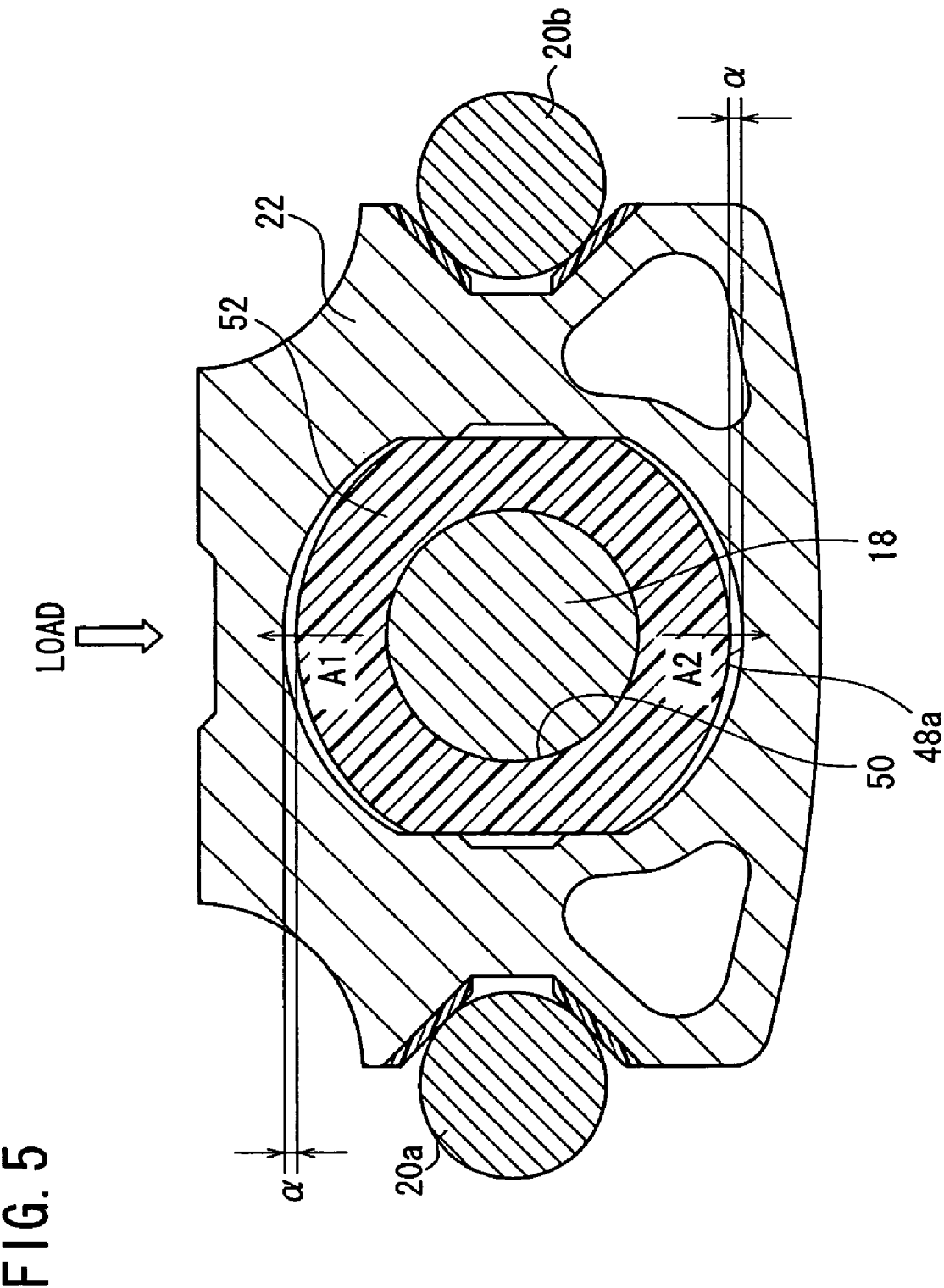
FIG. 5 is a magnified vertical sectional view illustrating major parts to depict another example, taken along a line IV-IV shown in FIG. 3.

As shown in FIG. 5, it is preferable that the shape of the through-hole 48a is designed so that a clearance α is provided between the surface of the sliding nut 52 formed to have a circular arc-shaped vertical cross section and the inner wall surface of the piston 22. When the load is applied to the upper surface of the piston 22, the sliding nut 52 is permitted to deviate by the clearance α in the direction of the arrow A1 or A2 shown in FIG. 5.

As a result, the load, which is applied to the piston 22, is not transmitted to the sliding nut 52, and the sliding nut 52 is prevented from being subjected to unbalanced load. It is possible to improve the durability of the sliding nut 52 and other elements such as the feed screw shaft 18 connected to the sliding nut 52.

Figure 7:
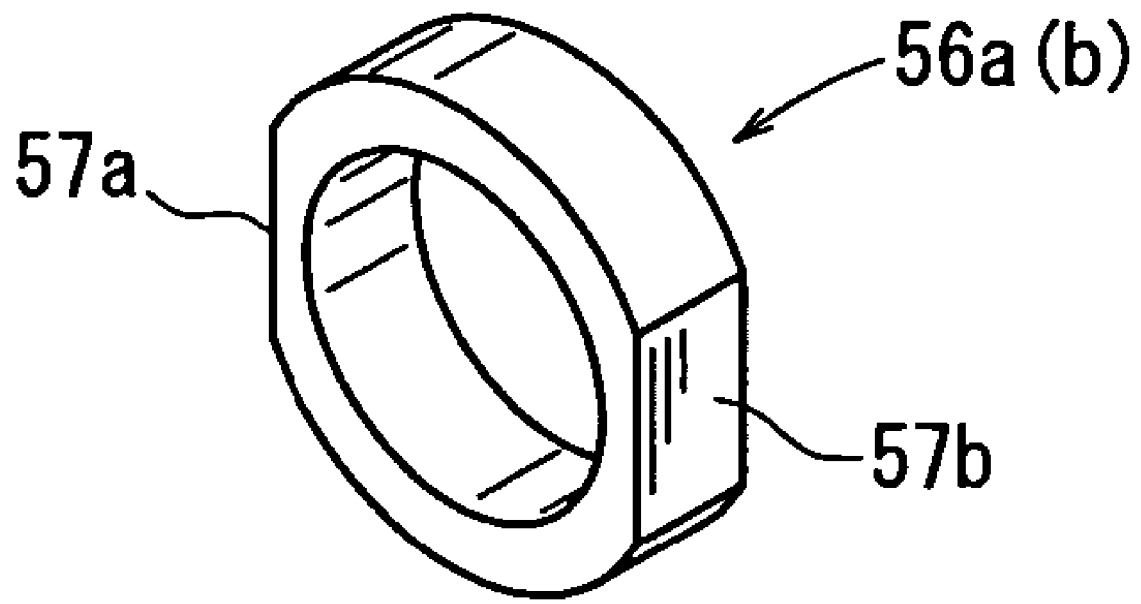
FIG. 7 is a perspective view illustrating a piston damper for the electric actuator.

A pair of annular piston dampers 56a, 56b as shown in FIG. 7 are installed to annular recesses at the both ends of the sliding nut 52. The pair of piston dampers 56a, 56b are provided to protrude by predetermined lengths in the axial direction from the end surfaces of the sliding nut 52 (see FIG. 3).

In this arrangement, each of the piston dampers 56a, 56b has a pair of flat surface sections 57a, 57b formed on the outer circumference thereof. The piston dampers 56a, 56b are formed to be flush with the vertical cross-sectional outer circumferential shape of the sliding nut 52 (see FIG. 4).

A connecting member 60, which has a through-hole 58 for inserting the feed screw shaft 18 thereinto, is provided at one end of the piston 22 in the axial direction. The connecting member 60 comprises a second annular section 64 which has a first screw section composed of a male thread screwed to a female thread of the piston 22, a first annular section 62 which has a first screw section composed of a male thread screwed to a female thread of the hollow piston rod 24, and an annular flange section 66 which is provided between the first annular section 62 and the second annular section 64. The first annular section 62, the second annular section 64, and the annular flange section 66 are formed in an integrated manner.

Figure 11:
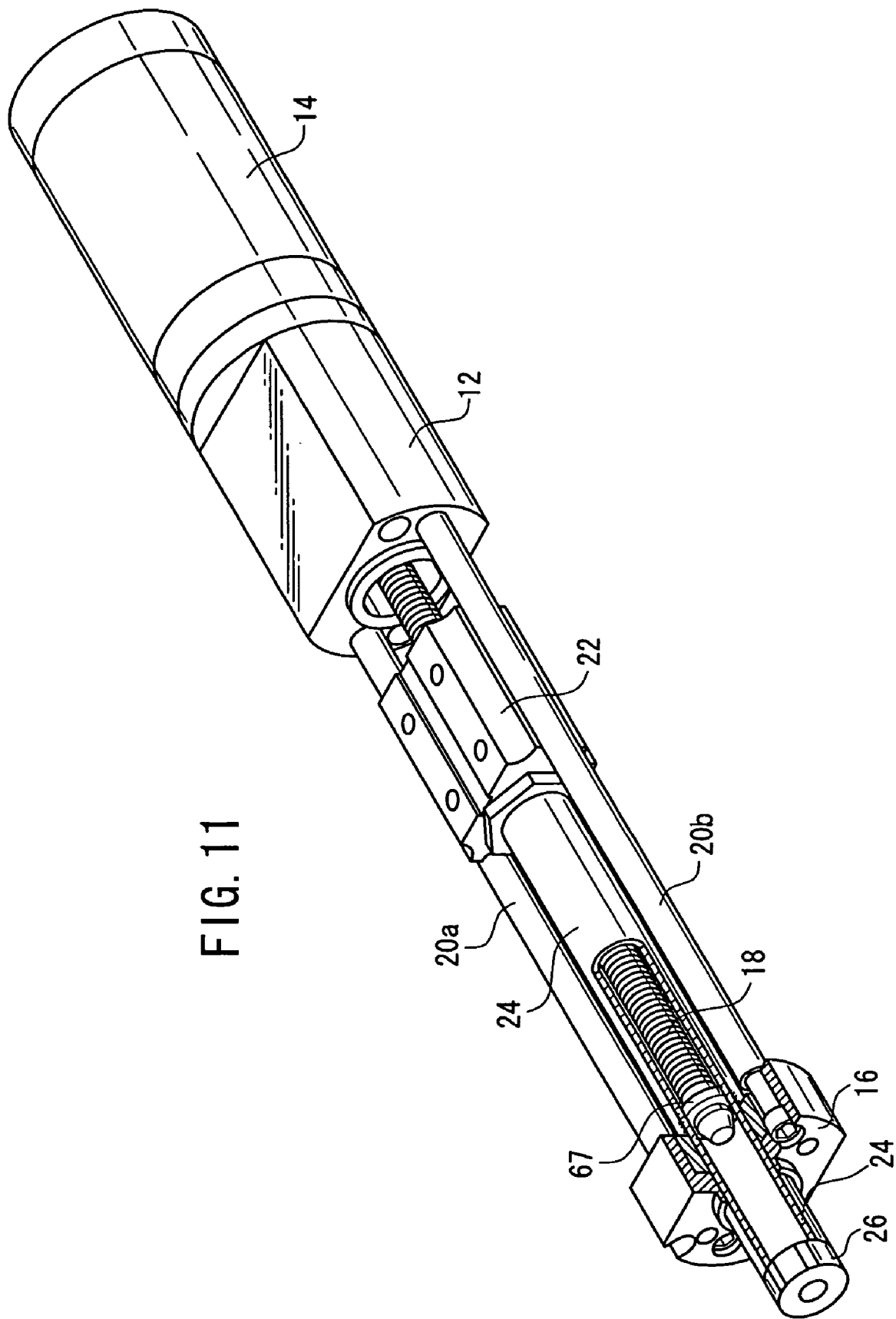
FIG. 11 is, with partial cutout, a perspective view illustrating a state in which a ring member for absorbing the vibration is installed to an end of a feed screw shaft.

As shown in FIG. 11, a ring member 67, which makes contact with the inner wall surface of the piston rod 24 to prevent vibration, may be installed to the end of the feed screw shaft 18 on the side (side of the rod cover 16) opposite to the side on which the feed screw shaft 18 is cantilevered by the sliding nut 52.

The ring member 67 is formed of, for example, a resin material or a rubber material. The ring member 67 slides integrally with the end of the feed screw shaft 18 along the inner wall surface of the piston rod 24. The ring member 67 prevents vibration (deflection) generated by the rotation of the end of the feed screw shaft 18 when the displacement amount of the piston 22 is set to provide the long stroke.

An annular member 68, which has a male thread section formed on the outer circumferential surface screwed to the female thread section of the piston 22, is connected to the other end of the piston 22 in the axial direction. The annular member 68 is provided to be flush with the end surface of the piston 22.

In this arrangement, the piston damper 56a, which protrudes by the predetermined length from the end surface of the sliding nut 52 in the axial direction, is provided to make contact with the second annular section 64 of the connecting member 60. The other piston damper 56b, which protrudes by the predetermined length from the end surface of the sliding nut 52 in the axial direction, is provided to make contact with the annular member 68 (see FIG. 3).

Therefore, the sliding nut 52 is retained (interposed) in the piston 22 by the connecting member 60 and the annular member 68 which are fixed at the both ends of the piston 22, except when the piston rod 24 abuts against the workpiece W and the impact is exerted on the piston rod 24. The sliding nut 52 is displaceable integrally with the piston 22 in the axial direction under the screw engagement action with respect to the feed screw shaft 18.

Figure 12:
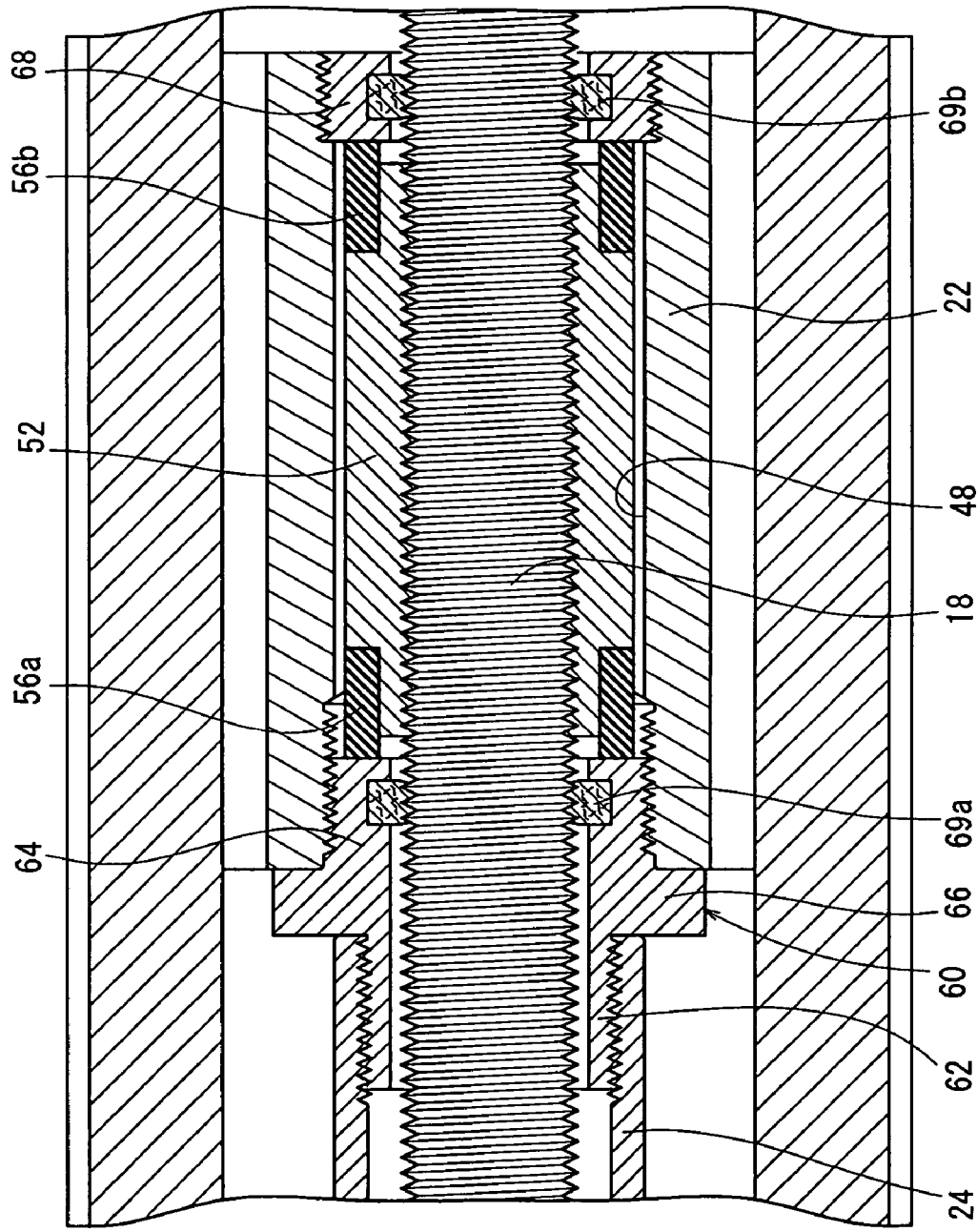
FIG. 12 is a partial magnified longitudinal sectional view illustrating a state in which lubricating oil-retaining members are installed to inner circumferential surfaces of a connecting member and an annular member.

As shown in FIG. 12, it is preferable that lubricating oil-retaining members 69a, 69b are installed to annular grooves on the inner circumferential surfaces of the connecting member 60 and the annular member 68 respectively. Each of the lubricating oil-retaining members 69a, 69b is composed of, for example, felt impregnated with the lubricating oil. Since the lubricating oil-retaining members 69a, 69b contact the screw portions of the feed screw shaft 18, the sliding portions of the feed screw shaft 18 and the sliding nut 52 are allowed to have lubricating property.

It is appropriate that the pair of piston dampers 56a, 56b are energy absorbers, which are formed of elastic members such as urethane rubber in the same manner as the first and second end dampers 36a, 36b.

Guide sections 70 (see FIG. 4), each of which has a substantially circular arc-shaped cross section, are formed on the both side surfaces of the piston 22, which are perpendicular to the axis. The piston 22 is interposed between a pair of guide rods 20a, 20b. A pair of plates 72a, 72b made of resin, which make line-to-line contact with the outer circumferential surfaces of the guide rods 20a, 20b and which extend in the axial direction of the guide rods 20a, 20b, are adhered to the guide sections 70. By allowing the plates 72a, 72b made of the resin material to interpose between the piston 22 and the guide rods 20a, 20b each of which is made of the metal material, the sliding resistance is reduced.

It is preferable that each of the plates 72a, 72b and the sliding nut 52 is formed of a resin material composed of, for example, any one of polyimide (PI), polybutylene terephthalate (PBT), and ultra-high molecular weight polyethylene (UHMWPE). In particular, when the plates 72a, 72b and the sliding nut 52 are formed of ultra-high molecular weight polyethylene (UHMWPE), it is possible to obtain satisfactory sliding movement characteristics.

The load is appropriately absorbed by the pair of guide rods 20a, 20b when the load is applied to the piston 22 in the radial direction and when the load is applied to the piston 22 in the rotational direction. When the load is applied in the rotational direction, the pair of guide rods 20a, 20b function to stop the rotation.

Figure 14:
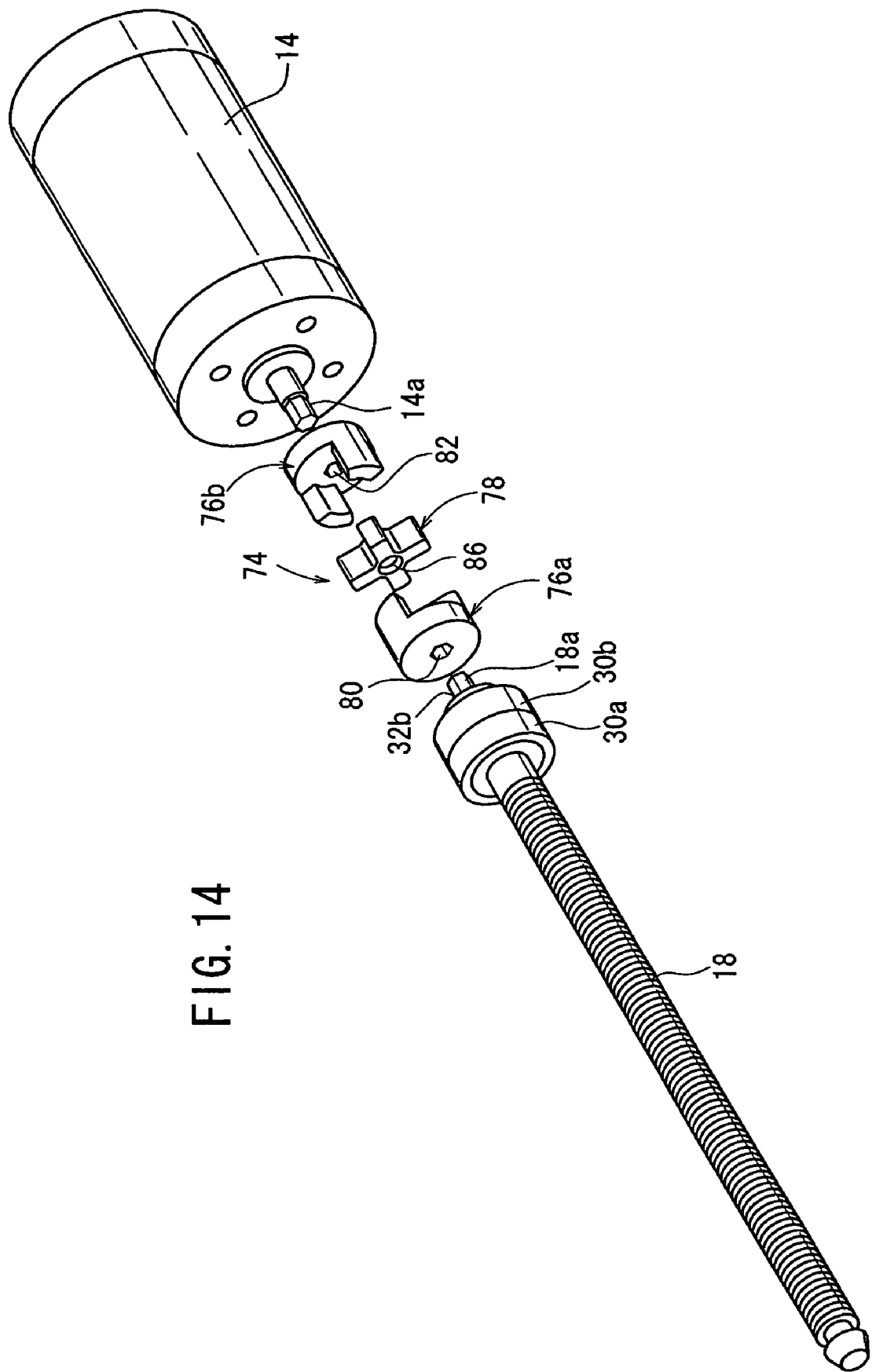
FIG. 14 is an exploded perspective view illustrating a flexible coupling mechanism provided between a feed screw shaft and a rotary driving source.

In the electric actuator 11 incorporated into the embodiment of the present invention, it is also preferable to provide a flexible coupling mechanism 74 as shown in FIG. 14 between the feed screw shaft 18 and the drive shaft 14a of the rotary driving source 14 in place of the coupling member 28 (see FIG. 3).

Figure 15:
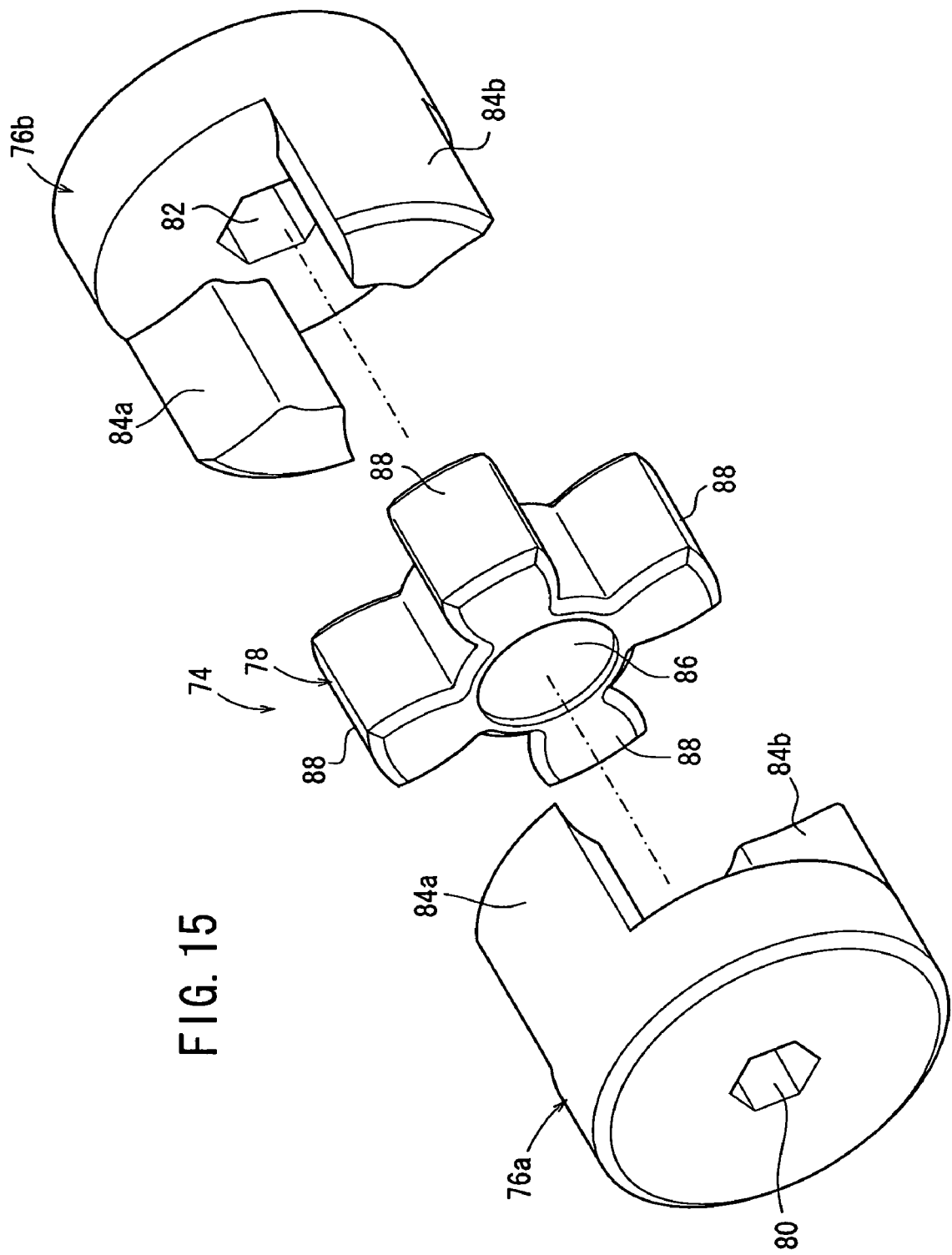
FIG. 15 is a magnified perspective view illustrating the flexible coupling mechanism.
Figure 16:
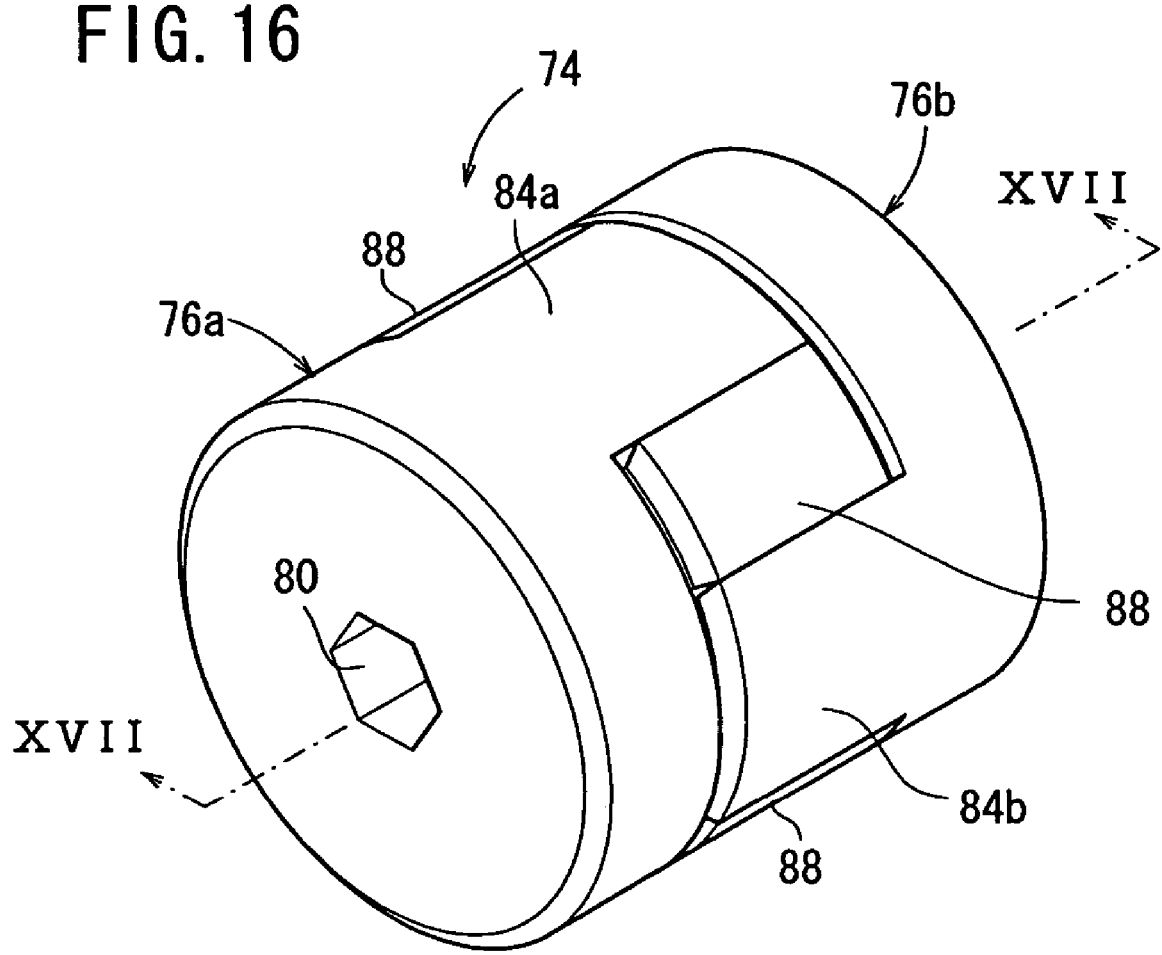
FIG. 16 is a perspective view illustrating a state in which constitutive elements of the flexible coupling mechanism shown in FIG. 15 are assembled in an integrated manner.

The flexible coupling mechanism 74 comprises, for example, a pair of hubs 76a, 76b which are formed to have an identical shape with a metal material such as aluminum alloy and which mutually have assembling phase angles deflected by 90 degrees in the circumferential direction, and an elastic member 78 which is formed of a rubber material having a cross-shaped vertical cross section and which is interposed between the pair of hubs 76a, 76b (see FIG. 15).

A hole 80 having a hexagonal vertical cross section, into which the end 18a of the feed screw shaft 18 having a hexagonal vertical cross section is inserted, is formed to penetrate through the hub 76a in the axial direction. A hole 82 having a hexagonal vertical cross section, into which the end of the drive shaft 14a of the rotary driving source 14 having a hexagonal vertical cross section is inserted, is formed to penetrate through the hub 76b in the axial direction. The vertical cross-sectional shape of each of the holes 80, 82 is not limited to the hexagonal shape. The vertical cross-sectional shape may have an angular shape. Alternatively, a spline groove may also be formed.

Figure 17:
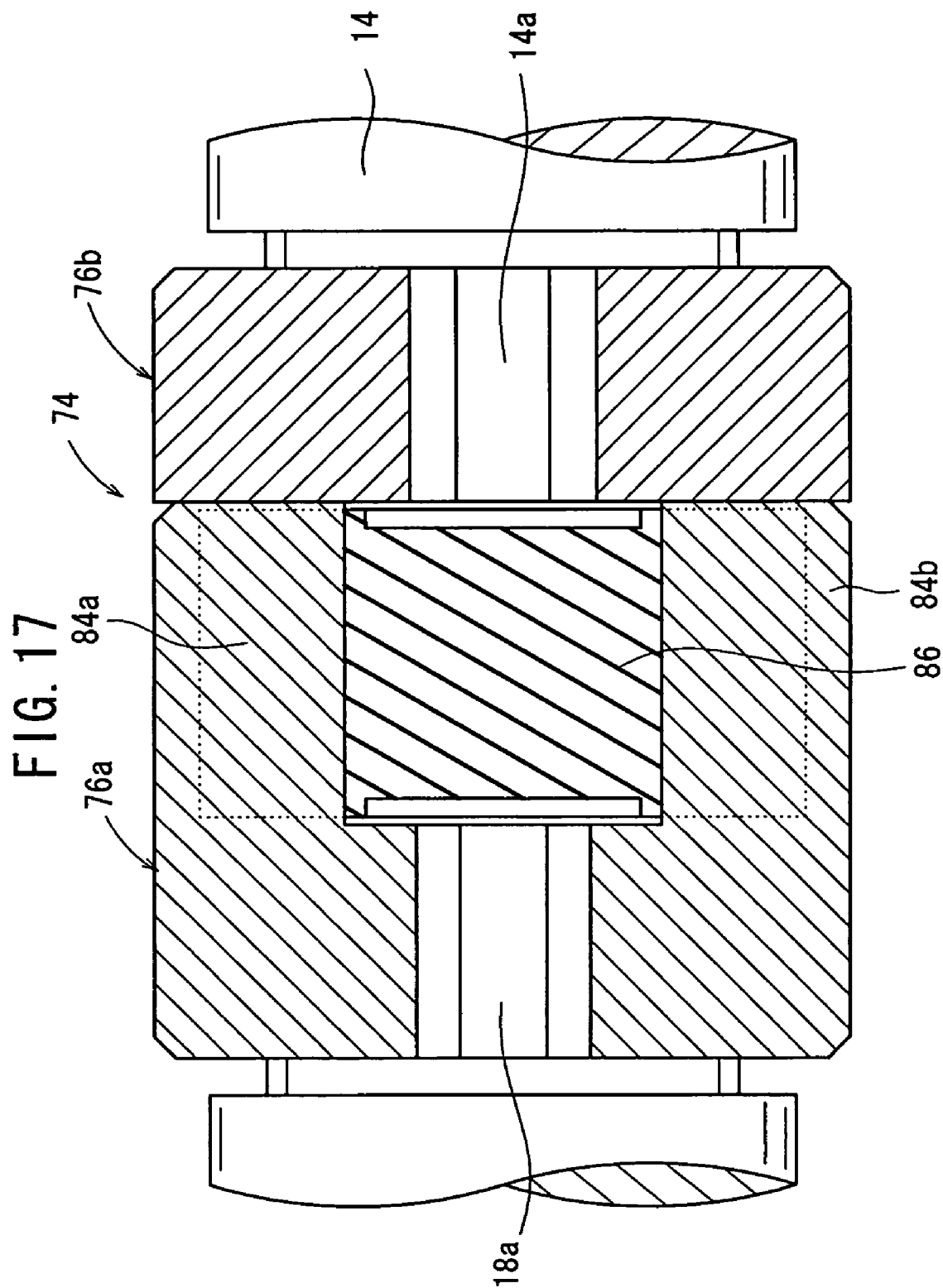
FIG. 17 is a longitudinal sectional view taken along a line XVII-XVII shown in FIG. 16.

A pair of projections 84a, 84b, which protrude substantially in parallel to the axis of the feed screw shaft 18 or the axis of the drive shaft 14a of the rotary driving source 14, are formed for the pair of hubs 76a, 76b respectively. The pair of projections 84a, 84b are designed so that they are separated from each other by an angle of 180 degrees in the circumferential direction. A solid section 86 is formed at the central portion of the elastic member 78 (see FIG. 17). Further, four projections 88, which are expanded radially outwardly, are formed on the elastic member 78 separated from each other by 90 degrees in the circumferential direction.

Figure 18:
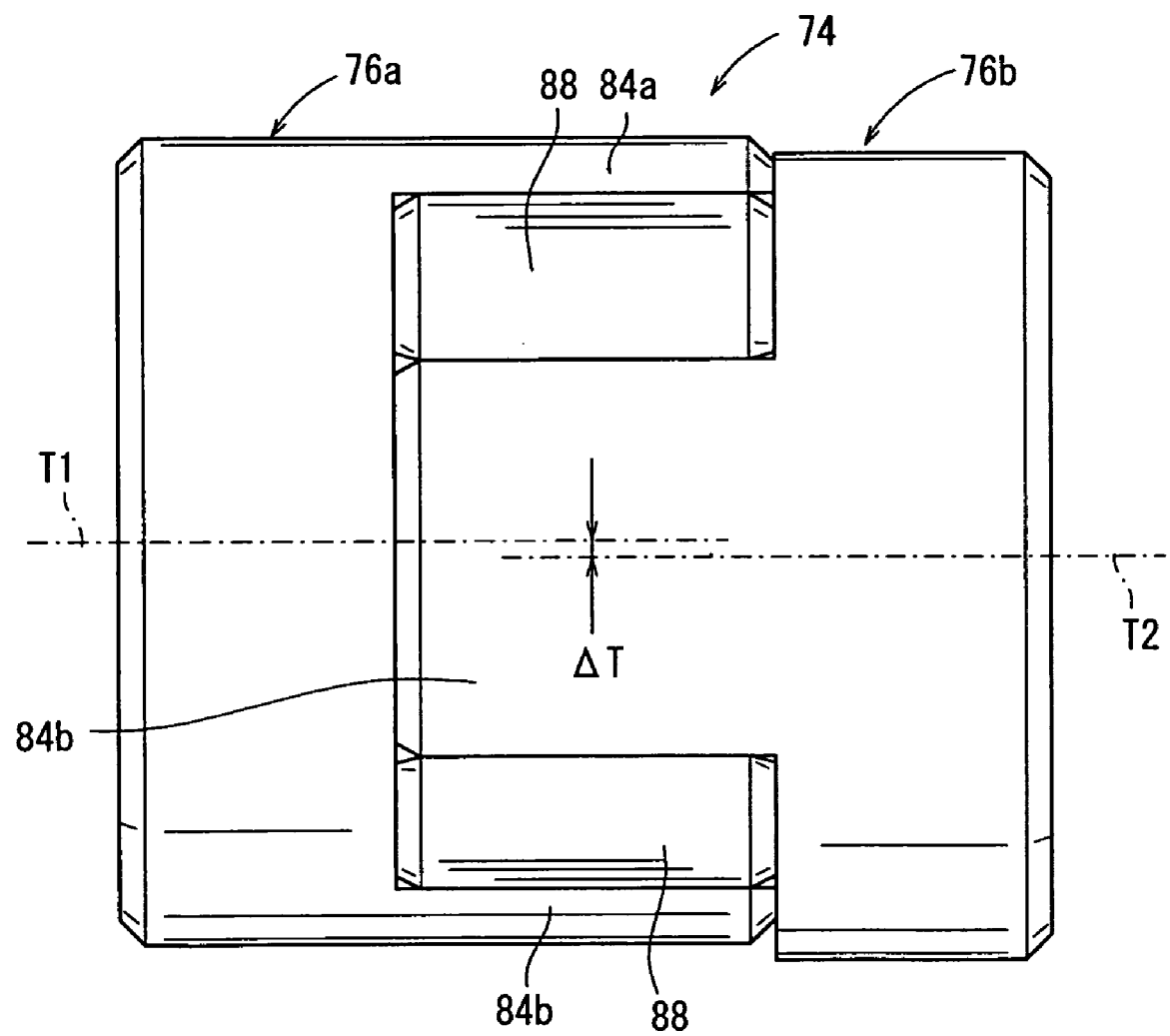
FIG. 18 is a front view illustrating a state in which the axis T1 of the feed screw shaft and the axis T2 of the drive shaft of the rotary driving source are separated from each other by ΔT in the parallel direction respectively.
Figure 19:
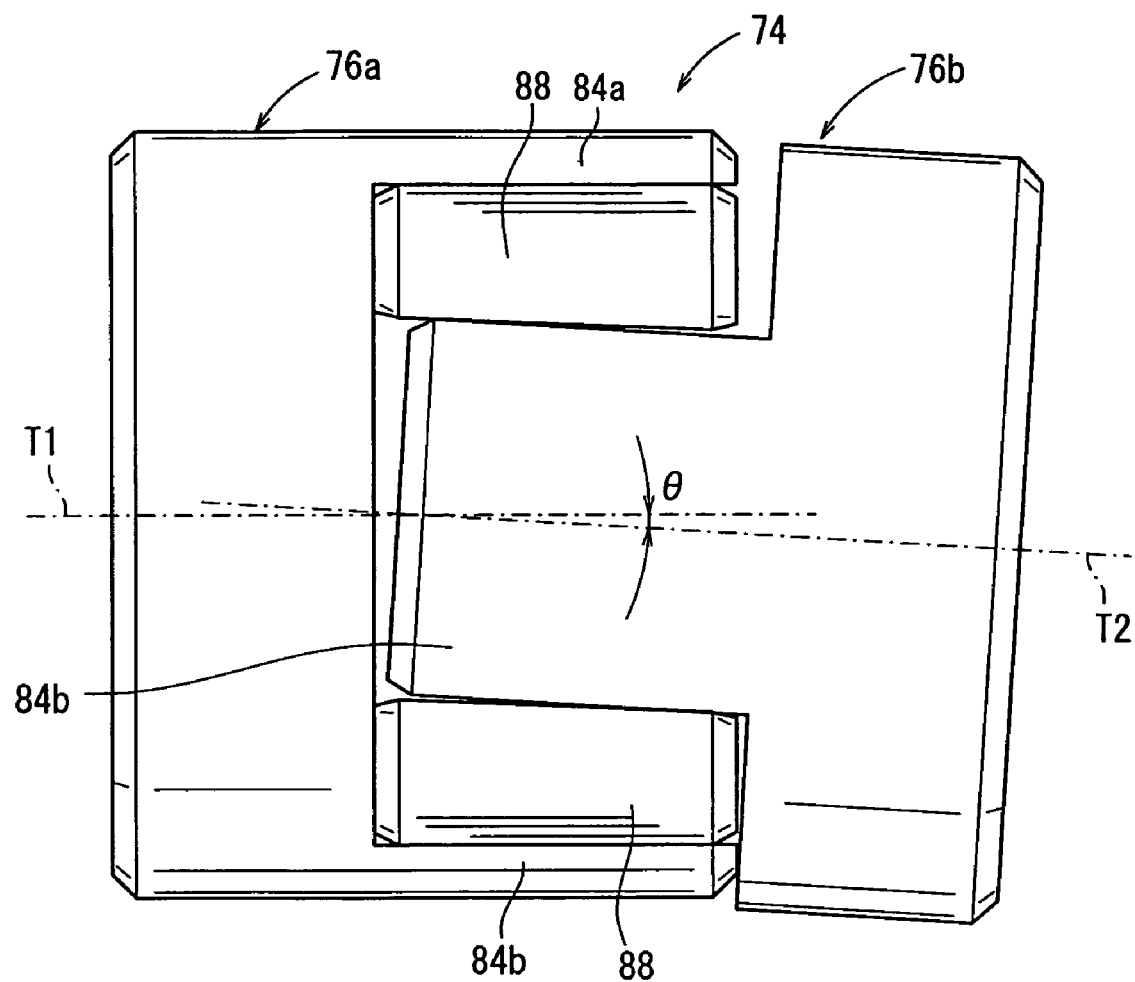
FIG. 19 is a front view illustrating a state in which the axis T1 of the feed screw shaft and the axis T2 of the drive shaft of the rotary driving source are intersected by an angle θ respectively.

The flexible coupling mechanism 74 has both the eccentric deviation-permitting function which permits the slight separation by $\Delta T$ substantially in the parallel direction between the axis T1 of the feed screw shaft 18 and the axis T2 of the drive shaft of the rotary driving source 14 (see FIG. 18) and the angular deviation-permitting function which permits the predetermined angle of intersection $\theta$ designated by the intersection between the axis T1 of the feed screw shaft 18 and the axis T2 of the drive shaft 14*a* of the rotary driving source 14 (see FIG. 19).

That is, when the axis T1 of the feed screw shaft 18 (hub 76*a*) and the axis T2 of the drive shaft 14*a* (hub 76*b*) of the rotary driving source 14 are slightly deviated from each other in the parallel direction respectively, or when the axis T1 of the feed screw shaft 18 (hub 76*a*) and the axis T2 of the drive shaft 14*a* (hub 76*b*) of the rotary driving source 14 are displaced to make the intersection, then the projections 88 of the elastic member 78, which are interposed between the projections 84*a*, 84*b* of the pair of hubs 76*a*, 76*b*, are elastically deformed. Accordingly, eccentric deviation and angular deviation are permitted between the two axes of the feed screw shaft 18 and the rotary driving source 14 respectively.

Conventionally, in the case of a coupling member for connecting the feed screw shaft and the drive shaft of the rotary driving source, a round shaft or a shaft cut to have a D-shaped cross section is connected by using a set screw. In this case, the connecting strength is insufficient. In the embodiment of the present invention, however, it is possible to increase the connecting strength by using the flexible coupling mechanism 74 as shown in FIG. 15. Further, it is unnecessary to use a set screw or the like. It is therefore possible to reduce the number of parts, to simplify the assembling operation and to reduce the production cost.

Figure 20:
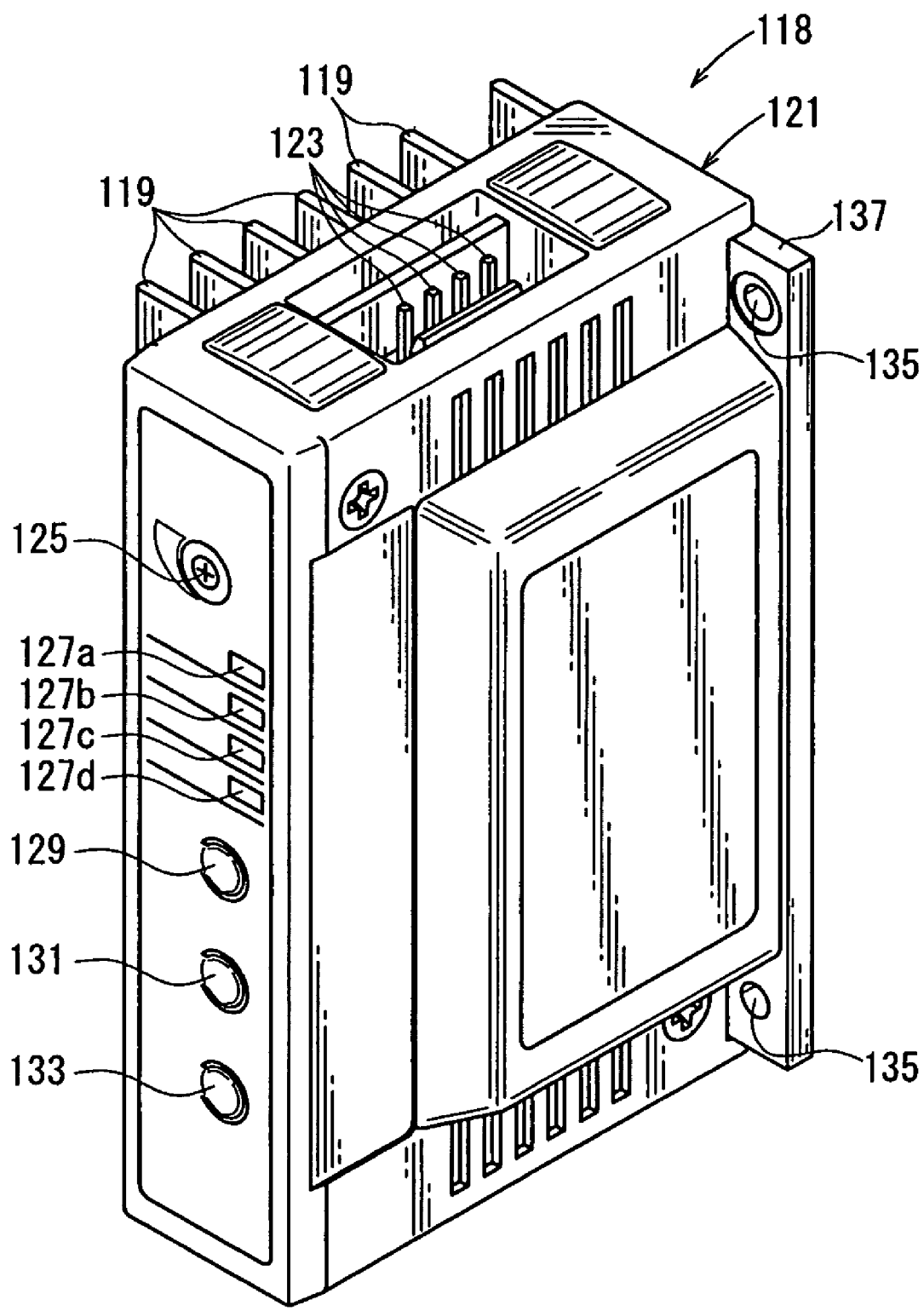
FIG. 20 is a perspective view illustrating a driver of the system.

As shown in FIG. 20, the driver 118 has a casing 121 provided with a plurality of fins 119 which are formed on and protrude from a wide width side surface. A plurality of control terminals 123, which are electrically connected to the controller 120 via a cable, are provided at an upper portion of the casing 121. Those provided at lower portions of the casing 121 are an unillustrated power source terminal which is connected to the power source 124 via a cable, and an unillustrated output terminal for the rotary driving source which is connected to the rotary driving source 14.

Those provided on a narrow width side surface of the driver 118 are a torque-setting trimmer 125 with which the rotational torque (thrust force) of the rotary driving source 14 can be arbitrarily set externally by regulating the angle of rotation in a predetermined direction by using, for example, a plus screwdriver, a plurality of display lamps 127*a* to 127*d* which are recognizable in accordance with light emission of unillustrated LEDs, and a plurality of manual switches which make it possible to perform, for example, test operation in accordance with manual operation.

The manual switches include a PHASE direction-switching switch 129 which indicates two directions of the A-PHASE direction (direction of the elongation of the piston rod 24) and the B-PHASE direction (direction of the shrinkage of the piston-rod 24) in accordance with the ON/OFF operation, an ON/OFF switch 131 which energizes/deenergizes the driver 118, and a SET switch 133 in which the initial setting is established when the switch is turned OFF and the thrust force can be selected externally by using the torque-setting trimmer 125 when the switch is turned ON.

With the PHASE direction-switching switch, the forward or backward movement of the piston rod 24 is reversed in some cases between the A-PHASE direction and the B-PHASE direction in relation to the unillustrated gear.

The control signal, which is introduced into the driver 118 from the controller 120, is composed of a binary signal of ON/OFF.

The rotational speed of the rotary driving source 14 can be controlled such that the application voltage, which is applied from the power source 124 to the driver 118, is arbitrarily changed by using, for example, an unillustrated resistor or a transformer, or the rotary driving source 14 is incorporated into an unillustrated bridge circuit to provide an electronic governor (not shown) for effecting the feedback for unbalanced voltage of the bridge circuit.

A flange 137, through which attachment holes 135 are formed, is formed on a side surface opposite to the narrow width side surface on which the manual switches and other components are provided as described above.

Figure 21:
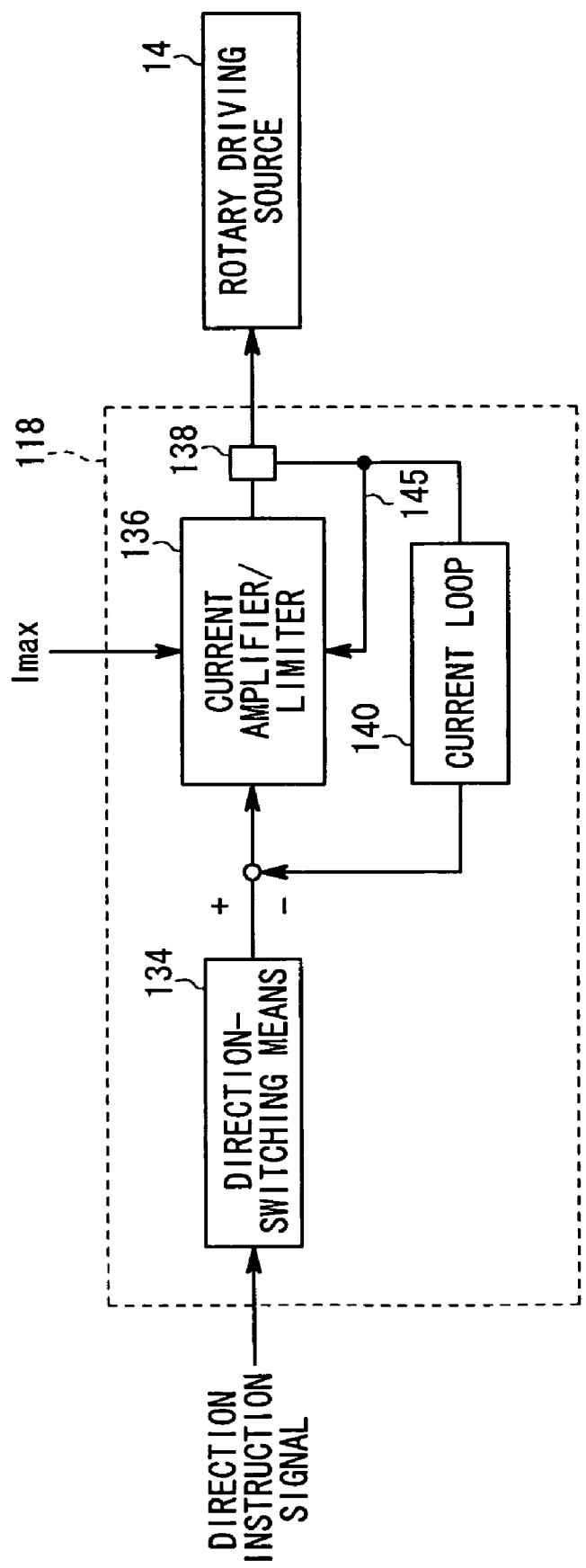
FIG. 21 is a schematic block diagram illustrating an arrangement of the driver shown in FIG. 20.

FIG. 21 is a schematic block diagram illustrating an arrangement of the driver 118.

The driver 118 includes a direction-switching means 134 which switches the direction of rotation of the rotary driving source 14 into any one of the forward and backward directions by switching the polarity of the voltage in accordance with the direction instruction signal derived from the controller 120, and a current amplifier/limiter 136 which converts the voltage outputted from the direction-switching means 134 into the corresponding current and which limits the current with reference to the preset reference current $I_{MAX}$ (threshold value).

The driver 118 further includes a current sensor (current-detecting means) 138 which is provided on the downstream side of the current amplifier/limiter 136 and which detects the current to be supplied to the rotary driving source 14, and a current loop 140 which performs the feedback of the detection signal from the current sensor 138 to the upstream side of the current amplifier/limiter 136.

The current amplifier/limiter 136 is provided with a comparing means which compares the preset reference current $I_{MAX}$ stored in a storage means with the detection signal of the current value detected from the current sensor 138 via a detection line 145, and a current limit means (current-limiting means) which limits the current to be supplied to the rotary driving source 14 so that the current does not exceed the reference current $I_{MAX}$, for example, when a high load is applied to the rotary driving source 14 and the current, which is to be supplied to the rotary driving source 14, is expected to exceed the reference current $I_{MAX}$.

The driver 118 has an unillustrated circuit board. For example, the current sensor 138 is preferably composed of a small resistor arranged on the circuit board.

The actuator control system 10 according to the embodiment of the present invention is basically constructed as described above. Next, its operation, function, and effect will be explained.

At first, the direction instruction signal (binary signal) is introduced into the driver 118 from the controller 120. The driver 118 switches the polarity of the voltage based on the direction instruction signal. Accordingly, the direction of rotation of the rotary driving source 14 is switched into any one of the forward and backward directions. The voltage, which corresponds to the current supplied from the direction-switching means 134 to the rotary driving source 14, is inputted into the current amplifier/limiter 136.

The current amplifier/limiter 136 converts the voltage outputted from the direction-switching means 134 into the corresponding current which is supplied to the rotary driving source 14. Accordingly, the rotary driving source 14 is driven and rotated in the predetermined direction, and the rotary driving force of the rotary driving source 14 is transmitted to the feed screw shaft 18 by the coupling member 28.

The feed screw shaft 18, which is rotated in the predetermined direction, is screwed to the screw hole 50 of the sliding nut 52 which functions as the feed nut. Accordingly, the sliding nut 52 and the piston 22 are displaced in the axial direction integrally with the piston rod 24 guided by the pair of guide rods 20*a*, 20*b*. Therefore, the piston rod 24 is displaced toward the outside integrally with the piston 22, and it arrives at the stroke end. Accordingly, the piston rod 24 presses the unillustrated workpiece at the predetermined position (workpiece-holding action).

Figure 8:
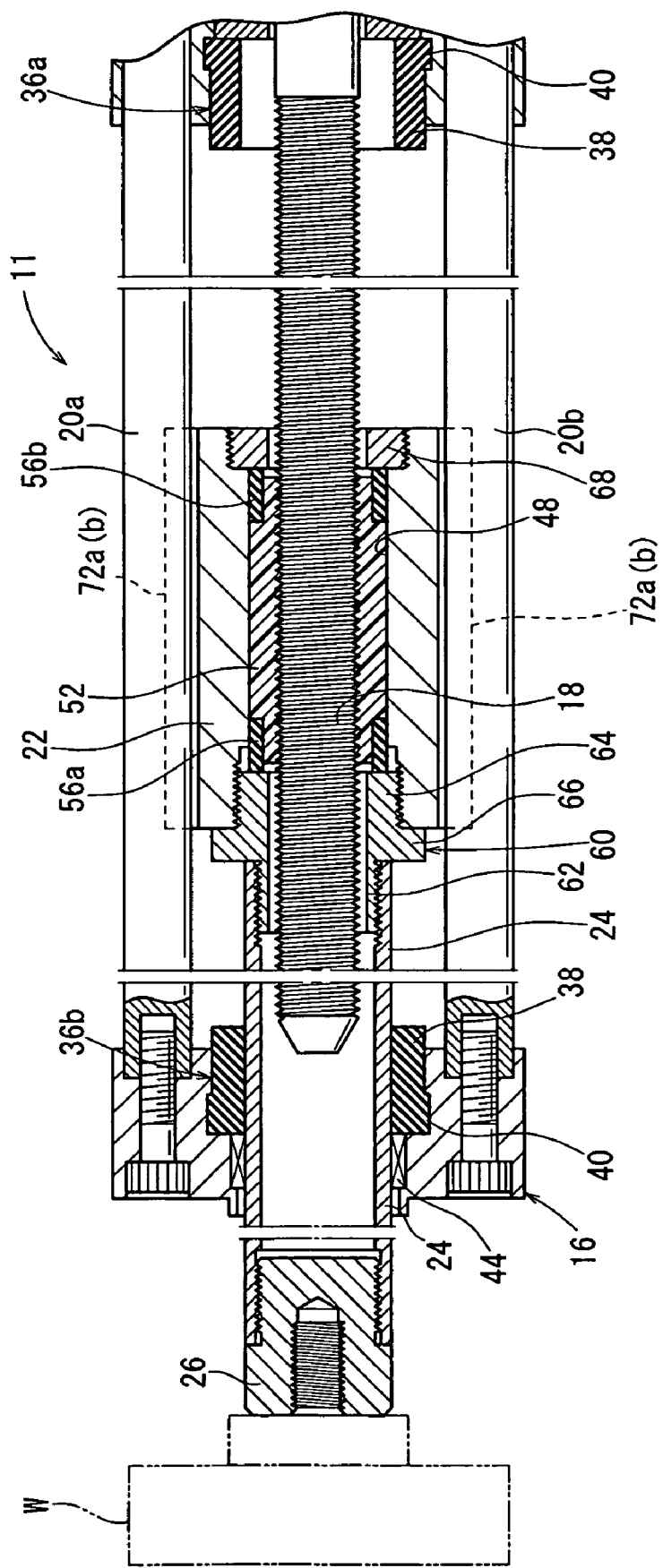
FIG. 8 is a partial longitudinal sectional view illustrating a state in which a piston rod abuts against a workpiece at an intermediate position.

As shown in FIG. 8, when the piston 22 does not arrive at one stroke end or the other stroke and, and the operation for pressing the workpiece W is performed at an intermediate position therebetween, then the impact is transmitted to the piston 22 via the socket 26 which abuts against the workpiece W, the piston rod 24, and the connecting member 60.

Figure 9:
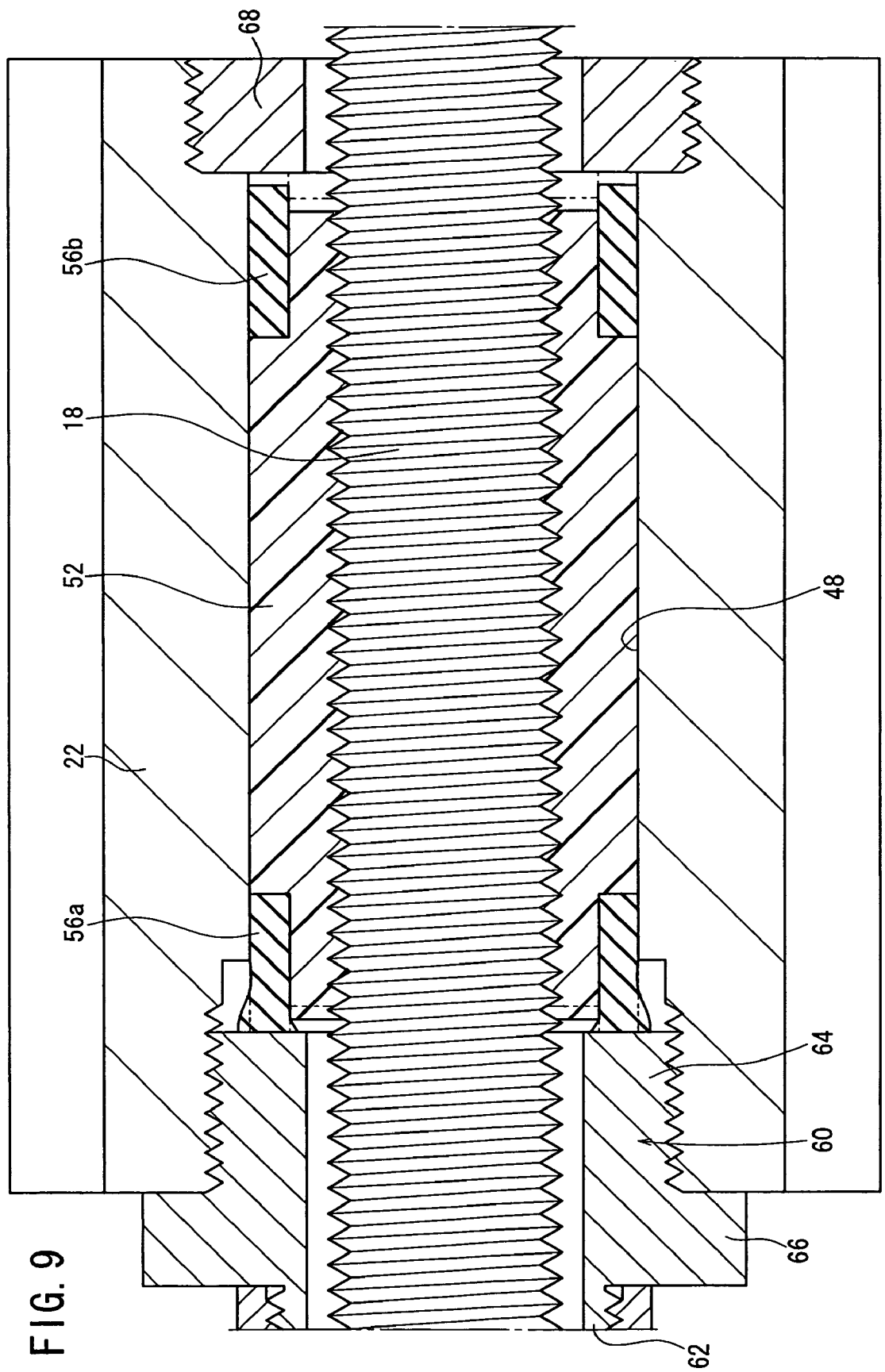
FIG. 9 is a partial magnified longitudinal sectional view illustrating a state in which the impact is absorbed by the piston damper shown in FIG. 8.

In this situation, the end portion of the piston damper 56a, which makes contact with the connecting member 60, is elastically deformed as shown in FIG. 9, and thus the impact is received in the embodiment of the present invention. Further, the sliding nut 52, which is provided in the piston 22, slightly slides in the axial direction of the feed screw shaft 18 with respect to the piston 22 (see two-dot chain lines shown in FIG. 9). Accordingly, the impact is appropriately absorbed.

In other words, the piston 22 and the connecting member 60, which are connected to one another, are provided displaceably in the axial direction of the feed screw shaft 18 in response to the impact applied to the piston rod 24. The slight displacement of the piston 22 and the connecting member 60 is absorbed by the piston damper 56a which has elasticity and which is installed to the end of the sliding nut 52. Accordingly, the impact is appropriately absorbed.

In this situation, the sliding nut 52 is not displaced in relation to the feed screw shaft 18, because the sliding nut 52 is screwed to the feed screw shaft 18. Further, the impact is prevented from being transmitted to the screw engagement portion of the sliding nut 52 and the feed screw shaft 18. Accordingly, it is possible to appropriately protect the screw engagement portion of the sliding nut 52 and the feed screw shaft 18.

Therefore, in the embodiment of the present invention, even when the workpiece W is pressed by the piston rod 24 at the intermediate position between both stroke ends, the impact, which is applied to the piston rod 24, is smoothly absorbed by the relative sliding displacement between the piston 22 and the sliding nut 52 and the elastic piston damper 56a. Therefore, it is possible to avoid the deterioration of the durability of the electric actuator 11.

Figure 10:
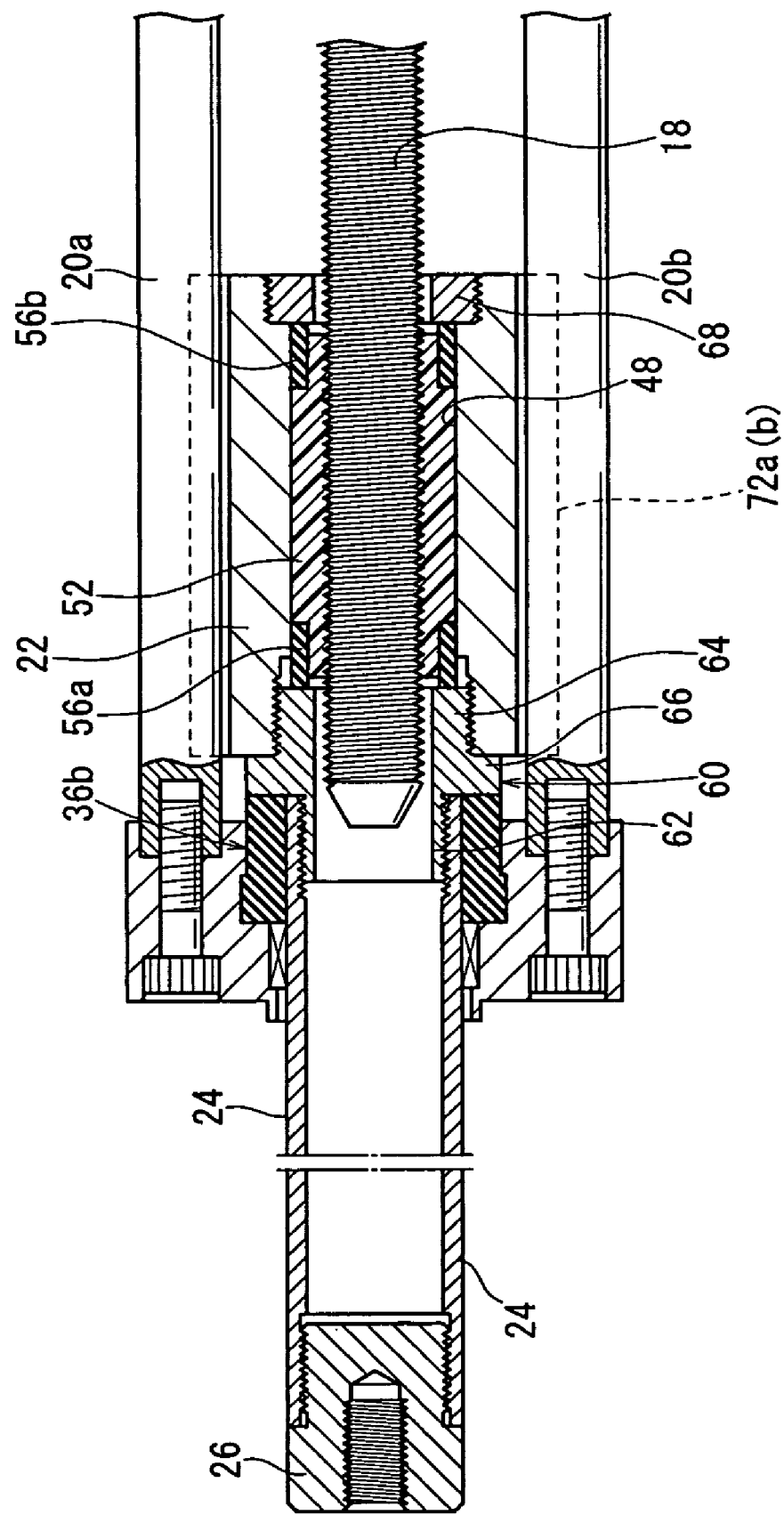
FIG. 10 is a partial longitudinal sectional view illustrating a state in which the impact is absorbed by both of the piston damper and the end damper at the forward movement end of the piston rod.

Further, when the impact is generated at the stroke end at the forward movement end of the piston rod 24, the impact is absorbed more appropriately, because of the synergistic effect of the buffering action of the piston damper 56a and the buffering action brought about by the abutment of the annular flange section 66 of the connecting member 60 against the second end damper 36b (see FIG. 10).

Similarly, when the impact is generated at the stroke end at the backward movement end of the piston rod 24, the impact is absorbed more appropriately, because of the synergistic effect of the buffering action of the piston damper 56b and the buffering action brought about by the abutment of the end surface of the annular member 68 and the piston 22 against the first end damper 36a (see FIG. 3).

As described above, in the embodiment of the present invention, the buffering mechanism is provided, which includes the pair of piston dampers 56a, 56b provided for the piston 22, and the first and second end dampers 36a, 36b provided for the housing 12 and the rod cover 16. Accordingly, the impact, which is exerted on the piston 22, can be appropriately buffered at any arbitrary position including both stroke ends and the intermediate position between both stroke ends.

In the embodiment of the present invention, the electric actuator can be used as an actuator driven by a motor capable of being used in the same manner as the air cylinder even in an environment in which compressed air is absent or compressed air cannot be used.

In this case, the phrase "in the same manner as the air cylinder" means, for example, that the electric actuator is driven in accordance with the ON/OFF control, no controller is required, it is possible to press the piston 22, the electric actuator can be driven even without any sensor, and it is possible to control speed and thrust force.

Further, in the embodiment of the present invention, the predetermined rigidity is secured by the pair of parallel guide rods 20a, 20b without the need for a rigid body. Accordingly, the number of parts is decreased, the production cost is reduced, and it is possible to realize a light weight.

Furthermore, the shock energy absorber or impact energy absorber (damper) is generally arranged at a collision portion in the driving apparatus. However, in the embodiment of the present invention, when the property, size, and displacement amount of the damper are set so that the impact value upon the collision is not more than 5 G, preferably not more than 2 G, then it is possible to improve the durability of the damper, thereby improving the durability of the electric actuator as well. The strength of each part can be reduced by suppressing the impact value, and thus it is possible to reduce size and weight of the apparatus.

As for the method for producing the housing 12 and the rod cover 16, it is preferable to use, for example, integrated molding based on aluminum die casting, press sheet metal deep drawing, and staked steel plates integrally formed by staking a plurality of steel plates.

As for the feed screw shaft 18, it is preferable to use, for example, a slide screw shaft made of resin, a slide screw shaft made of metal, a ball screw shaft, or a timing belt suspended between pulleys.

When the workpiece W is pressed at a predetermined position by the piston rod 24 and a high load is applied to the rotary driving source 14 after the piston 22 and the piston rod 24 arrive at the stroke end, the rotation of the drive shaft of the rotary driving source 14 is stopped to give a restricted state. In this situation, the torque, which is outputted from the drive shaft of the rotary driving source 14, is proportional to the current applied to the rotary driving source 14. Therefore, in the restricted state, the current (overcurrent), which exceeds the previously prescribed current value, is applied to the rotary driving source 14. When the overcurrent is generated, the rotary driving source 14 may undesirably burn out.

Figure 22:
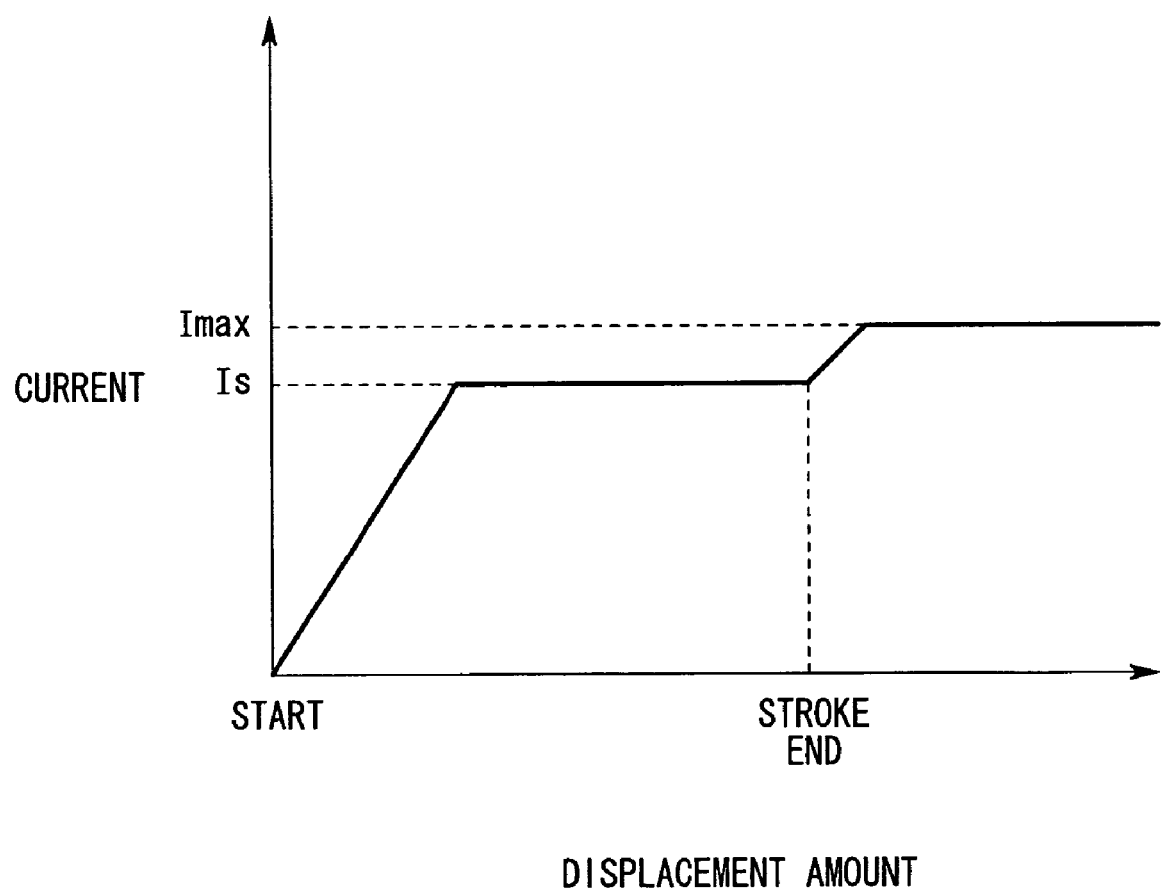
FIG. 22 is a characteristic chart illustrating the relationship between the displacement amount of the slider of the electric actuator and the current supplied to the rotary driving source.

Accordingly, in the embodiment of the present invention, the detection signal from the current sensor 138 for detecting the current to be supplied to the rotary driving source 14, is subjected to the feedback to the upstream side of the current amplifier/limiter 136 via the current loop 140. The current amplifier/limiter 136 compares, by the comparing means, the preset reference current $I_{MAX}$ stored in the storage means with the detection signal supplied from the current sensor 138. Further, the current, which is to be supplied to the rotary driving source 14, is limited by the current limit means so that the current does not exceed the reference current $I_{MAX}$ (see FIG. 22).

The current value, which is used when the rotary driving source 14 is controlled, is limited, for example, to not more than 0.6 A in the restricted state in which the drive shaft of the rotary driving source 14 is stopped, and not more than 0.2 A during driving with no load. Accordingly, the rotary driving source 14 is able to have a long service.

As described above, in the case of the driver 118 of the embodiment of the present invention, the value of current supplied to the rotary driving source 14 is monitored by the current sensor 138, and the current amplifier/limiter 136 is used to limit the current applied to the rotary driving source 14 to be not more than reference current $I_{MAX}$.

As a result, even when the high load is applied to the rotary driving source 14, and the drive shaft of the rotary driving source 14 in the ON state is stopped to give the restricted state, then the current supplied to the rotary driving source 14 is limited to be not more than the preset reference current $I_{MAX}$. Therefore, it is possible to prevent the rotary driving source 14 from burning out by the overcurrent. It is a matter of course that the torque can be limited by limiting the current to be supplied to the rotary driving source 14.

In the embodiment of the present invention, it is unnecessary to provide an encoder, a detector such as a resolver, and a control circuit in order to control the operation speed and the position of the piston 22 and the piston rod 24. The rotary driving source 14 can be prevented from burning out by using a simple circuit. Accordingly, it is possible to reduce the production cost.

In this arrangement, it is preferable that the driver 118 is applied to the driving apparatus (electric actuator) in which only the pressing action by the piston rod 24 and the direction of rotation of the rotary driving source 14 are controlled.

As for the driver 118 of the embodiment of the present invention, explanation has been made based on the pressing action for the workpiece W by the piston rod 24 of the electric actuator 11. However, there is no limitation thereto. It is a matter of course that the present invention is applicable, for example, for transporting, caulking, pushing, and supporting the workpiece by the piston rod 24 of the electric actuator 11, and further, gripping the workpiece by an unillustrated electric chuck, and clamping the workpiece by an unillustrated electric clamp.

That is, when the high load is applied to the rotary driving source 14, for example, by the action of transporting, gripping, or clamping the workpiece, and the rotation of the drive shaft of the rotary driving source 14 is stopped to give the restricted state, then the current to be supplied to the rotary driving source 14 is limited so that the current is not more than the reference current $I_{MAX}$.

Next, an explanation will be made about Comparative Example 1 and Comparative Example 2 compared with the driver 118 of the embodiment of the present invention. The same constitutive components as those of the driver 118 shown in FIG. 21 are designated by the same reference numerals, any detailed explanation of which will be omitted.

Figure 23:
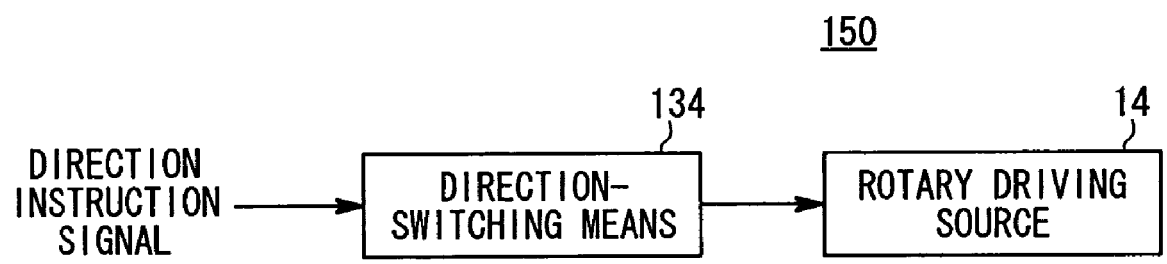
FIG. 23 is a block diagram illustrating an arrangement of a relay circuit concerning Comparative Example 1.

FIG. 23 shows a relay circuit 150 concerning Comparative Example 1. In this arrangement, when a plurality of the relay circuits 150 are combined, it is possible to switch the direction of rotation of the rotary driving source 14. However, when the drive shaft of the rotary driving source 14 is stopped to give the restricted state, the current exceeding the current permitted by the rotary driving source 14, may undesirably be supplied, and the rotary driving source 14 may be burned out.

Figure 24:
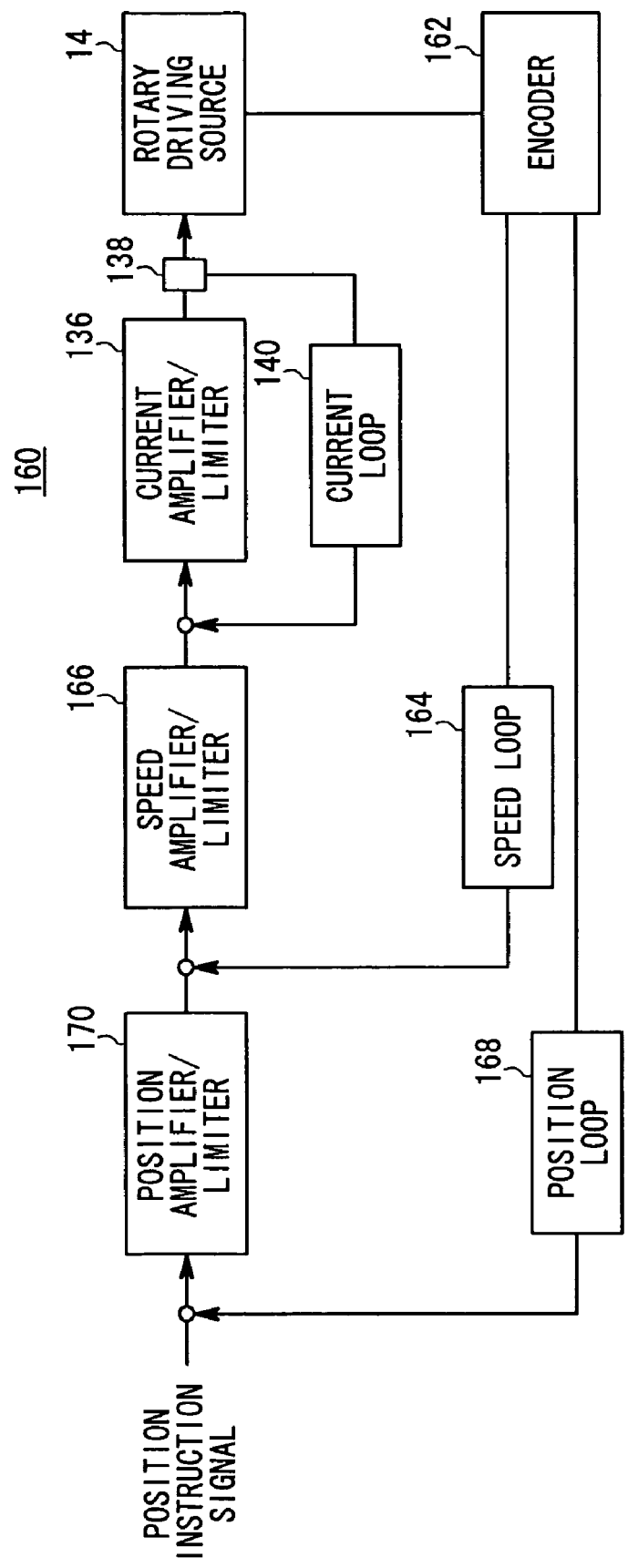
FIG. 24 is a block diagram illustrating an arrangement of a servo circuit concerning Comparative Example 2.

FIG. 24 shows a servo circuit 160 concerning Comparative Example 2. The servo circuit 160 has a detector such as a resolver and an encoder 162, comprising a control circuit which performs the feedback control for the speed by a speed loop 164 and a speed amplifier/limiter 166, and a control circuit which performs the feedback control for the position by a position loop 168 and a position amplifier/limiter 170. Therefore, the servo circuit 160 concerning Comparative Example 2 requires the highly accurate control circuits for controlling, for example, the position and the speed. Therefore, the servo circuit 160 is expensive, and the production cost is expensive.

On the contrary, the driver 118 of the embodiment of the present invention functions as something in between those of the relay circuit 150 concerning Comparative Example 1 and the servo circuit 160 concerning Comparative Example 2. Further, it is possible to reduce the production cost.

Further, in the driver 118 of the embodiment of the present invention, the electric actuator 11 can be operated in accordance with the ON/OFF control in the same manner as the solenoid-operated valve, and thus the electric actuator 11 can be used as an apparatus for controlling the direction most suitable, for example, for pressing and transporting.

Further, in the driver 118 of the embodiment of the present invention, it is unnecessary to provide any detector such as an encoder additionally provided externally for the rotary driving source 14. Therefore, it is possible to reduce size and weight of the apparatus.

Figure 25:
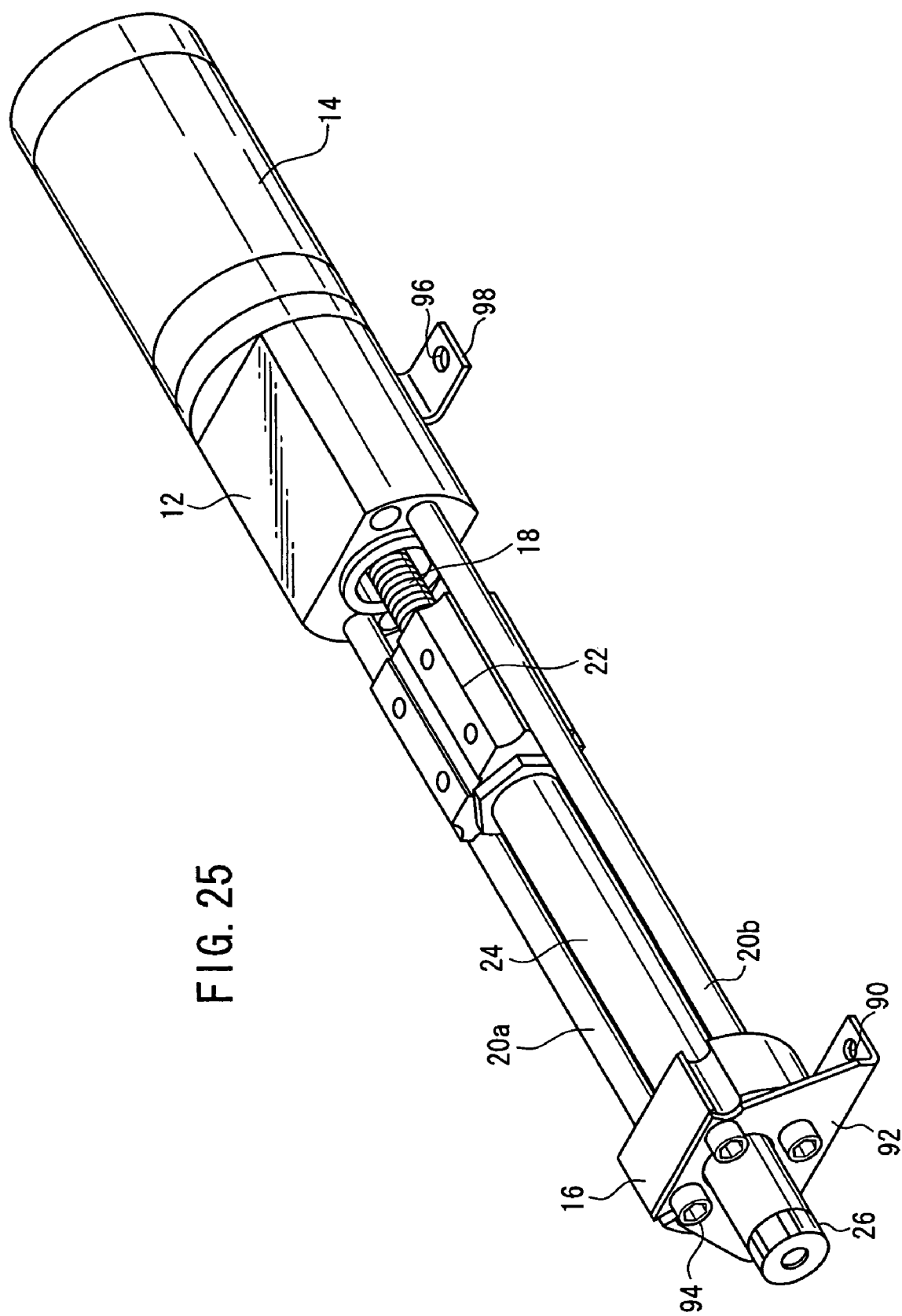
FIG. 25 is a perspective view in which a plurality of attachment fixtures are installed to the electric actuator shown in FIG. 2.

As shown in FIG. 25, a first attachment fixture 92, which has attachment holes 90 having a small diameter and which is bent to have an L-shaped vertical cross section, is installed to the side surface of the rod cover 16 by a plurality of screw members 94. Further, a pair of second attachment fixtures 98 (one of them is not shown), each of which has an attachment hole 96 having a small diameter, which are perpendicular to the axis of the housing 12, and which extend in mutually opposite directions, are installed to the flat bottom surface portion of the housing 12. When the first attachment fixture 92 and the second attachment fixtures 98 are used, then the attachment performance of the electric actuator 11 is improved, and it is possible to enhance the versatility with respect to the installation environment.

Figure 26:
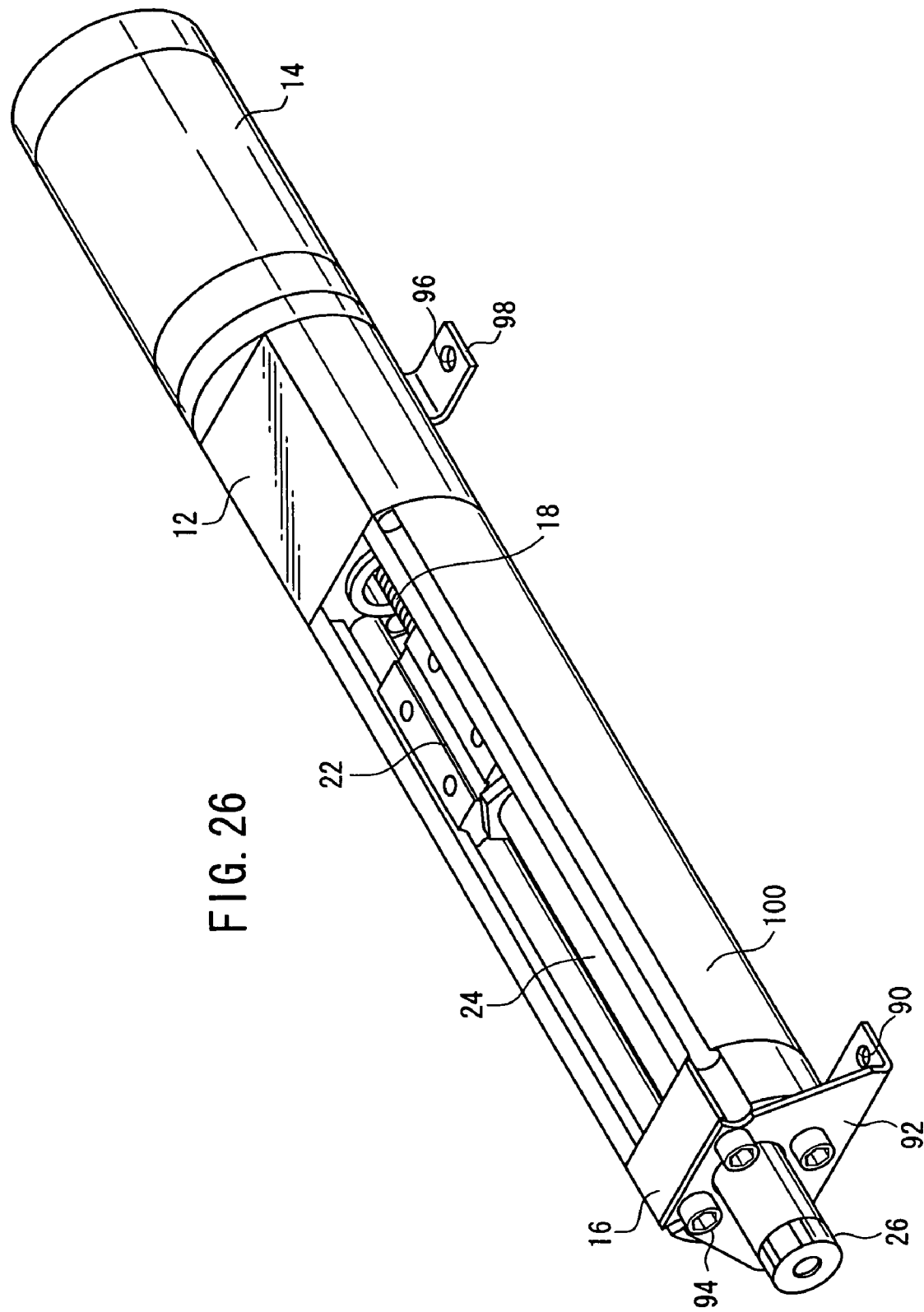
FIG. 26 is a perspective view in which a cover member having an open upper surface is installed to the electric actuator shown in FIG. 25.

As shown in FIG. 26, a cover member 100, which is installed between the housing 12 and the rod cover 16 and which has an open upper surface, may be installed to the electric actuator 11 shown in FIG. 25. When the cover member 100 is installed, it is possible to suppress entry of the dust or the like into the electric actuator 11 as compared with when the cover member 100 is not installed.

Figure 27:
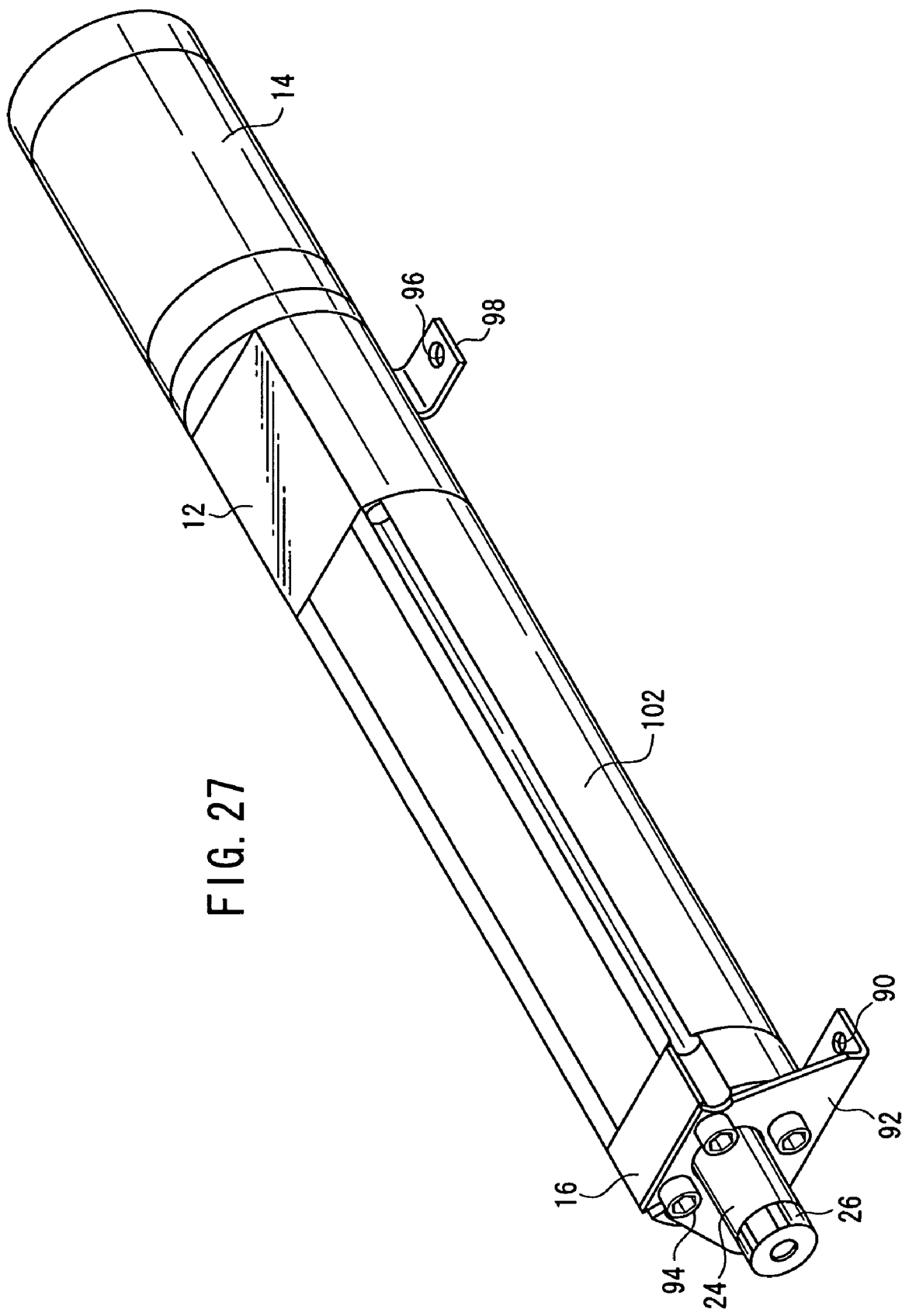
FIG. 27 is a perspective view in which a cover member having no opening is installed to the electric actuator shown in FIG. 25.

As shown in FIG. 27, when another cover member 102, in which all of the surfaces including the upper surface are closed, is installed between the housing 12 and the rod cover 16, it is possible to appropriately avoid dust or the like from entering into the electric actuator.

Figure 28:
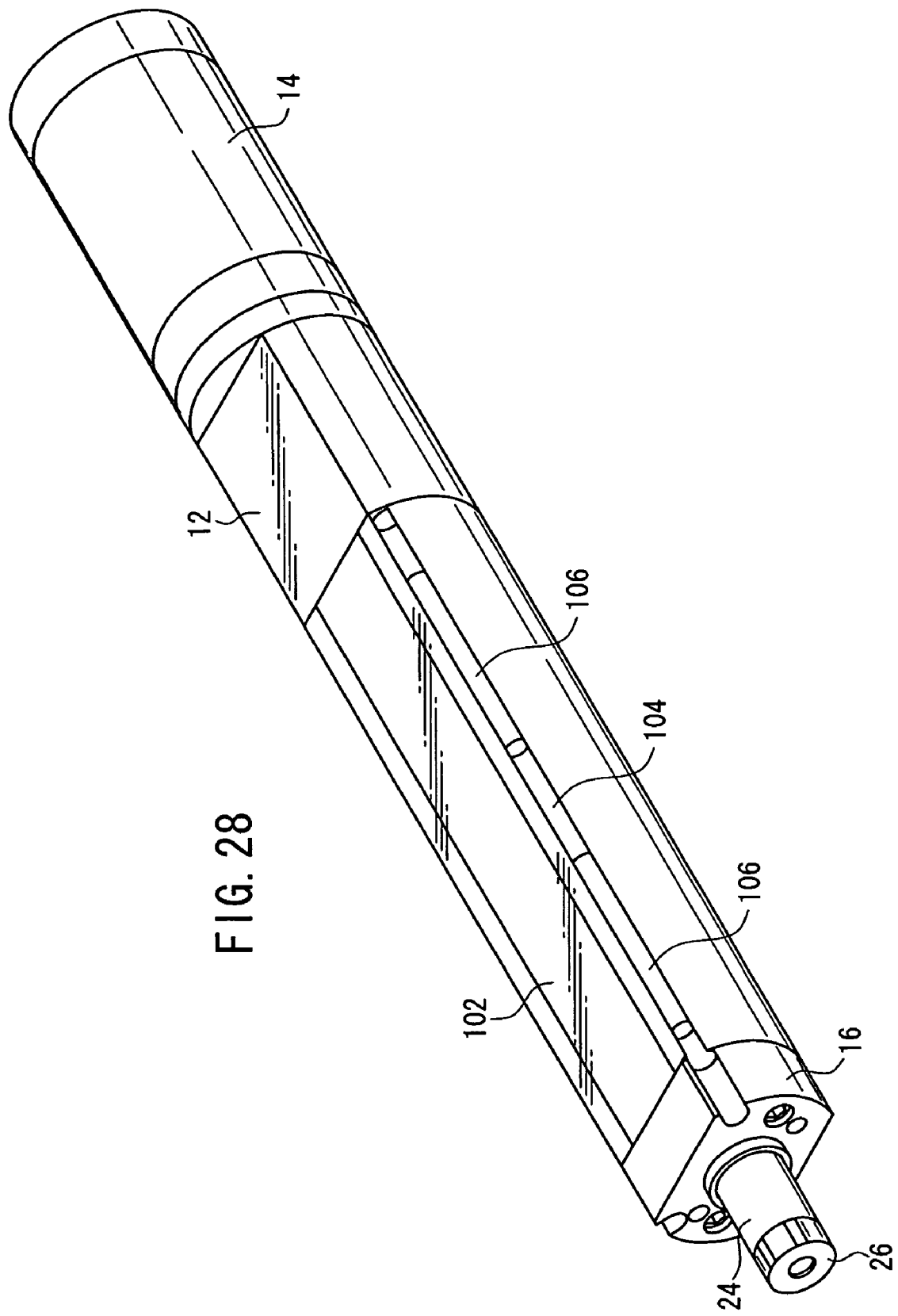
FIG. 28 is a perspective view in which a sensor is installed to a long groove of the cover member shown in FIG. 27.

In this arrangement, as shown in FIG. 28, a long groove 104 for installing the sensor, which has a circular arc-shaped cross section, may be formed on the cover member 102, and the sensor 106 for detecting the position of the piston 22 may be installed to an arbitrary position along the long groove 104. The sensor 106 may include, for example, at least magnetic sensors, proximity sensors, and photo-micro sensors.

Figure 29:
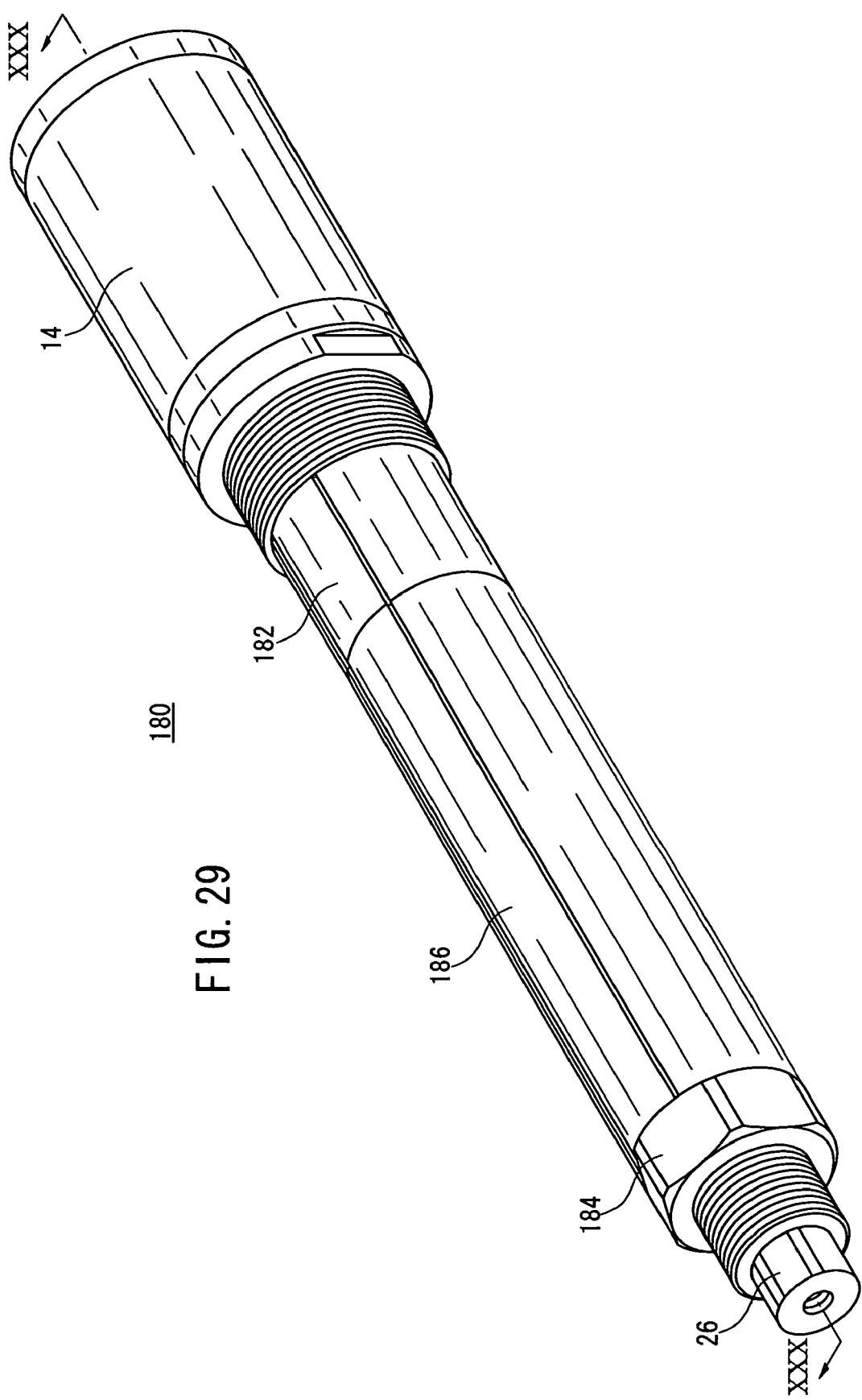
FIG. 29 is a perspective view illustrating an electric actuator having another structure.
Figure 30:
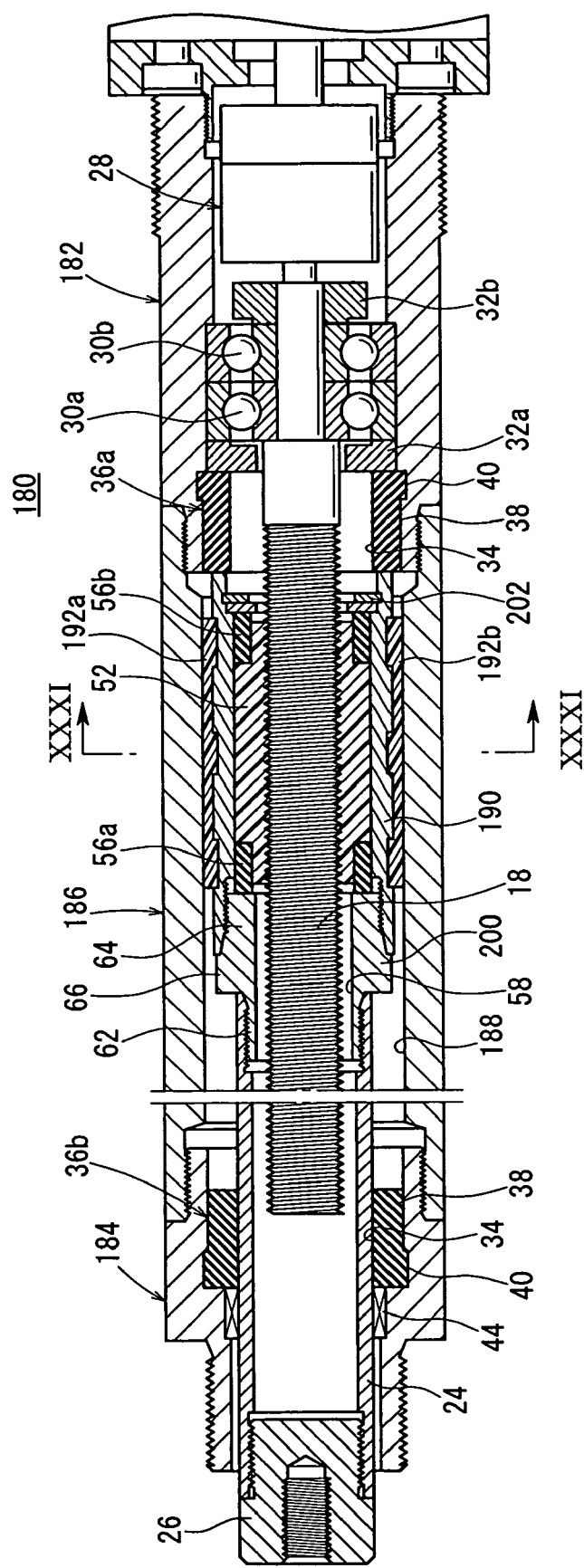
FIG. 30 is a partial longitudinal sectional view taken along a line XXX-XXX shown in FIG. 29.
Figure 31:
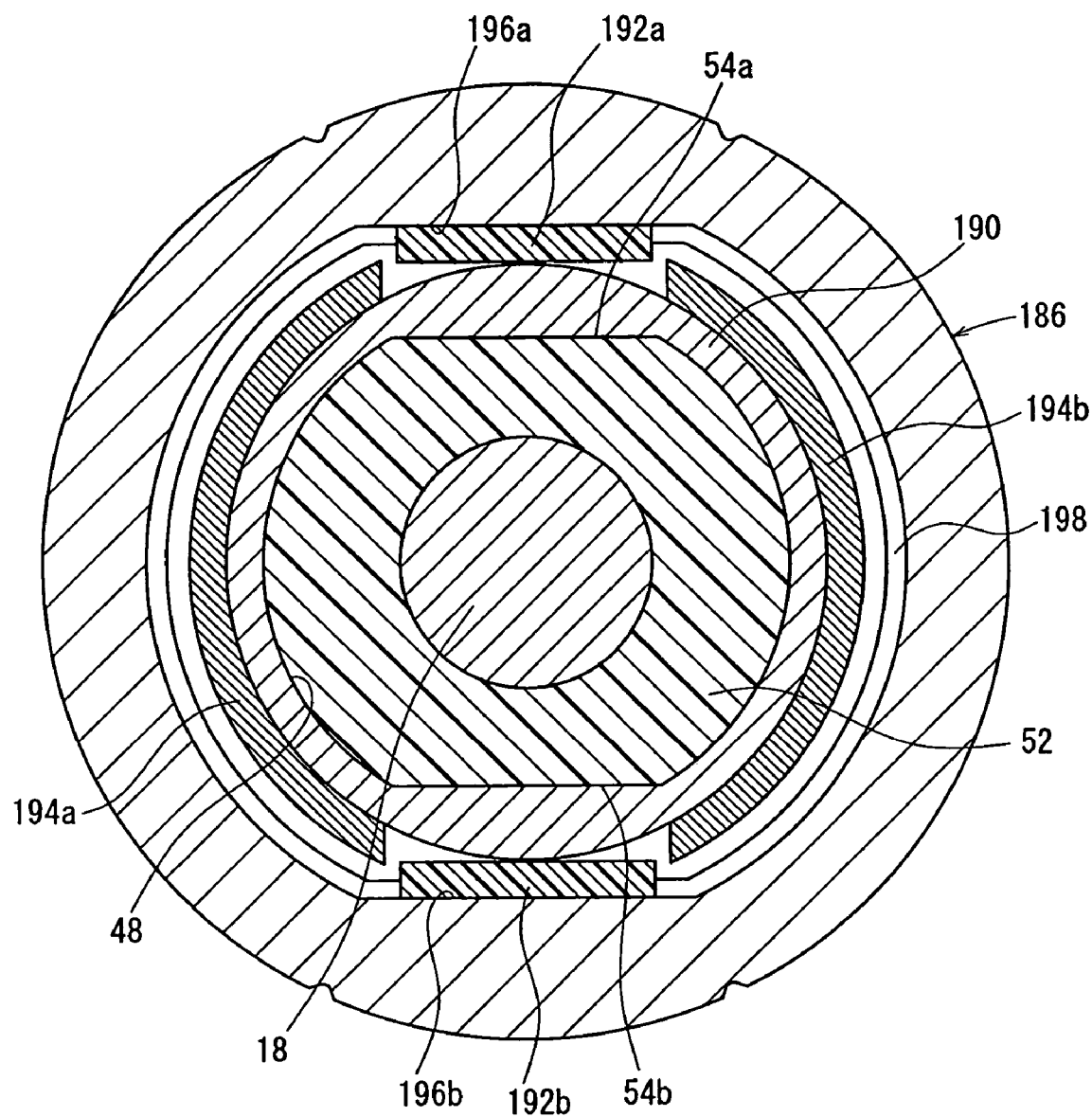
FIG. 31 is a magnified vertical sectional view taken along a line XXXI-XXXI shown in FIG. 30.

Next, an electric actuator 180 according to another arrangement is shown in FIGS. 29 to 31. The same constitutive components as those of the electric actuator 11 shown in FIG. 2 are designated by the same reference numerals, any detailed explanation of which will be omitted. The functions of the pair of piston dampers 56a, 56b and the first and second end dampers 36a, 36b are the same as those of the embodiment described above, any detailed explanation of which will be omitted.

An electric actuator 180 according to the another arrangement is different from the embodiment described above in that the pair of guide rods 20a, 20b are not provided, a lengthy cylindrical tube 186 is provided to connect a cylindrical housing 182 and a stepped cylindrical rod cover 184, and a piston 190 is accommodated in a hollow section 188 of the tube 186.

Those secured to the outer circumferential surface of the piston 190 respectively are a pair of guide plates 192a, 192b each of which is made of a resin material and which extend in the axial direction, and a pair of magnets 194a, 194b each of which has a semicircular form with a circular arc-shaped cross section.

In this arrangement, only the pair of guide plates 192a, 192b slide along flat guide surfaces 196a, 196b formed on the inner wall of the tube 186. Therefore, the guiding action is effected for the piston 190 and the rotation-preventive action is effected in the circumferential direction of the tube 186. A predetermined clearance 198 is provided between the outer wall of the piston 190 and the inner wall of the tube 186 at portions except for the guide plates 192a, 192b (see FIG. 31).

The sliding nut 52 having the same shape is installed slidably in the piston 190, in the same manner as the embodiment described above. The sliding nut 52 is retained by a connecting member 200 which is connected to one end of the piston 190 and a C-clip 202 which is installed to the other end of the piston 190 (see FIG. 30).

Figure 32:
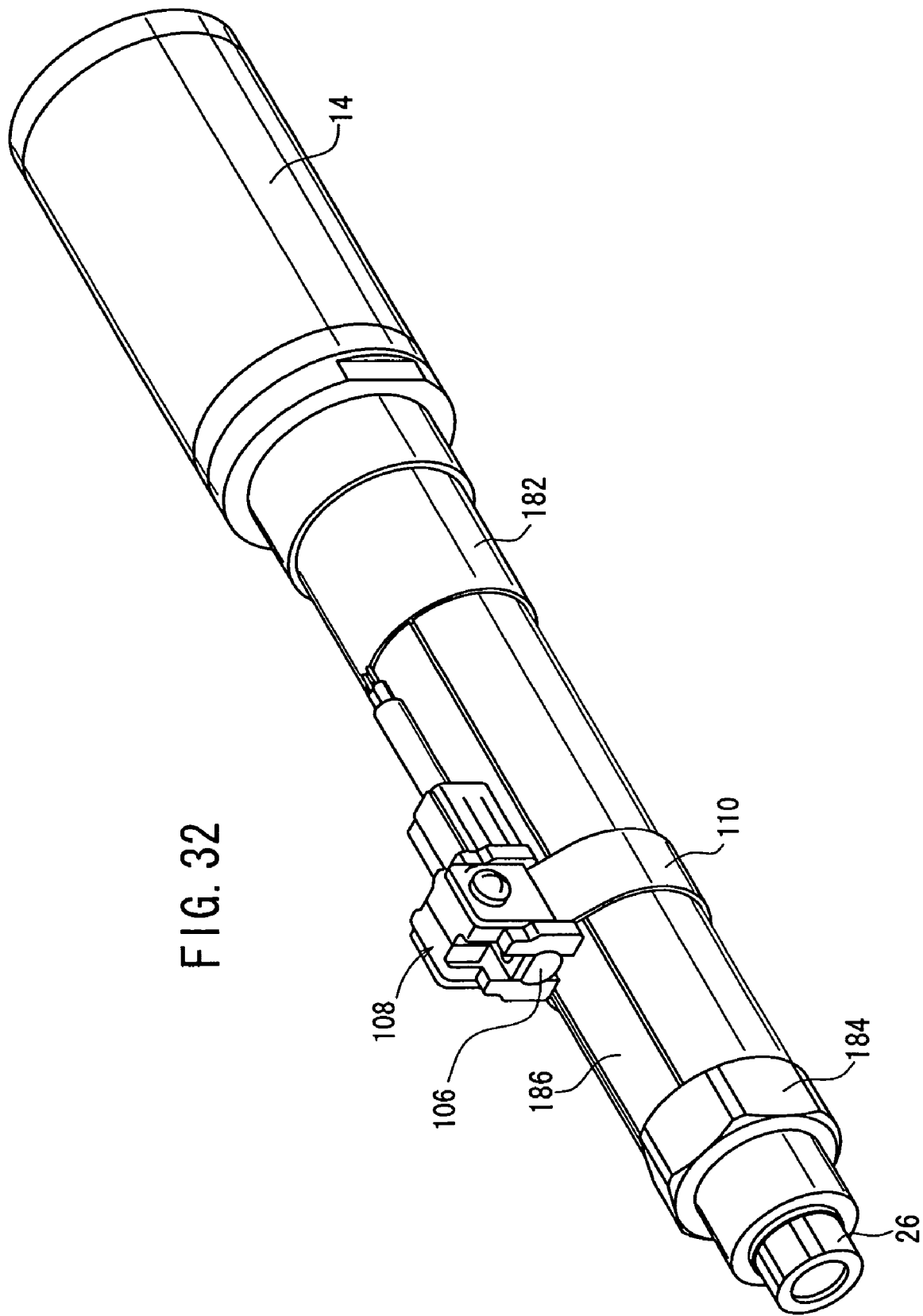
FIG. 32 is a perspective view illustrating a state in which the sensor is installed by a tightening fixture and a band member.

A sensor 106, which is composed of, for example, any one of a magnetic sensor, proximity sensor, and photo-micro sensor, is attached to a predetermined portion on the outer circumferential surface of the tube 186 by a tightening fixture 108 and a band member 110. The magnetic fields of the magnets 194a, 194b are detected by the sensor 106 installed to the tube 186. Accordingly, the position of the piston 22 is detected (see FIG. 32).

Figure 33:
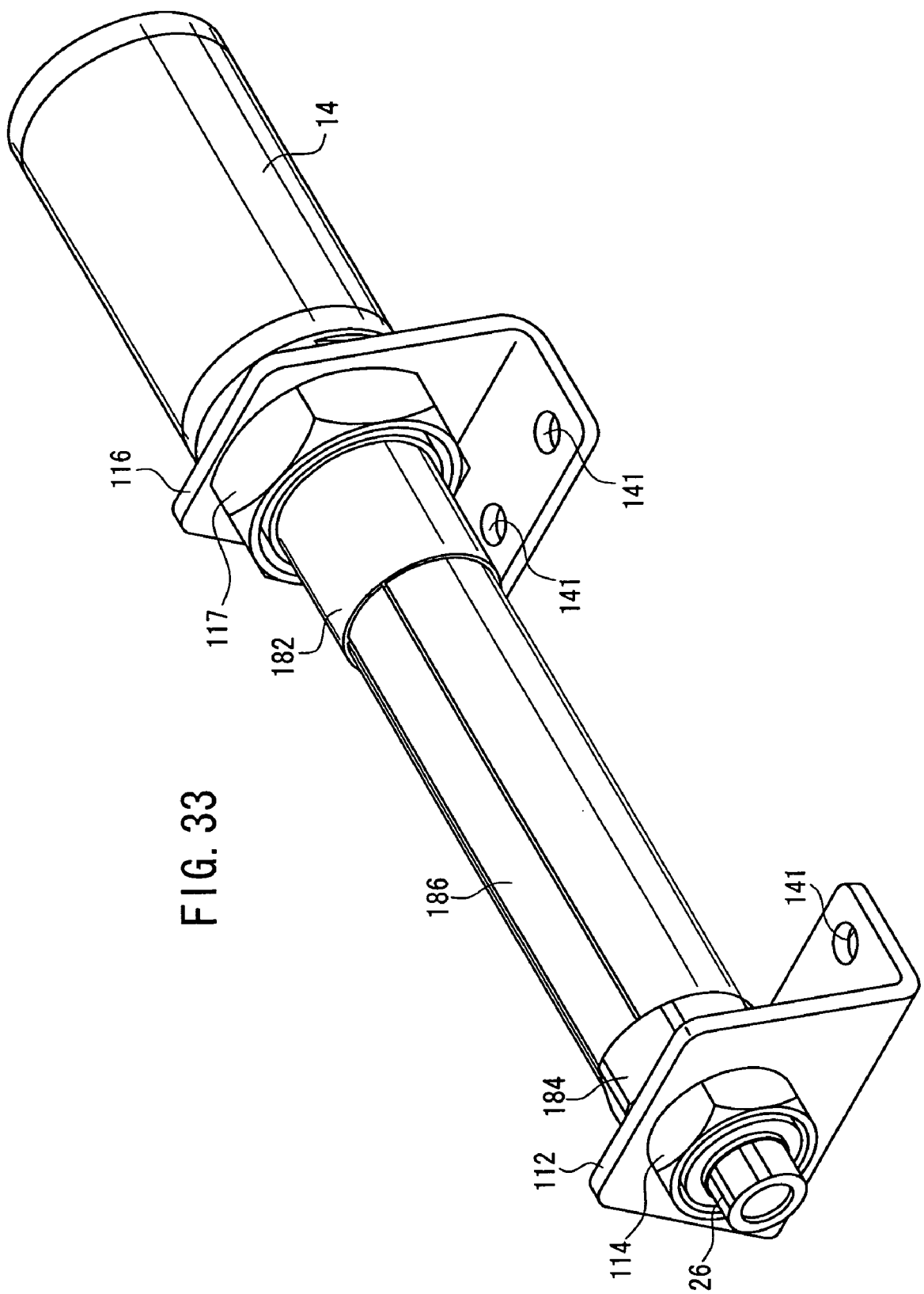
FIG. 33 is a perspective view in which a plurality of attachment fixtures are installed to the electric actuator shown in FIG. 29.

As shown in FIG. 33, a first attachment fixture 112, which is bent to have a substantially L-shaped vertical cross section, is installed to a screw section of the rod cover 184, and the first attachment fixture 112 is retained by tightening a lock nut 114. Further, a second attachment fixture 116, which is installed to an annular stepped portion between the housing 182 and the rotary driving source 14, is retained by a lock nut 117. Circular attachment holes 141 are formed for the first attachment fixture 112 and the second attachment fixture 116 respectively.

Figure 34:
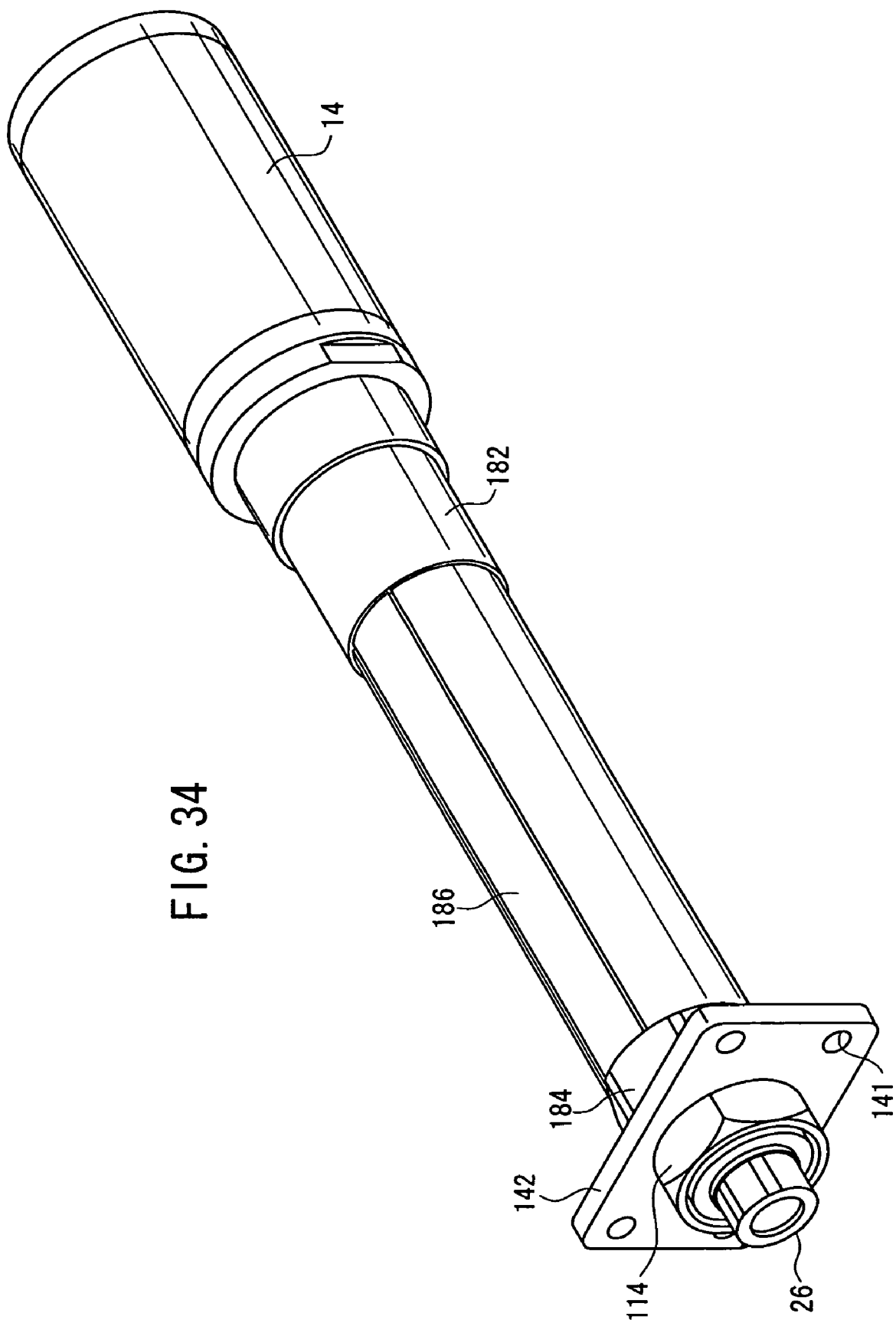
FIG. 34 is a perspective view in which an attachment fixture is installed to a rod cover portion of the electric actuator shown in FIG. 29.
Figure 35:
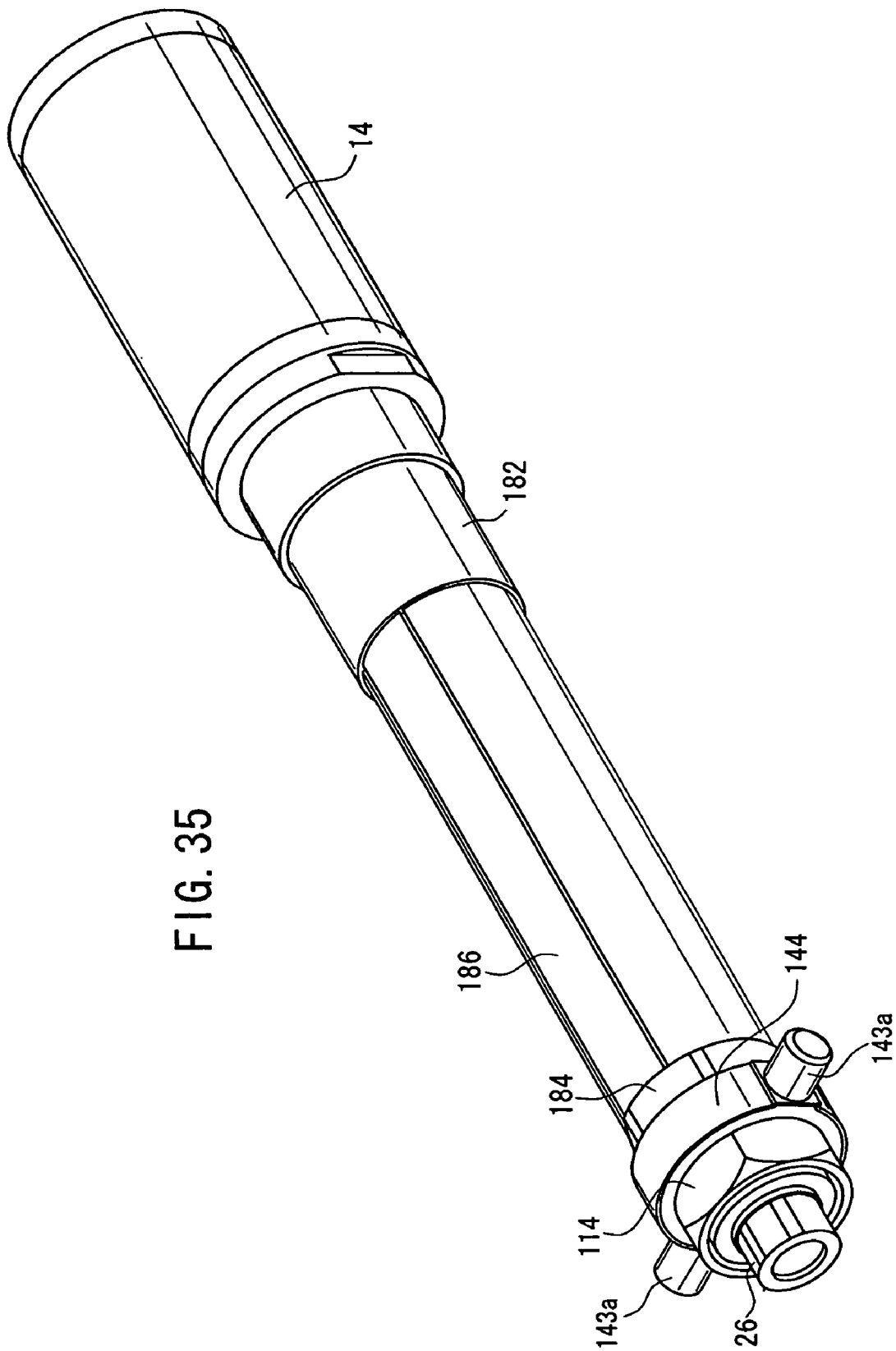
FIG. 35 is a perspective view in which an annular member provided with a pair of pivots is installed to a rod cover portion of the electric actuator shown in FIG. 29.

As shown in FIG. 34, an attachment fixture 142, which has a rectangular plate-shaped form, is installed to the rod cover 184 by a lock nut 114. Alternatively, as shown in FIG. 35, a so-called trunnion type cylinder is appropriately constructed such that an annular member 144, which has a pair of columnar pivots 143a, 143b, is installed to the side of the rod cover 184, and the pivots 143a, 143b are supported by an unillustrated bush to swingably support the electric actuator 180 thereby.

In the embodiments described above, although only the electric actuator of the rod type, in which the piston rod 24 expands and contracts as shown in FIGS. 2 and 21, is disclosed, there is no limitation thereto. It is a matter of course that the present invention is also applicable to the electric actuator of the slide table type to be used by connecting an unillustrated slide table to the piston 22.

When the electric actuator of the slide table type is adopted, the rod type can be easily changed to the slide table type by detaching the piston rod 24 from the piston 22 and using another unillustrated rod cover in which the hole for allowing the piston rod 24 to penetrate therethrough is closed.

It is preferable that an automatic speed reducing ratio-switching apparatus, in which the speed reducing ratio is automatically switched when the load exceeding a preset predetermined torque is applied to the rotary driving source 14, is incorporated into the actuator control system 10 according to the embodiment of the present invention. In this case, it is possible to control the speed of rotation of the rotary driving source depending on the load.

Figure 36:
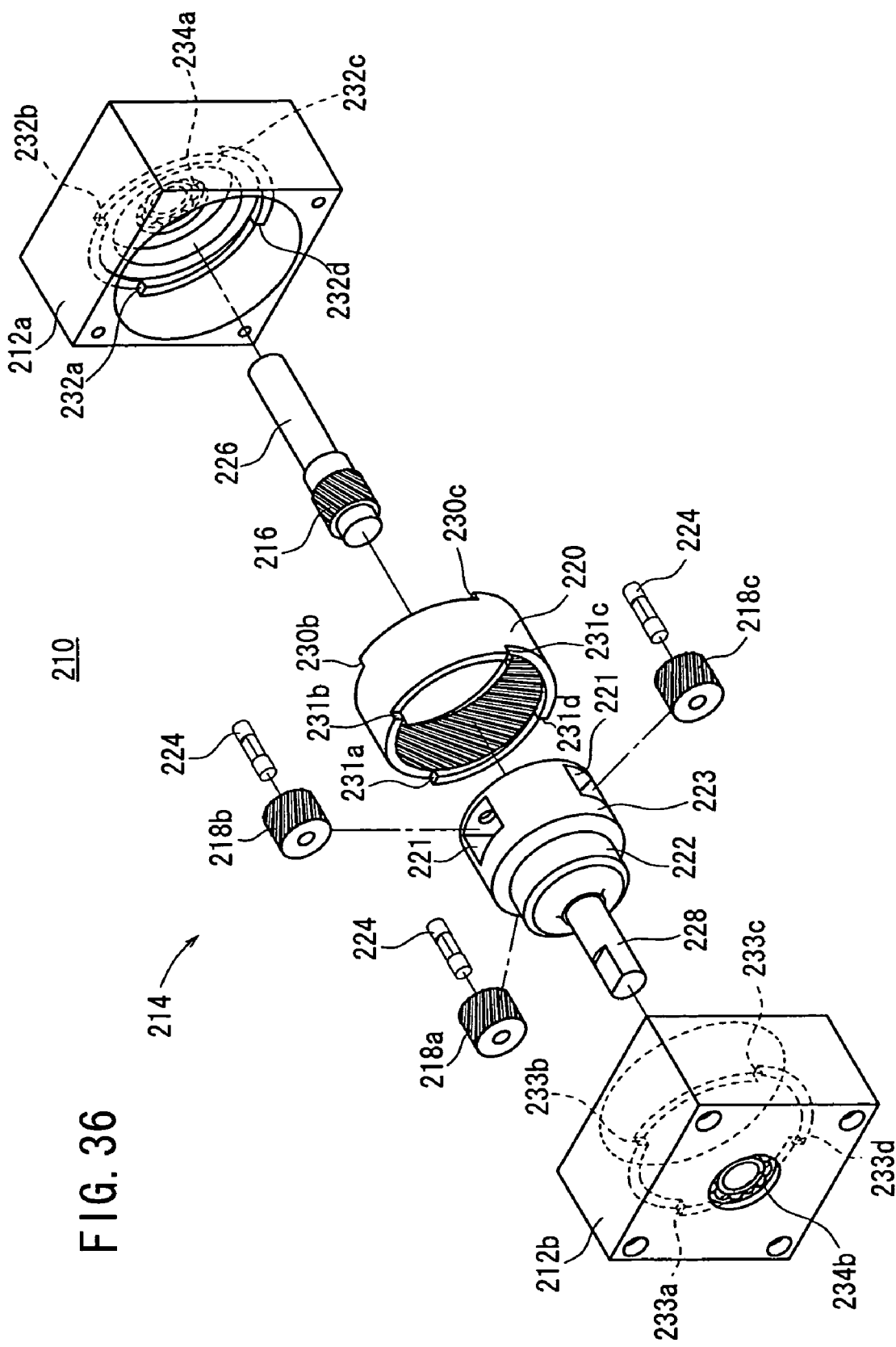
FIG. 36 is an exploded perspective view illustrating a first automatic speed reducing ratio-switching apparatus to be incorporated into the system.

FIG. 36 shows an exploded perspective view illustrating a first automatic speed reducing ratio-switching apparatus 210. As shown in FIG. 36, the first automatic speed reducing ratio-switching apparatus 210 comprises housings 212a, 212b which are constructed by being divided into two parts, and a planetary gear mechanism 214.

The housing 212a has a rectangular shape. Lock sections 232a to 232d, which are circular arc-shaped projections to engage with internal gear lock receiving sections 230a to 230d as described later on when an internal gear 220 makes parallel displacement in a direction toward an input shaft 226 as described later on, are formed on an inner side of the housing 212a. Further, the housing 212a is provided with a bearing section 234a for rotatably supporting the input shaft 226.

The housing 212b has a rectangular shape in the same manner as the housing 212a. Lock sections 233a to 233d, which are circular arc-shaped projections to engage with internal gear lock receiving sections 231a to 231d when the internal gear 220 makes parallel displacement in a direction toward an output shaft 228 as described later on, are formed on an inner side of the housing 212b. Further, the housing 212b is provided with a bearing section 234b for rotatably supporting the output shaft 228.

The planetary gear mechanism 214 comprises a single sun gear 216 which is formed integrally with the input shaft 226, a plurality of planet gears 218a, 218b, 218c which are meshed with the single sun gear 216 while being separated from each other by angles of about 120 degrees in the circumferential direction of the sun gear 216 and which make revolution and rotation, the internal gear 220, and a carrier 222. The number of the plurality of planet gears is not limited to three, but should be two or more.

The carrier 222 has a cylindrical large diameter inner section 223, and the output shaft 228 which protrudes from the inner section 223 toward the housing 212b. The sun gear 216 is inserted into the inner section 223 facing the interior thereof. A plurality of windows 221, which are separated from each other at equal angles of 120 degrees respectively, are formed for the inner section 223. The planet gears 218a, 218b, 218c face the respective windows 221.

Figure 38:
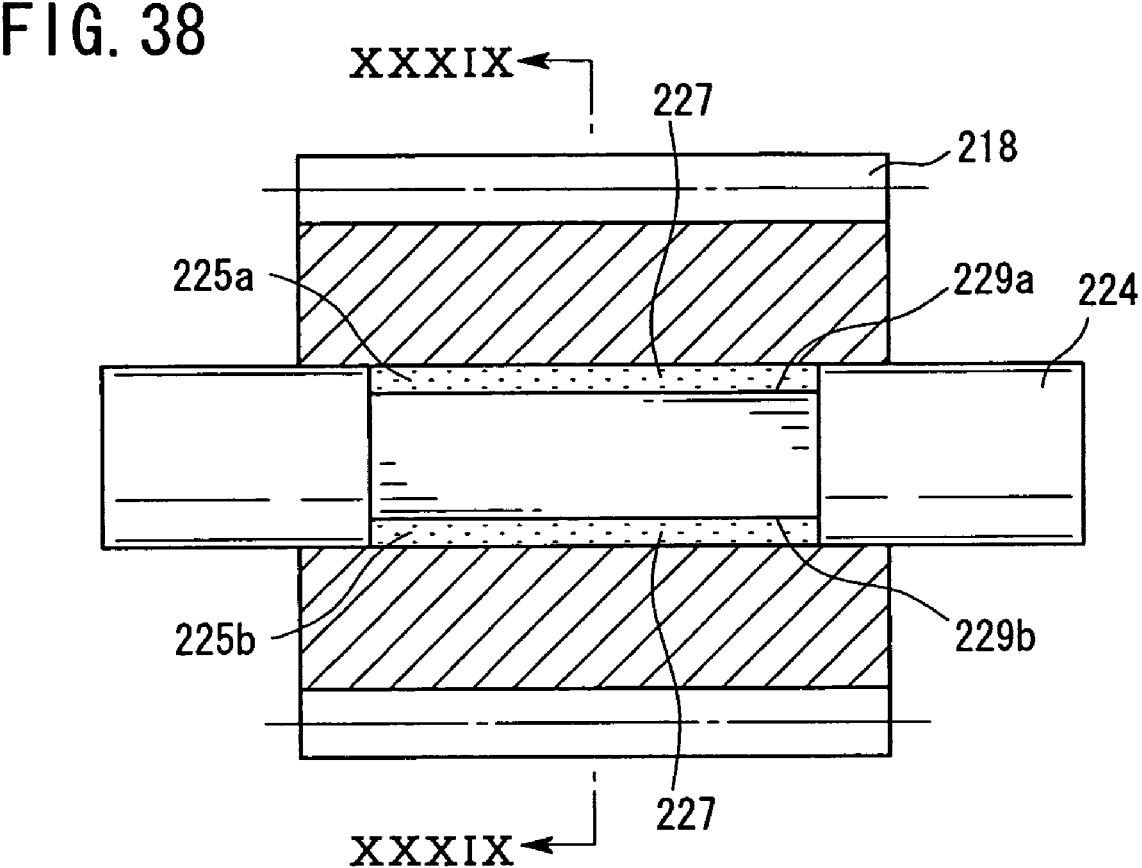
FIG. 38 is a longitudinal sectional view illustrating a planet gear of the first automatic speed reducing ratio-switching apparatus.
Figure 39:
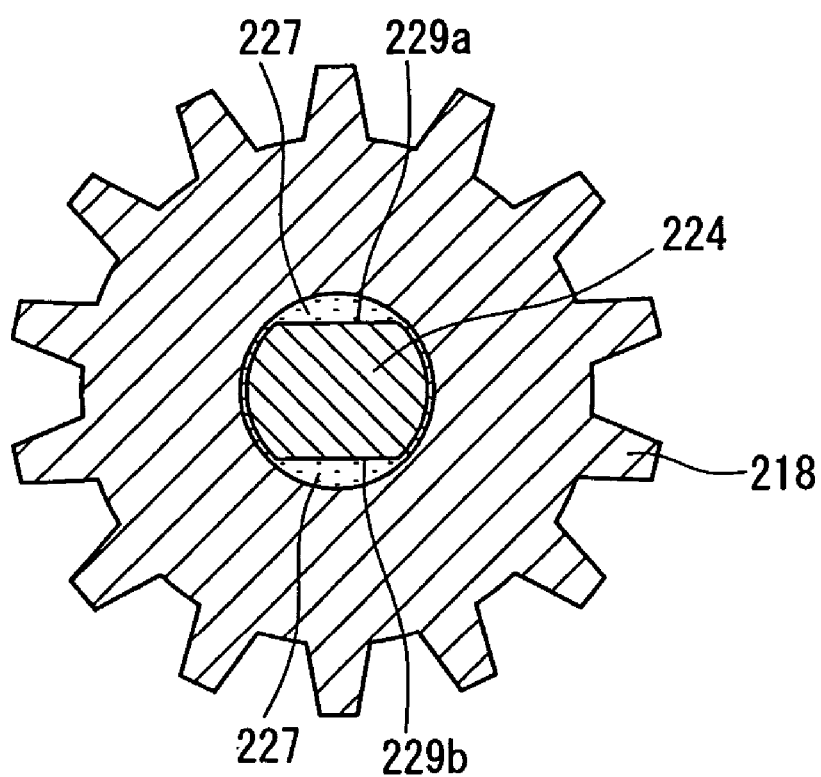
FIG. 39 is a vertical sectional view taken along a line XXXIX-XXXIX shown in FIG. 38.

The planet gears 218a, 218b, 218c are rotatably supported by the carrier 222 by using pins 224. As shown in FIGS. 38 and 39, the pin 224 is provided with cutouts 229a, 229b formed by cutting out parts of the outer circumference thereof. Clearances 225a, 225b are provided by the cutouts 229a, 229b between the planet gears 218a, 218b, 218c and the pin 224. The clearances 225a, 225b are filled, for example, with oil or grease. It is preferable that the oil or grease has high viscosity.

The large diameter internal gear 220 is meshed on the outer circumferential sides of the planet gears 218a, 218b, 218c which are meshed with inner teeth engraved on the inner circumference of the internal gear 220. The input shaft 226, which is formed integrally with the sun gear 216, is connected to a rotary driving shaft of an unillustrated rotary driving source via a coupling member (not shown). In this arrangement, as shown in FIG. 36, the input shaft 226 and the output shaft 228 are provided coaxially.

The sun gear 216, the planet gears 218a, 218b, 218c, and the internal gear 220 are composed of helical gears formed with inclined teeth respectively. In this arrangement, for example, oil or grease having a high viscosity is charged or applied to the interstices between the planet gears 218a, 218b, 218c and the inner section 223 of the carrier 222 and between the planet gears 218a, 218b, 218c and the internal gear 220 in order to obtain viscous resistance.

Figure 40:
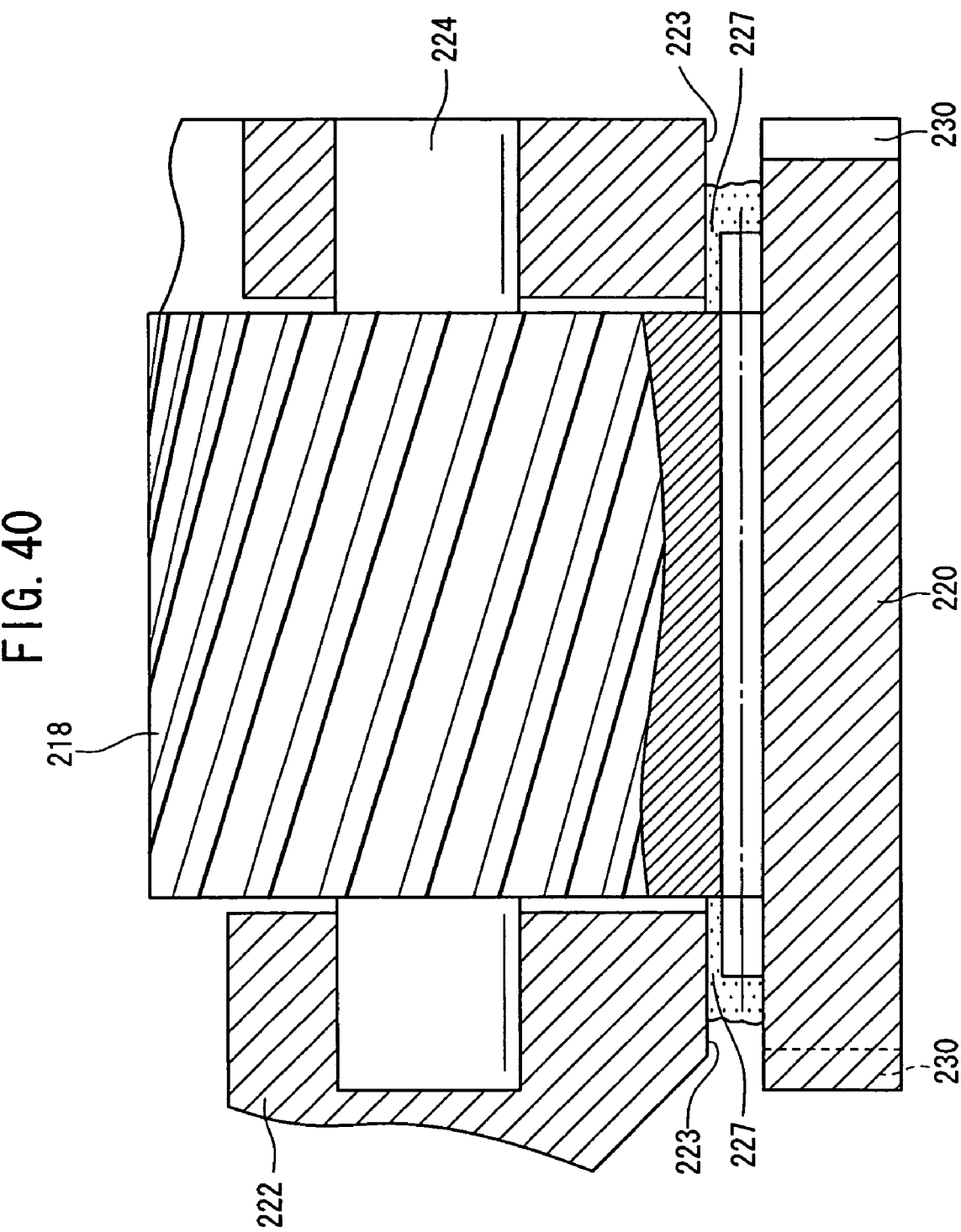
FIG. 40 is a partial magnified longitudinal sectional view illustrating a meshed portion between the planet gear and an internal gear.

In order to effectively obtain the viscous resistance, it is preferable that the clearance 227 between the inner section 223 and the planet gears 218a, 218b, 218c is not more than 0.1 mm (see FIG. 40).

The angle of torsion (angle of inclination of the helical shape along the screw thread) of each of the helical gears of the sun gear 216, the planet gears 218a, 218b, 218c, and the internal gear 220 is not specifically limited. However, it is preferable that the angle of torsion is about 30° to 40°. The viscosity of the oil, grease or the like to be used as the viscous resistance member is not specifically limited. However, it is preferable that the viscosity is about 10,000 to 100,000 (cSt) (0.01 m$^2$/s to 0.1 m$^2$/s). Further, the viscous resistance of the viscous resistance member can be also changed by the shear rate as well as by the width of the clearance 227 and the viscosity of the grease or the like as described above.

Figure 50:
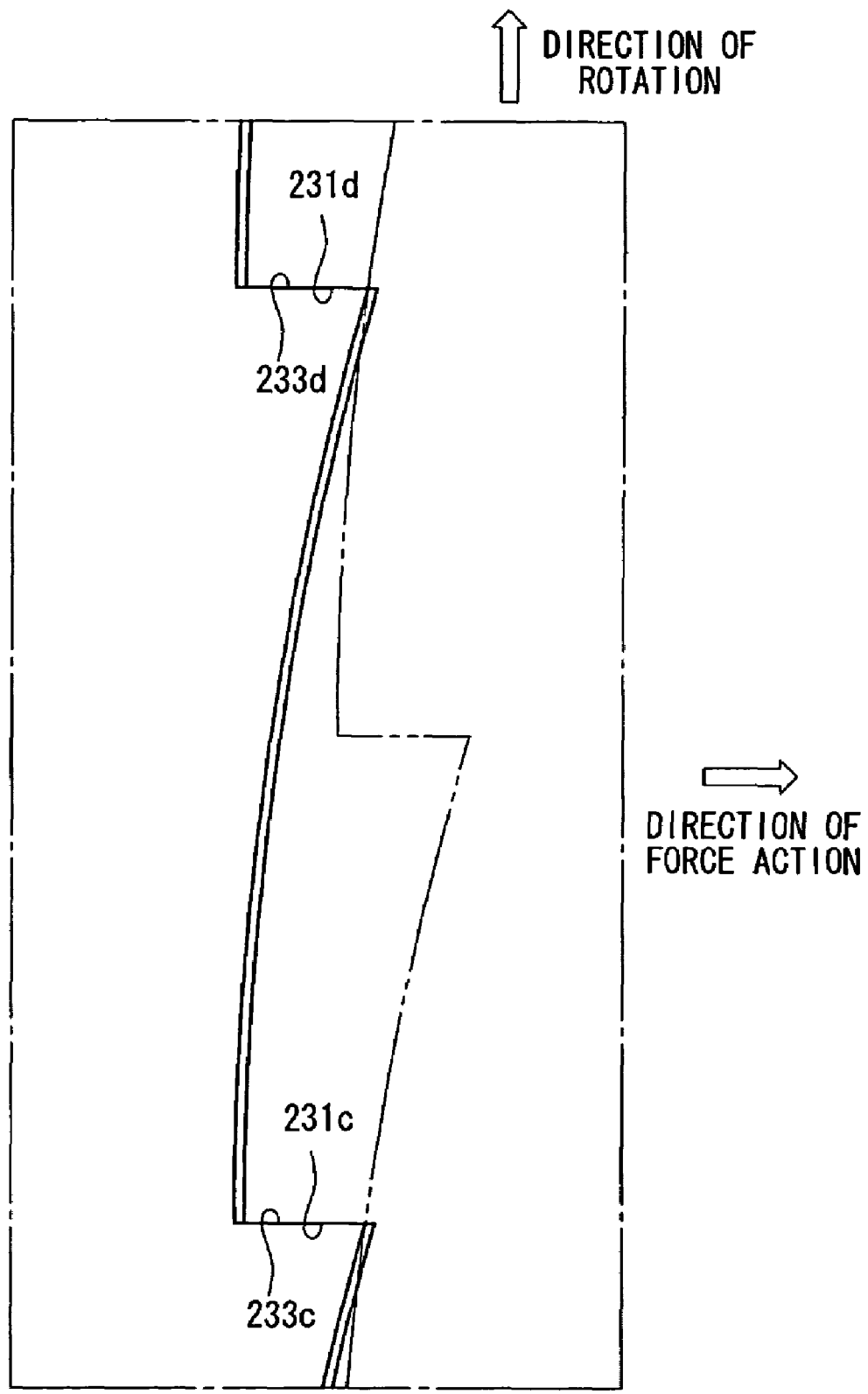
FIG. 50 is a magnified view illustrating a portion at which an internal gear clutch and a lock section are meshed with each other with reference to FIG. 44.

A plurality of internal gear lock receiving sections 230a to 230d, 231a to 231d, which protrude and curved, are formed at ends of the cylindrical internal gear 220. As shown in FIG. 50, the internal gear lock receiving sections 230a to 230d, 231a to 231d have projecting shapes to depict curves in the circumferential direction corresponding to the lock sections 232a to 232d, 233a to 233d. The internal gear lock receiving sections 230a to 230d, 231a to 231d and the lock sections 232a to 232d, 233a to 233d function as an internal gear lock mechanism.

Figure 37:
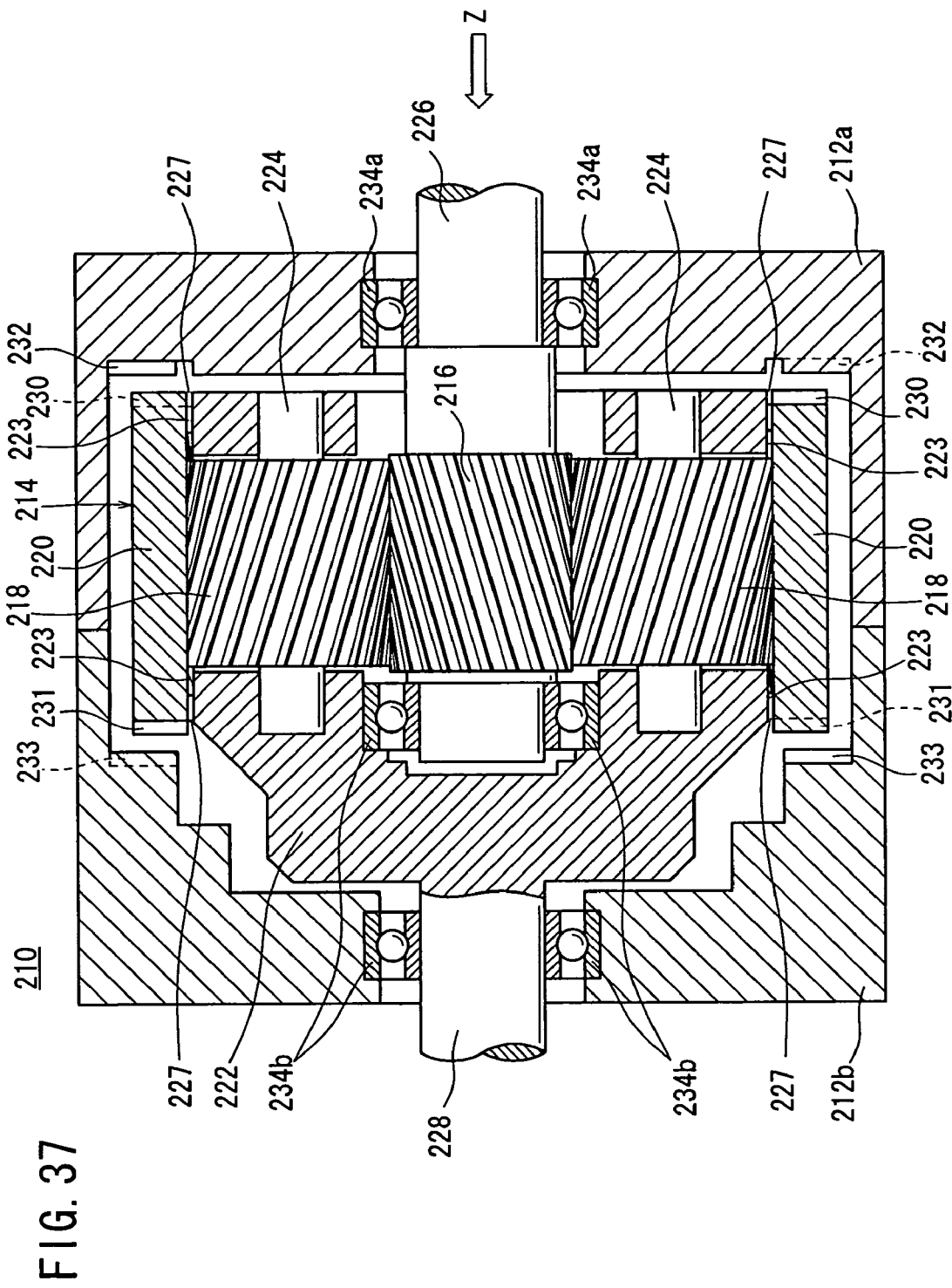
FIG. 37 is a longitudinal sectional view taken in the axial direction of the first automatic speed reducing ratio-switching apparatus.

When the input shaft 226, the internal gear 220, and the carrier 222 constructed as described above are assembled, then the input shaft 226 is firstly inserted into the bearing section 234a of the housing 212a, the output shaft 228 is inserted into the bearing section 234b of the housing 212b, and the internal gear 220 is fitted on the outer side of the carrier 222. The housing 212a and the housing 212b are joined to one another so that the sun gear 216 of the input shaft 226 is meshed with the planet gears 218a, 218b, 218c, followed by being screwed. Accordingly, the planetary gear mechanism 214 is accommodated in the housings 212a, 212b (see FIG. 37).

Next, an explanation will be made about the operation of the first automatic speed reducing ratio-switching apparatus 210.

At first, the unillustrated rotary driving source is energized, and the rotary driving force of the rotary driving source is transmitted via the input shaft 226 to the sun gear 216. It is assumed that the rotary driving force rotates the input shaft 226 and the sun gear 216 in the clockwise direction as viewed in the direction directed from the input shaft 226 to the output shaft 228 (direction of the arrow Z shown in FIG. 37).

Figure 42:
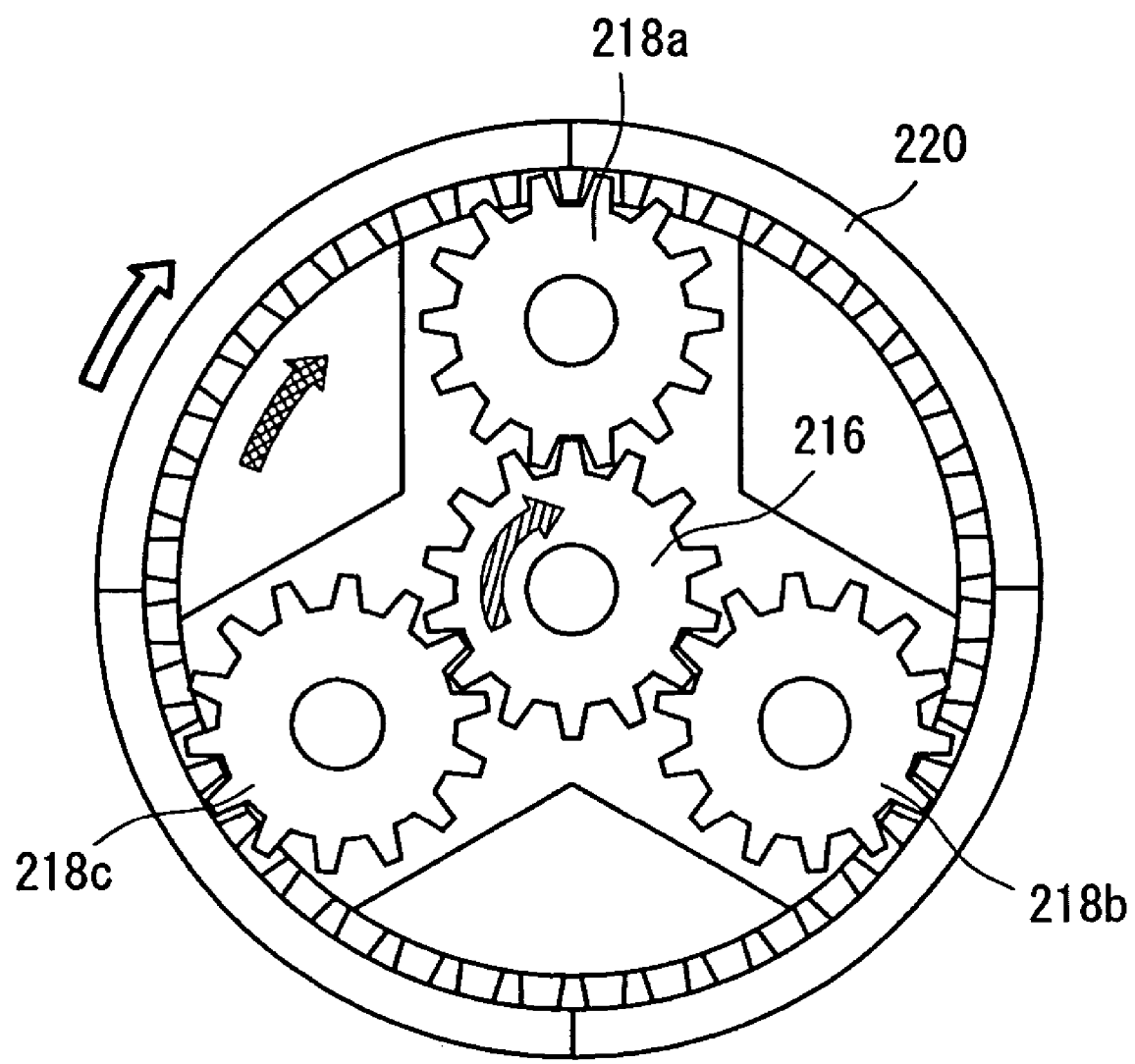
FIG. 42 is a plan view illustrating the directions of rotation of a sun gear, the planet gears, and the internal gear in a state of high speed rotation.

When the rotational force at a low load is transmitted to the input shaft 226, then the planet gears 218a, 218b, 218c make revolution (indicated by the direction of the meshed arrow, similarly indicated in the following description as well) without making rotation, the internal gear 220 also makes revolution in the direction of the arrow (indicated by the direction of the bold arrow, similarly indicated in the following description as well), and the carrier 222 also makes revolution in an integrated manner in the clockwise direction (see FIG. 42). This is because the viscous resistance member is used among the sun gear 216, the planet gears 218a, 218b, 218c, the inner section 223, and the internal gear 220, and hence the static frictional force is exerted by the viscous resistance of the viscous resistance member.

That is, with reference to FIG. 42, when the sun gear 216 is rotated in the direction of the arrow (indicated by the direction of the hatched arrow, similarly indicated in the following description as well), the static frictional force is exerted by the viscous resistance member between the inner section 223 and the internal gear 220 because of the low rotation. Consequently, the inner section 223, the internal gear 220, the planet gears 218a, 218b, 218c, and the sun gear 216 are rotated in an integrated manner.

Subsequently, when the load, which exceeds a preset torque, is applied to the carrier 222 via the output shaft 228, then the sun gear 216 is rotated, the planet gears 218a, 218b, 218c make no revolution but make rotation thereby in the counterclockwise direction (direction of the blank arrow) opposite to the direction of the sun gear 216, and the internal gear 220, which is meshed with the planet gears 218, is rotated in the counterclockwise direction (see FIG. 43). That is, when the rotation speed is lowered by the load applied to the output shaft 228, the rotation speed of the carrier 222 formed integrally with the output shaft 228 is also lowered.

Figure 44:
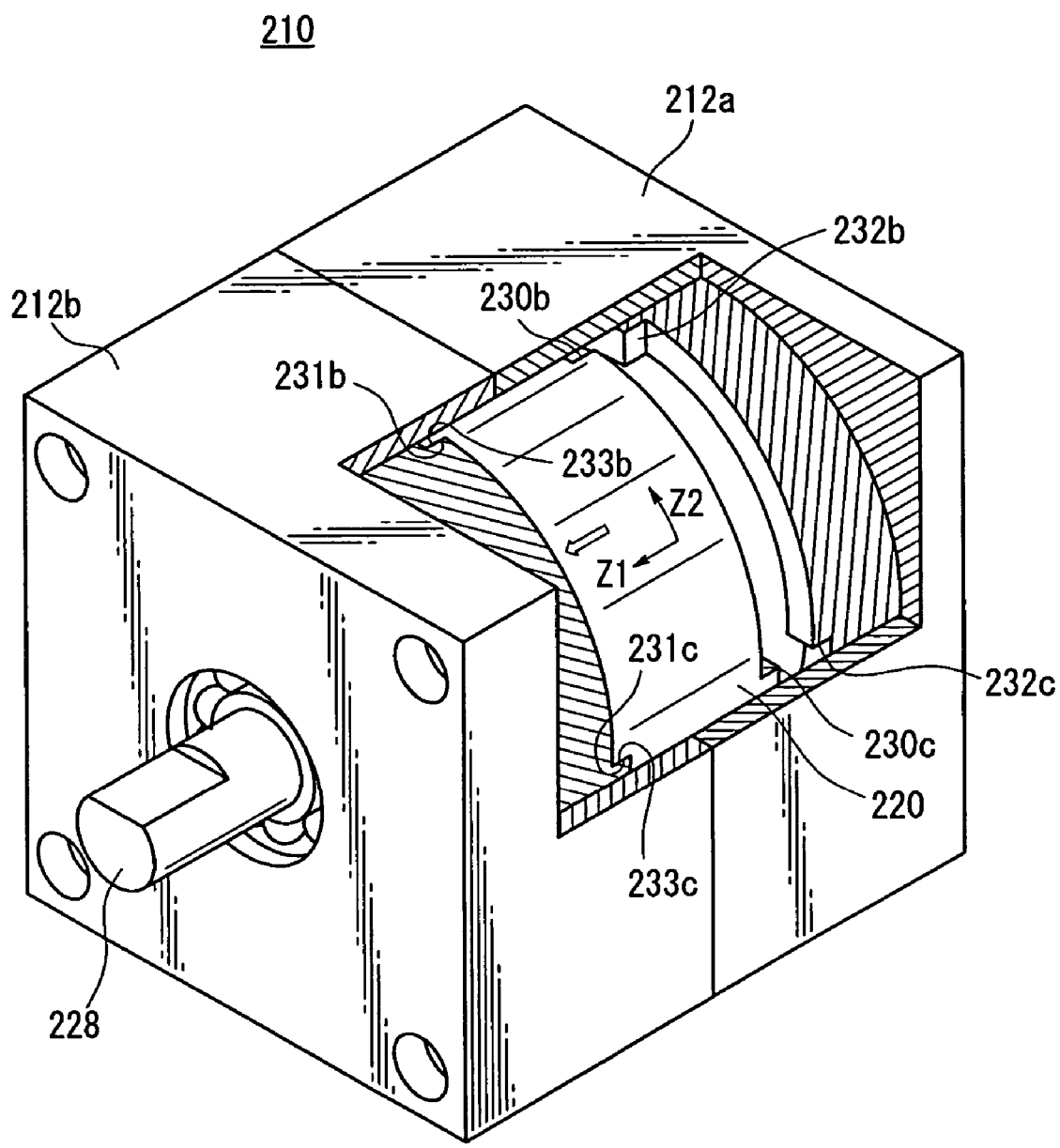
FIG. 44 is, with partial cutout, a perspective view illustrating a locked state of the first automatic speed reducing ratio-switching apparatus.

However, the internal gear 220 intends to make rotation as exactly as it did. In other words, the rotation speed of the internal gear 220 is higher than the rotation speed of the carrier 222. Therefore, the viscous resistance is increased between the internal gear 220 and the carrier 222. As the viscous resistance is increased as described above, the thrust force is generated in the direction of stripes of teeth, and the internal gear 220 is moved in the direction of the arrow Z1 as shown in FIG. 44, because the planet gears 218a, 218b, 218c and the internal gear 220 meshed therewith are the helical gears.

Figure 45:
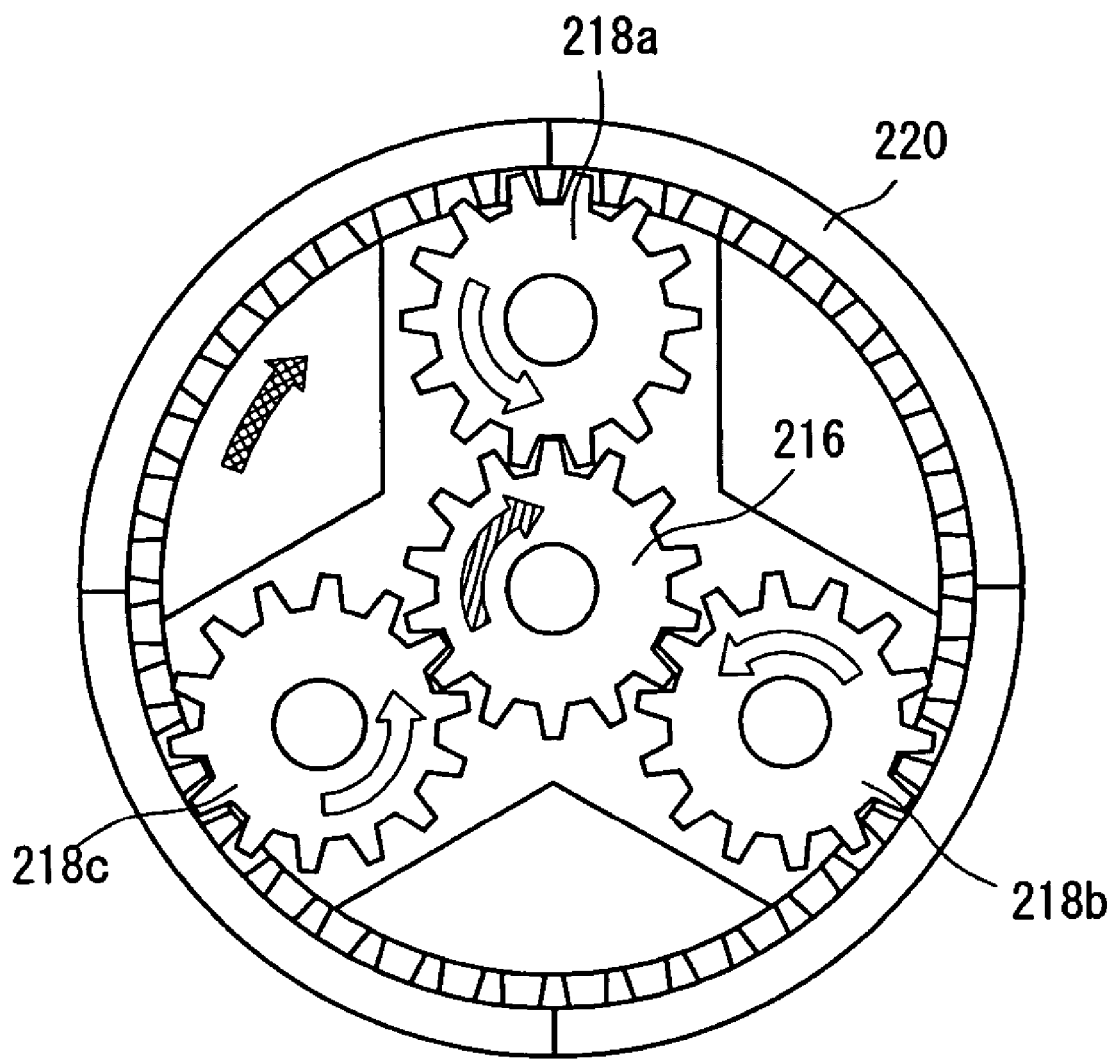
FIG. 45 is a plan view illustrating the directions of rotation of the sun gear, the planet gears, and the internal gear in the locked state as described above.

As a result, the internal gear lock receiving section 231b is meshed with the lock section 233b, and the internal gear lock receiving section 231c is meshed with the lock section 233c. The internal gear 220 is in the locked state, making it impossible to move any further. When the internal gear 220 is in the locked state, then the sun gear 216 makes rotation in the direction of the hatched arrow shown in FIG. 42, and thus the planet gears 218a, 218b, 218c make revolution together with the carrier 222 (see FIG. 45) while making rotation in the counterclockwise direction to transmit the decelerated rotation speed and the increased torque to the output shaft 228. In this situation, the torque corresponds to the force corresponding to the gear ratio between the planet gears 218a, 218b, 218c and the internal gear 220.

Figure 46:
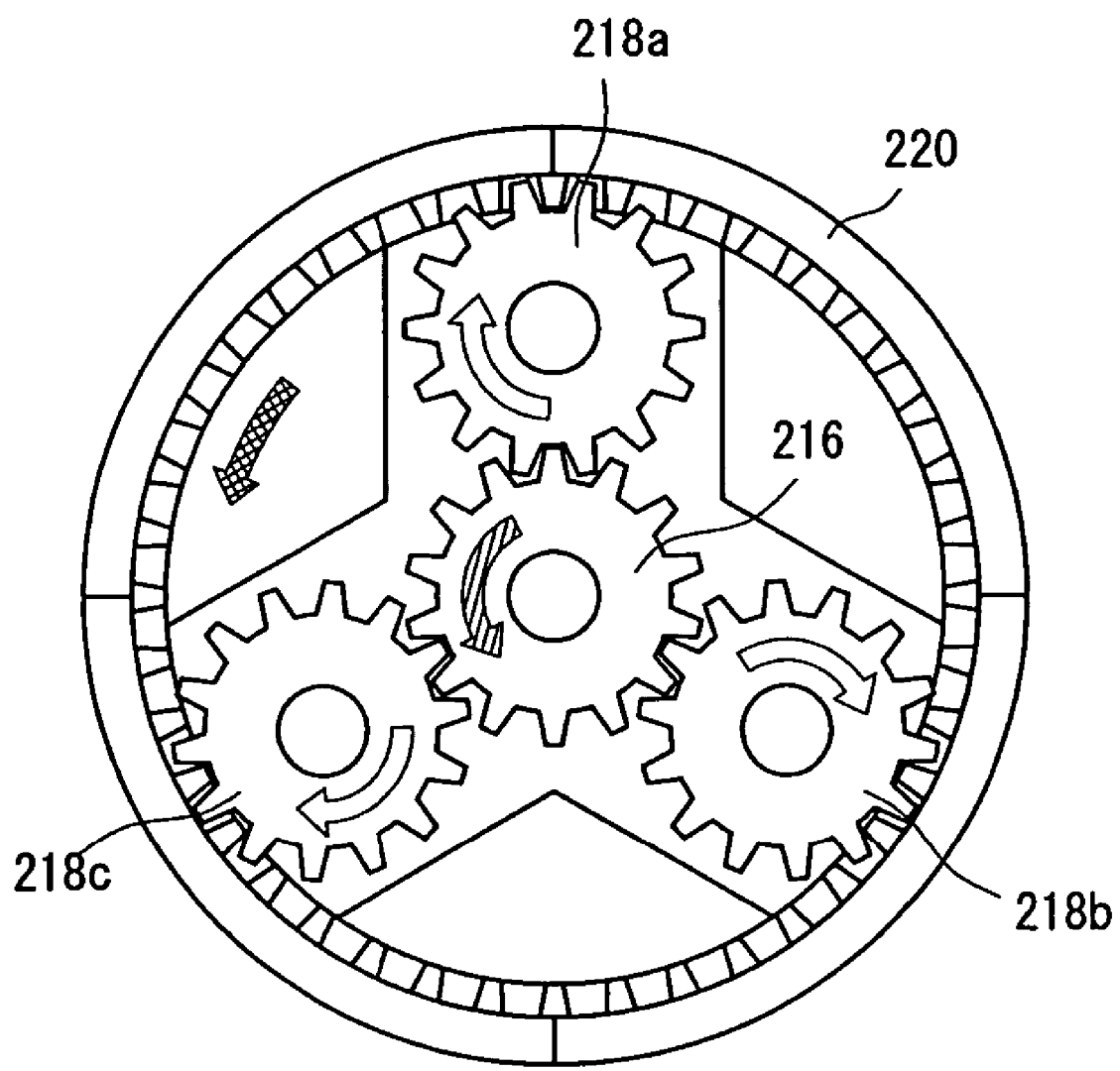
FIG. 46 is a plan view illustrating the directions of rotation of the sun gear, the planet gears, and the internal gear immediately after reversing the sun gear.

Subsequently, the rotary driving direction is reversed in order to release the internal gear 220 from the locked state. That is, the sun gear 216 is rotated in the counterclockwise direction by the input shaft 226. As a result, as shown in FIG. 46, the planet gears 218a, 218b, 218c make revolution in the counterclockwise direction together with the carrier 222 while making rotation in the clockwise direction in accordance with the rotation of the sun gear 216.

The internal gear 220 is in the locked state, i.e., in the stopped state immediately after the start of the rotation of the sun gear 216 in the counterclockwise direction. Therefore, the difference in the number of relative rotations appears between the carrier 222 and the internal gear 220, and thus the viscous resistance is increased between the internal gear 220 and the inner section 223. Owing to the fact that the viscous resistance is increased between the internal gear 220 and the inner section 223 and the planet gears 218a, 218b, 218c and the internal gear 220 are the helical gears respectively, the thrust force is generated in the direction of the stripes of teeth formed helically on the cylindrical surfaces of the gears.

The thrust force causes the internal gear 220 to make parallel displacement in the direction opposite to the Z1 direction. The internal gear 220 makes the parallel displacement in the direction opposite to the Z1 direction while making rotation in the clockwise direction, the internal gear lock receiving sections 230 of the internal gear 220 are separated from the lock sections 232 of the housing 212b, and the internal gear 220 is released from the locked state.

Figure 41:
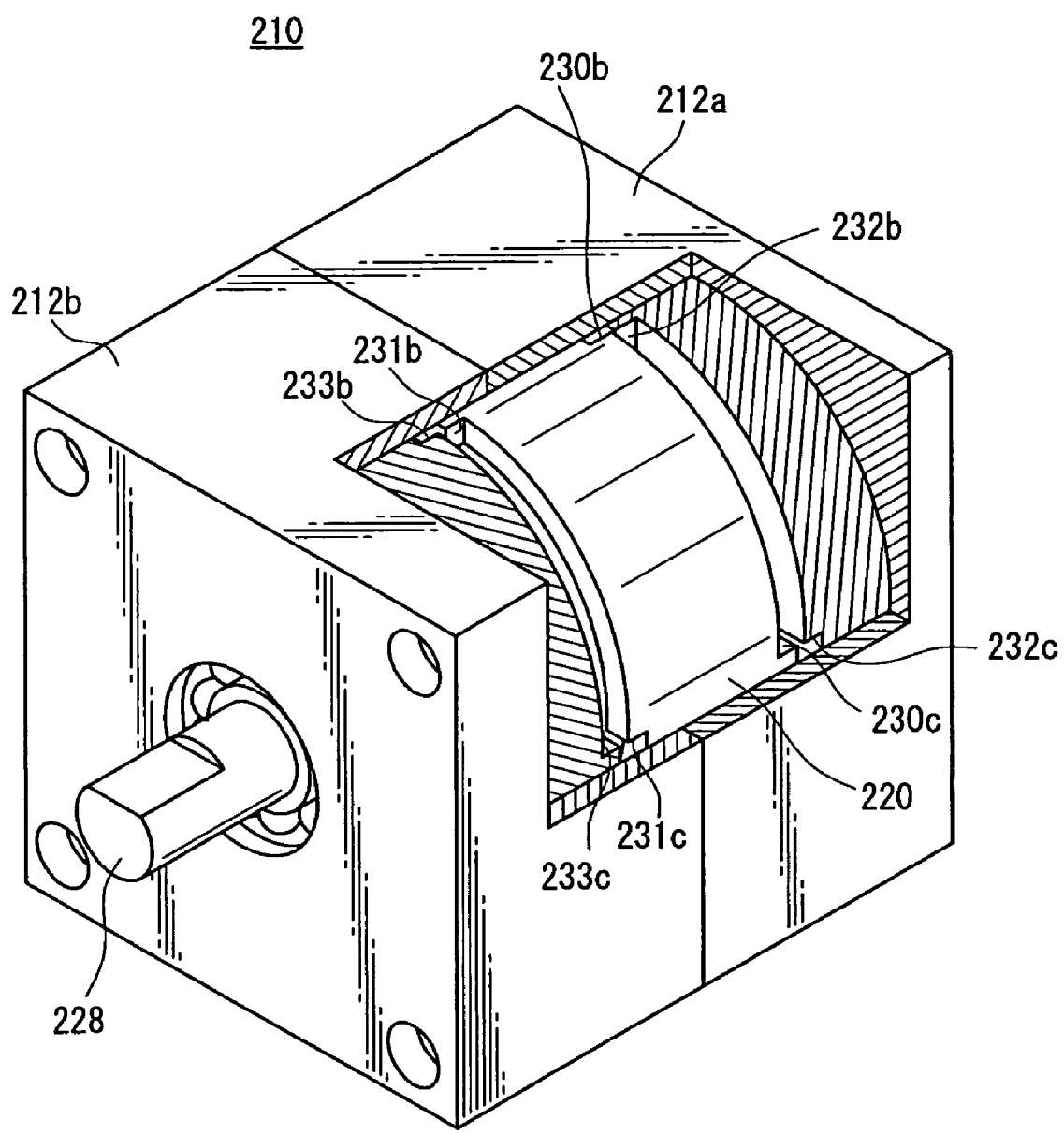
FIG. 41 is, with partial cutout, a perspective view illustrating the first automatic speed reducing ratio-switching apparatus.

As described above, when the internal gear 220 is released from the locked state, the planet gears 218a, 218b, 218c, the internal gear 220, and the carrier 222 make revolution in the counterclockwise direction around the sun gear 216 in an integrated manner again in conformity with the rotation of the sun gear 216 in the counterclockwise direction (see FIG. 47) to make restoration to the initial position shown in FIG. 41.

That is, when the sun gear 216 is rotated at a high speed in the counterclockwise direction after the internal gear 220 is released from the locked state, then the planet gears 218a, 218b, 218c make revolution in the counterclockwise direction without causing rotation thereof, and the internal gear 220 make rotation in the counterclockwise direction as well.

The foregoing case is illustrative of the state in which the input shaft 226 and the sun gear 216 are rotated in the clockwise direction. However, the same or equivalent operation and effect are also achieved when the input shaft 226 and the sun gear 216 are rotated in the counterclockwise direction.

Figure 48:
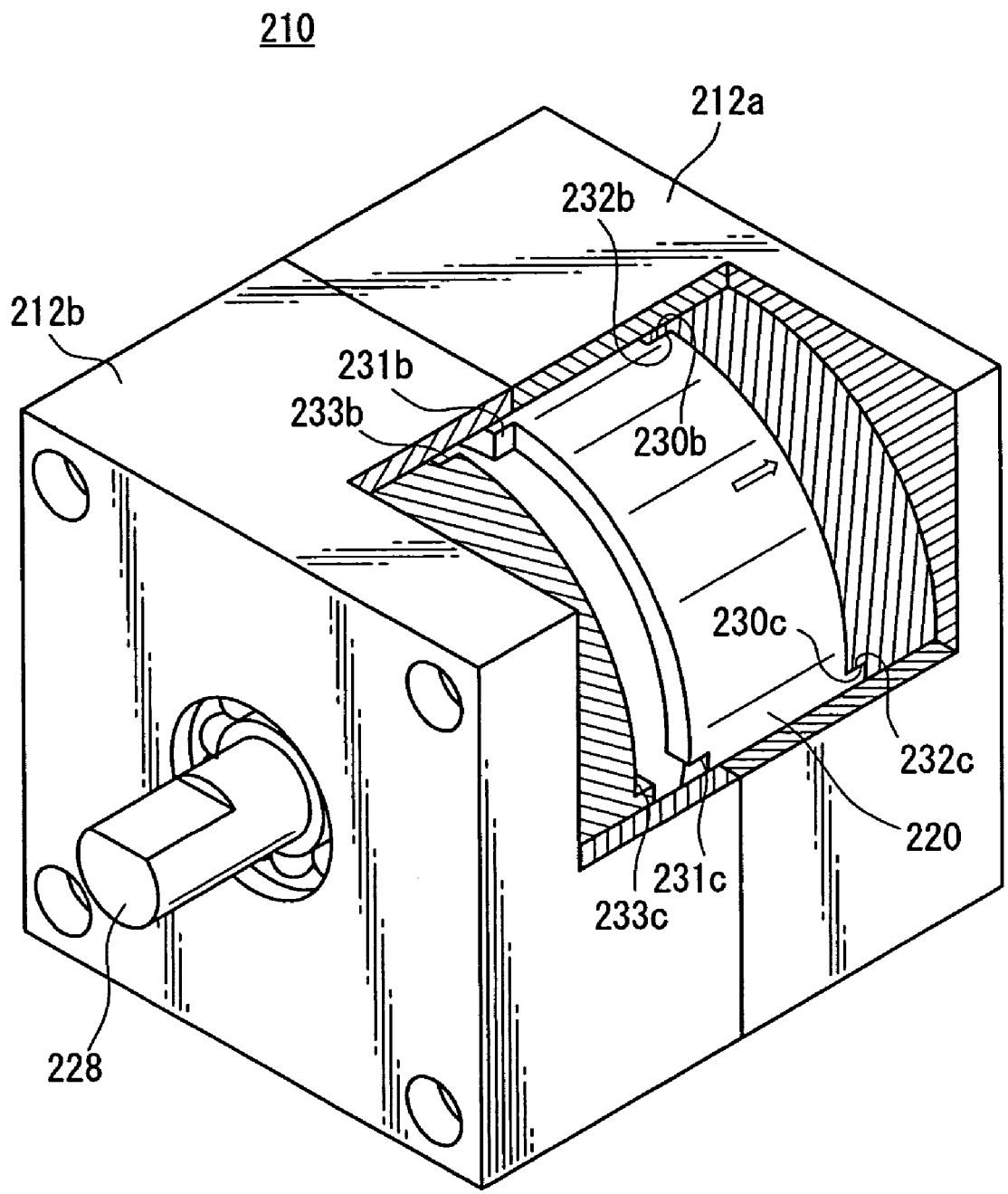
FIG. 48 is, with partial cutout, a perspective view illustrating the locked state of the first automatic speed reducing ratio-switching apparatus.

That is, when the input shaft 226 and the sun gear 216 are rotated in the counterclockwise direction, and the load, which exceeds the preset torque, is applied to the carrier 222 via the output shaft 228 in this state, then the internal gear lock receiving section 230b is meshed with the lock section 232b, the internal gear lock section 230c is meshed with the lock section 232c, and the internal gear 220 is in the locked state as shown in FIG. 48. Further, when the rotary driving force is reversed to rotate the sun gear 216 in the clockwise direction by the input shaft 226, the internal gear 220 is released from the locked state to make restoration to the initial state shown in FIG. 41.

On the other hand, when the internal gear 220 is in the locked state as shown in FIG. 44, the internal gear 220 can be released from the locked state by decreasing the load applied to the output shaft 228.

Figure 49:
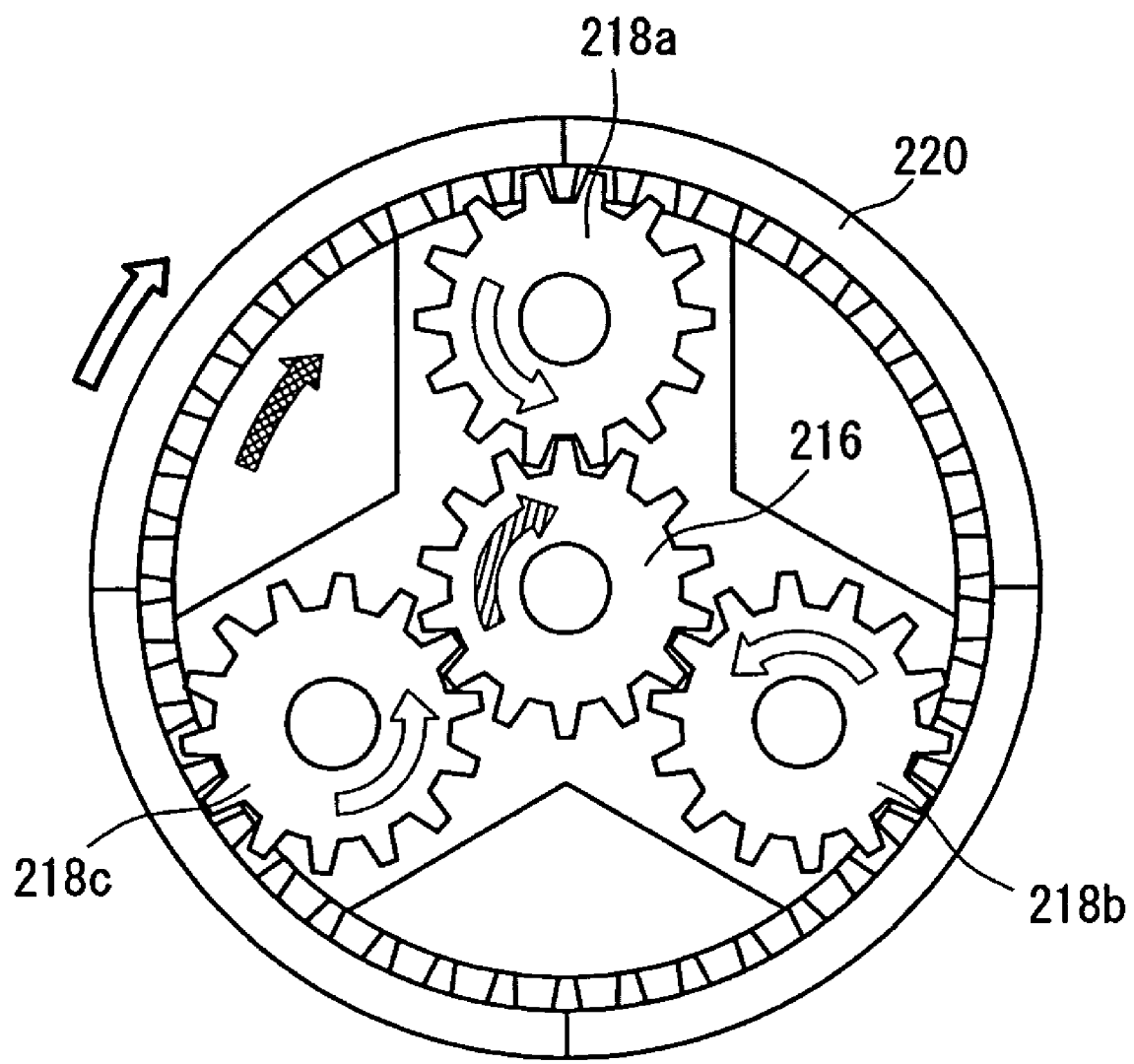
FIG. 49 is a plan view illustrating the directions of rotation of the sun gear, the planet gears, and the internal gear in a state in which the load on the output shaft is decreased with reference to FIG. 44.

That is, in the state in which the load on the output shaft 228 is decreased, the planet gears 218a, 218b, 218c make revolution in the clockwise direction together with the carrier 222 while making rotation in the counterclockwise direction in accordance with the rotation of the sun gear 216 in the clockwise direction, and the internal gear 220, which is meshed with the planet gears 218a, 218b, 218c, is rotated in the clockwise direction (see FIG. 49).

In this state, the rotation speed of the internal gear 220 becomes smaller than the rotation speed of the carrier 222 due to the viscous resistance member disposed between the internal gear 220 and the inner section 223, and the difference in the number of relative rotations appears between the carrier 222 and the internal gear 220. As a result, the viscous resistance is increased between the internal gear 220 and the inner section 223. Owing to the fact that the viscous resistance is increased between the internal gear 220 and the inner section 223 and the planet gears 218 and the internal gear 220 are the helical gears, the thrust force is generated in the direction of the stripes of teeth formed helically on the cylindrical surfaces of the gears.

Further, as shown in FIG. 50, each of the internal gear lock receiving section 231c and the lock section 233c has such a shape that a curve is depicted in the circumferential direction. Therefore, when the internal gear 220 is rotated in the clockwise direction, then the force is exerted together with the thrust force in the direction opposite to the Z1 direction, and the internal gear 220 makes parallel displacement.

That is, the internal gear 220 makes the parallel displacement in the direction opposite to the Z1 direction while making rotation in the clockwise direction, the internal gear lock receiving sections 231a to 231d are separated from the lock sections 233a to 233d, and the internal gear 220 is released from the locked state.

In the first automatic speed reducing ratio-switching apparatus 210, the helical gears are used for the sun gear 216, the planet gears 218a, 218b, 218c, and the internal gear 220, and the viscous resistance member is provided between the internal gear 220 and the inner section 223 provided for the carrier 222. Accordingly, when the load, which exceeds the preset torque, is applied to the carrier 222, the internal gear 220 makes the parallel displacement in the direction toward the input shaft 226 or the direction toward the output shaft 228 on the basis of the difference in the relative rotation speed between the internal gear 220 and the carrier 222. Thus, it is possible to automatically switch the speed reducing ratio transmitted from the output shaft 228 to the displacement member of the actuator.

When the displacement member of the actuator is once stopped in the outgoing route, and then the displacement member is displaced again in the direction along the outgoing route, then the internal gear 220 can be also released from the locked state with ease, and the speed reducing ratio can be automatically changed. Further, the displacement member of the actuator can be displaced along the outgoing route at the low torque and the high speed.

Next, an explanation will be made with reference to FIGS. 51 to 53 about a pressing apparatus 270 (actuator) incorporated with the first automatic speed reducing ratio-switching apparatus 210.

The pressing apparatus 270 (actuator) is an apparatus for pressing the workpiece W, if necessary. The pressing apparatus 270 (actuator) basically comprises an electric motor 272, an automatic speed reducing unit 274, a fixed speed reducing ratio speed reducing unit 276, a feed screw shaft 278, a movable member 280, a pipe 282, and a guide 284. The movable member 280 and the pipe 282 function as the displacement member of the actuator.

In the pressing apparatus 270, the feed screw shaft 278 is rotated by the automatic speed reducing unit 274 and the fixed speed reducing ratio speed reducing unit 276 under the energizing action of the electric motor 272 as the rotary driving source. A feed nut (not shown) of the movable member 280, which has a screw groove, is guided by the guide 284 and moved in the axial direction of the feed screw shaft 278. The movable member 280 is connected to the pipe 282 which has a pressing section 286 at the forward end to make abutment against the workpiece W in order to press the workpiece W. The pipe 282 has its hollow interior. In this structure, the feed screw shaft 278 is inserted through the hollow interior.

When the electric motor 272 is driven, the rotational force of the electric motor 272 at a low load rotates the sun gear 216. As a result, the planet gears 218a, 218b, 218c, the internal gear 220, and the carrier 222 make revolution around the sun gear 216 in an integrated manner in the clockwise direction (see FIG. 42). Accordingly, the rotation, which corresponds to the number of rotations of the input shaft 226, is transmitted to the output shaft 228 to cause the high speed rotation. The rotation is transmitted from the output shaft 228 via the fixed speed reducing ratio speed reducing unit 276 to rotate the feed screw shaft 278. The feed nut of the movable member 280, which has the screw groove, is guided by the guide 284 and moved in the axial direction of the feed screw shaft 278. Accordingly, the pressing section 286 is displaced at a high speed from the initial position shown in FIG. 51 toward the workpiece W (see FIG. 52).

Figure 53:
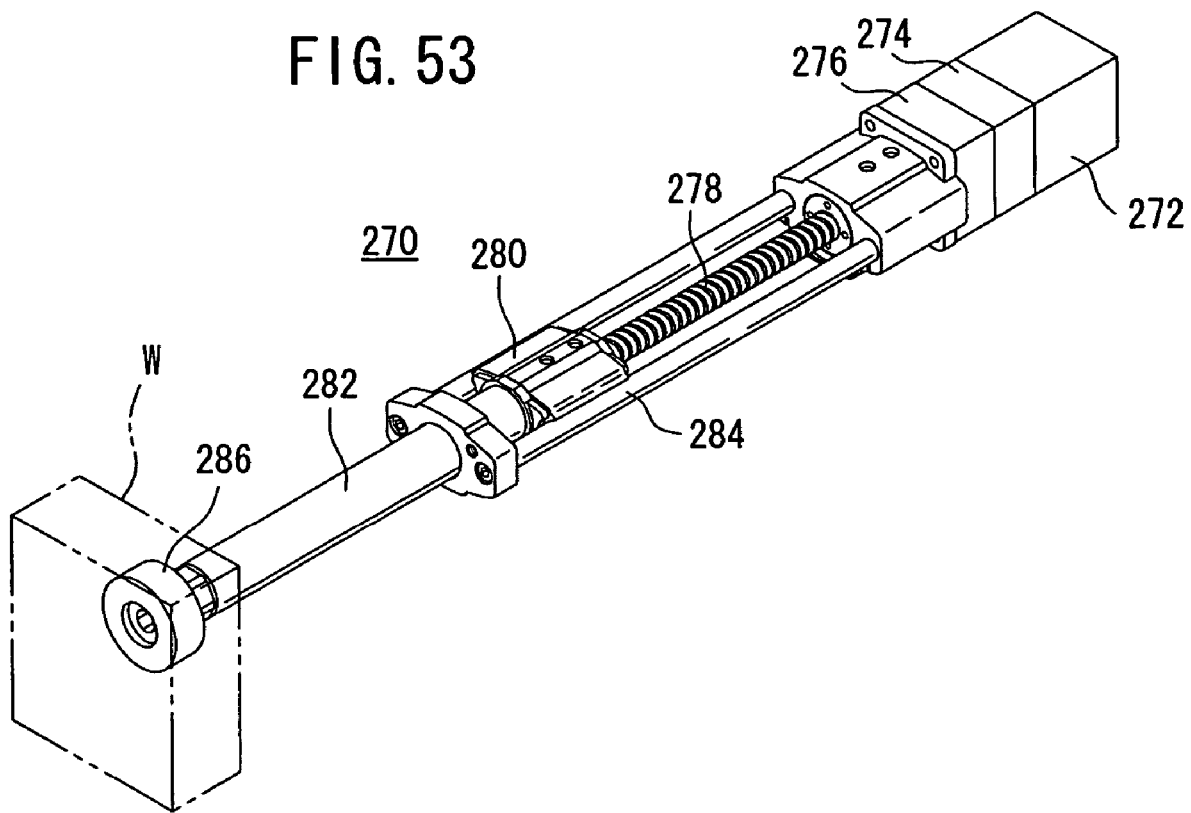
FIG. 53 is a perspective view illustrating a state in which the displacement member of the actuator abuts against the workpiece.

As shown in FIG. 53, the displacing pressing section 286 abuts against the workpiece W, and the load, which exceeds a preset torque, is applied from the pressing apparatus 270 via the output shaft 228 to the carrier 222. In this situation, the sun gear 216 is rotated, and thus the planet gears 218a, 218b, 218c make rotation in the counterclockwise direction which is opposite to the direction of the sun gear 216, while the planet gears 218a, 218b, 218c do not make revolution. The internal gear 220, which is meshed with the planet gears 218a, 218b, 218c, is rotated in the counterclockwise direction (see FIG. 43). As a result, the thrust force acts on the internal gear 220, and the internal gear 220 makes parallel displacement in the Z1 direction.

As a result of the parallel displacement of the internal gear 220 in the Z1 direction, as shown in FIG. 44, the internal gear lock receiving section 231b is meshed with the lock section 233b, the internal gear lock receiving section 231c is meshed with the lock section 233c, and the internal gear 220 is in the locked state. When the internal gear 220 is in the locked state, then the planet gears 218 make revolution in the clockwise direction together with the carrier 222 while making rotation in the counterclockwise direction in accordance with the rotation of the sun gear 216 (see FIG. 45), and the increased torque is transmitted via the output shaft 228 to the pressing section 286 of the pressing apparatus 270. Accordingly, the workpiece W is pressed by the pressing section 286 (see FIG. 53). Accordingly, the pressing processing is performed for the workpiece W, and/or the operation for moving the position of the workpiece W is performed.

The speed reducing ratio, which is obtained in the locked state of the internal gear 220, is represented by $1/(1+Z(C)/Z(A))$ provided that $Z(A)$ represents the number of teeth of the sun gear 216, and $Z(C)$ represents the number of teeth of the internal gear 220. The output torque, which is derived from the output shaft 228, is $(1+Z(C)/Z(A))$ times as large as the input torque introduced from the input shaft 226. For example, when the number of teeth of the sun gear 216 is 12, and the number of teeth of the internal gear 220 is 66, then the 6.5-fold high torque is obtained.

When the polarity of the current supplied to the electric motor 272 is reversed after the workpiece W is pressed by the pressing section 286 as described above, the sun gear 216 is rotated in the counterclockwise direction by the input shaft 226. The planet gears 218a, 218b, 218c make revolution in the counterclockwise direction together with the carrier 222 while making rotation in the clockwise direction in accordance with the rotation of the sun gear 216 (see FIG. 46).

As a result, the thrust force acts on the internal gear 220. The internal gear 220 makes parallel displacement in the direction opposite to the Z1 direction while making rotation in the clockwise direction. The internal gear lock receiving sections 230 of the internal gear 220 are separated from the lock sections 232 of the housing 212b, and the internal gear 220 is released from the locked state.

Figure 47:
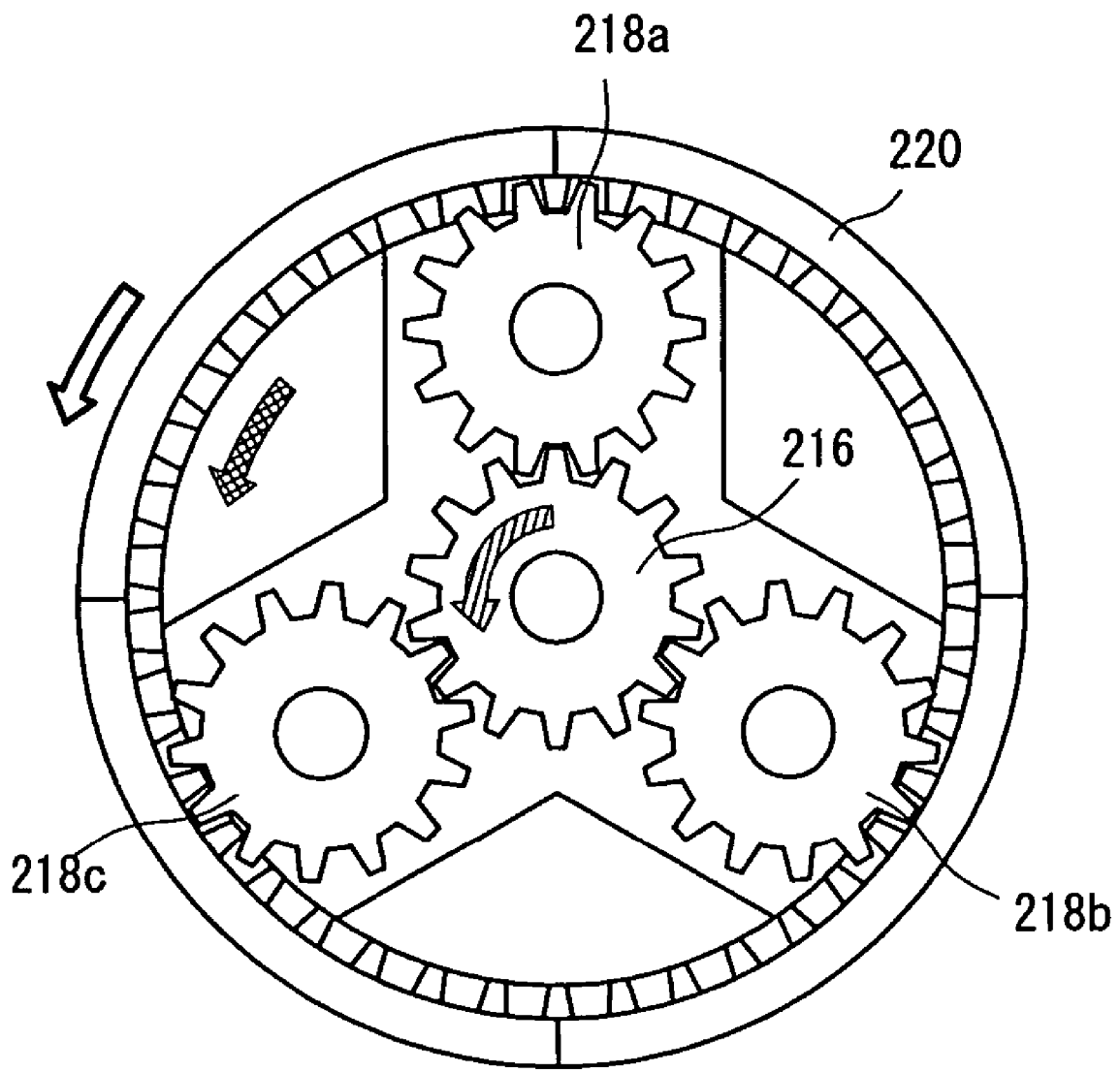
FIG. 47 is a plan view illustrating the directions of rotation of the sun gear, the planet gears, and the internal gear in a state in which the sun gear is reversed and rotated at a high speed.

When the internal gear 220 is released from the locked state, the planet gears 218a, 218b, 218c, the internal gear 220, and the carrier 222 again make revolution in the counterclockwise direction around the sun gear 216 in an integrated manner in conformity with the rotation of the sun gear 216 in the counterclockwise direction (see FIG. 47).

As a result, the rotation speed, which corresponds to the input shaft 226, is directly transmitted to the output shaft 228 to cause the high speed rotation. The pressing section 286 is moved at a high speed while being guided by the guide 284 in the direction to make separation from the workpiece W. Thus, it is possible to make restoration to the initial position shown in FIG. 51.

According to the first automatic speed reducing ratio-switching apparatus 210, when the load, which exceeds the preset torque, is applied from the actuator via the output shaft 228 to the carrier 222, the internal gear 220, which has been rotated in the same direction of rotation as that of the sun gear 216, is rotated in the direction different from that of the sun gear 216. Accordingly, the internal gear lock receiving sections 230a to 230d, 231a to 231d are meshed with the lock sections 232a to 232d, 233a to 233d, the rotation of the internal gear 220 is stopped, and the internal gear 220 is locked. When the internal gear 220 is in the locked state, then the speed reducing ratio, which is transmitted via the output shaft 228, is automatically switched, and the displacement member of the actuator is displaced at the high torque and the low speed.

On the other hand, in order that the displacement member changes the displacement direction from the outgoing route to the returning route, the polarity of the current of the rotary driving source is reversed. By doing so, the sun gear 216 is reversed as described above, and the internal gear 220 is released from the locked state. Therefore, the speed reducing ratio, which is transmitted from the output shaft 228 to the displacement member for constructing the actuator, is automatically switched. The displacement member can be displaced along the returning route at the low torque and the high speed.

A viscous coupling section 236, which functions as an internal resistance, may be provided between the output shaft 228 and the carrier 222 in order to efficiently transmit the rotation speed and the torque to the output shaft 228 even when the number of rotations of the output shaft 228 is smaller than the number of rotations of the input shaft 226, and the difference between the number of rotations of the input shaft 226 and the number of rotations of the output shaft 228 becomes large in the first automatic speed reducing ratio-switching apparatus 210.

Figure 54:
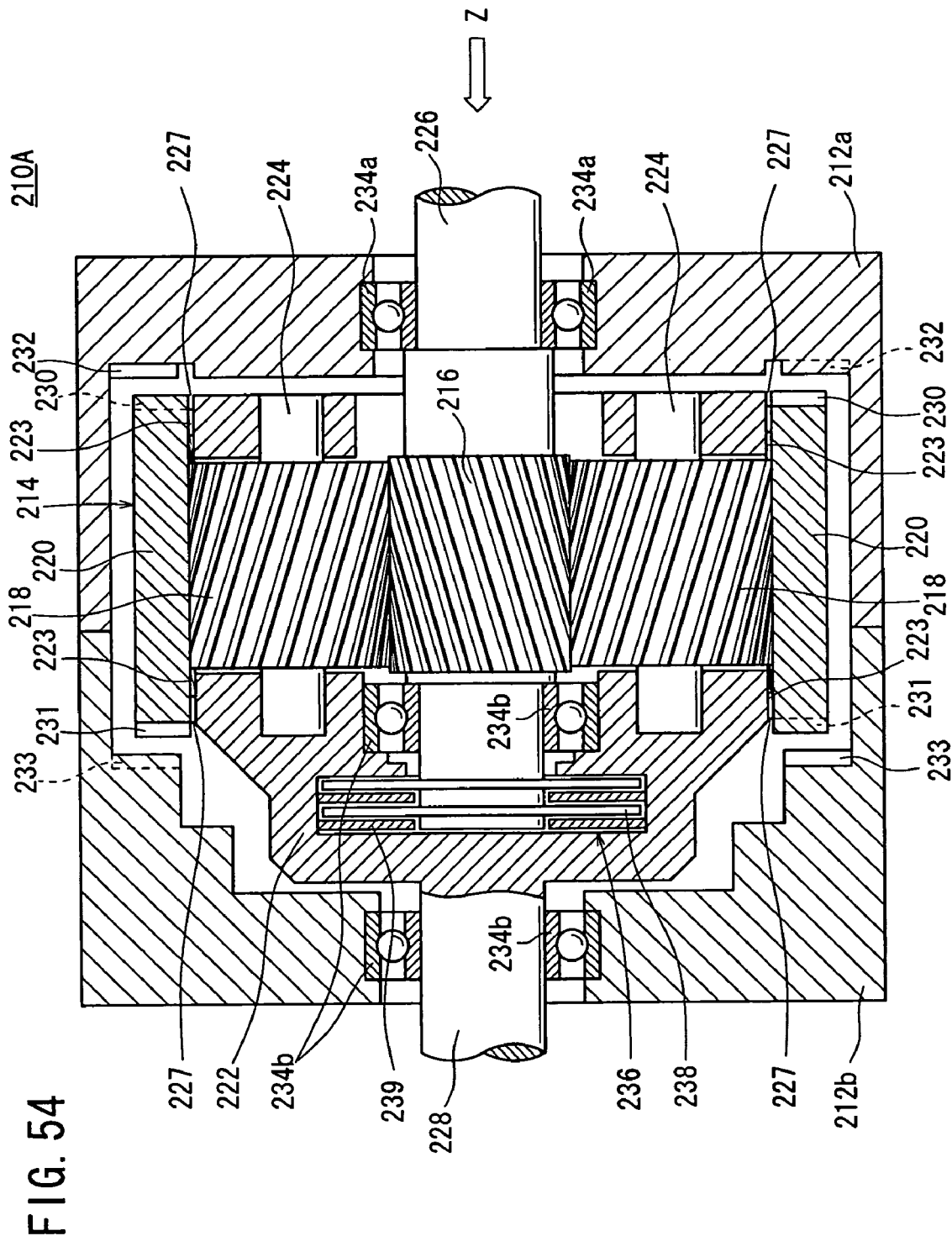
FIG. 54 is a longitudinal sectional view illustrating a second automatic speed reducing ratio-switching apparatus having a viscous coupling section provided for the first automatic speed reducing ratio-switching apparatus.

A second automatic speed reducing ratio-switching apparatus 210A provided with the viscous coupling section 236 is shown in FIG. 54. In the second automatic speed reducing ratio-switching apparatus 210A, the viscous coupling section 236 is provided on the side of the carrier 222.

The viscous coupling section 236 includes a plurality of disks 238 which have central holes and which are stacked while being separated from each other by predetermined spacing distance on the output shaft 228. Disks 239, which are provided integrally with the carrier 222, are interposed between the plurality of disks 238 which are separated from each other. For example, the space between the plurality of disks 238, 239 is charged with oil or grease having a high viscosity.

Figure 55:
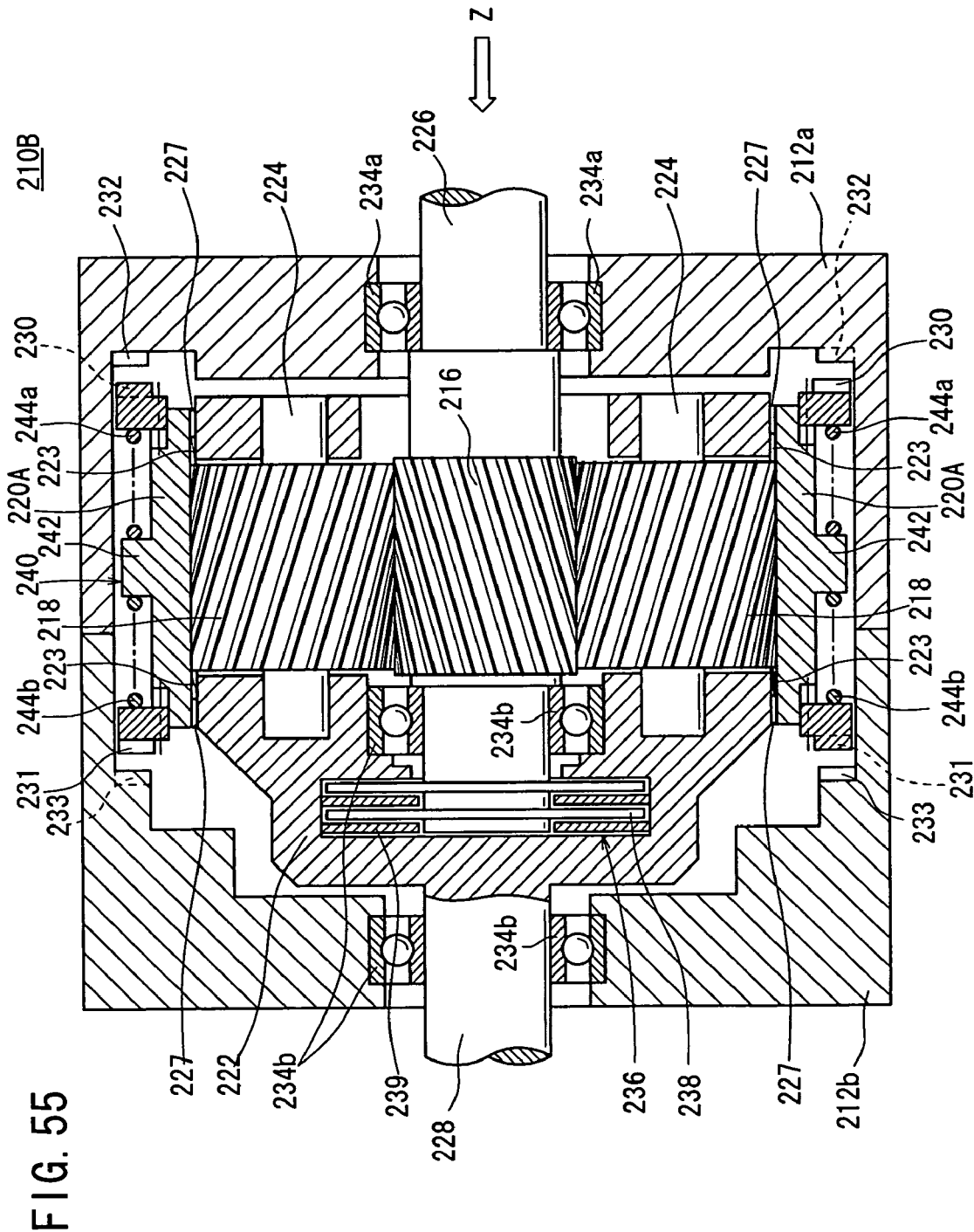
FIG. 55 is a longitudinal sectional view illustrating a third automatic speed reducing ratio-switching apparatus.

Next, a third automatic speed reducing ratio-switching apparatus 210B is shown in FIG. 55. In the third automatic speed reducing ratio-switching apparatus 210B, an internal gear lock release mechanism 240 is provided on the outer circumferential end surface of an internal gear 220A as compared with the second automatic speed reducing ratio-switching apparatus 210A.

Figure 56:
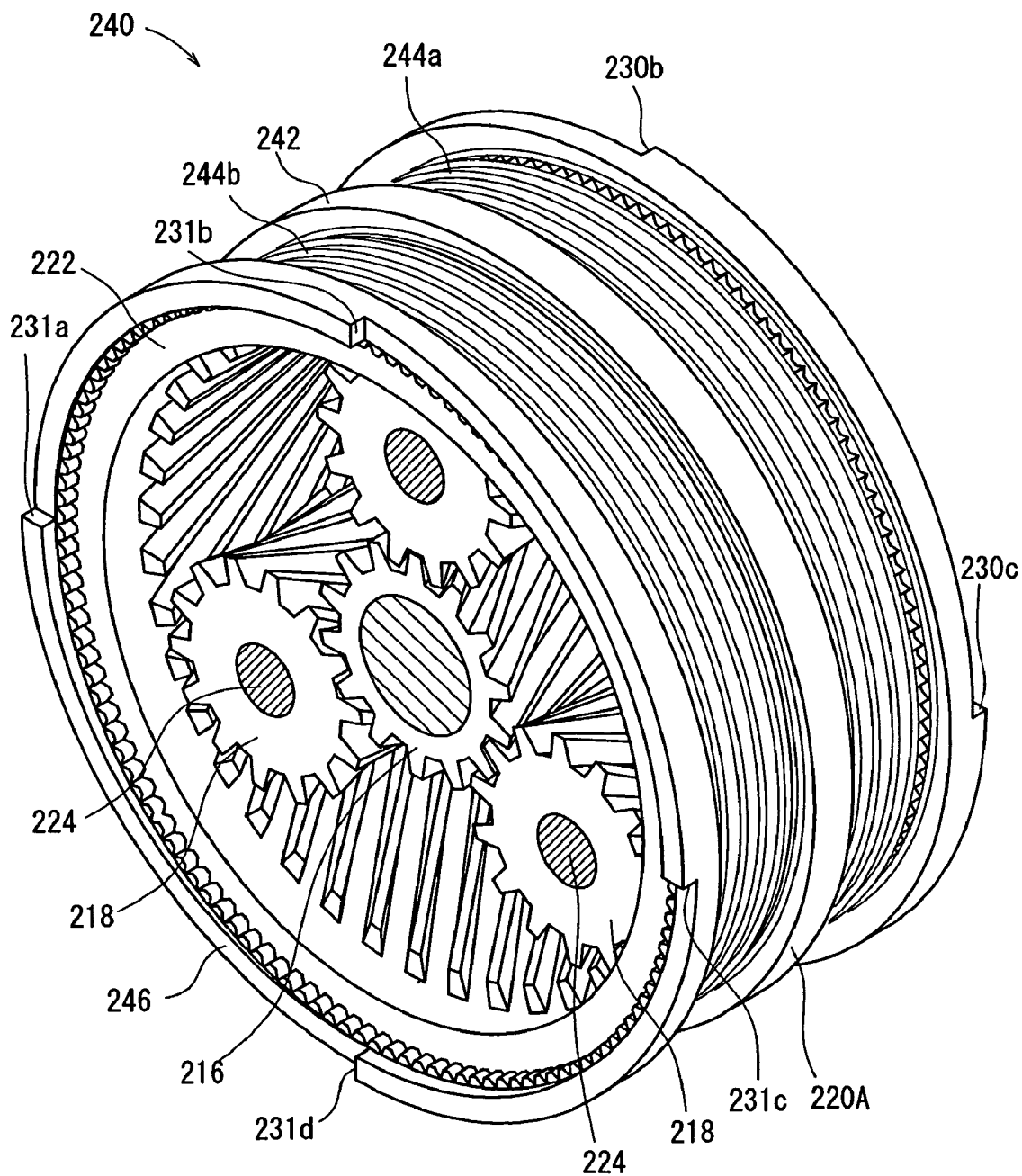
FIG. 56 is a magnified perspective view illustrating an internal gear lock release mechanism provided for the third automatic speed reducing ratio-switching apparatus.

As also shown in FIG. 56, the internal gear lock release mechanism 240 comprises a spring attachment section 242, springs 244a, 244b, and internal gear lock receiving sections 230a to 230d, 231a to 231d.

Grooves are formed on the outer circumferential surface of the internal gear 220A while interposing the spring attachment section 242 which is provided annularly at a substantially central position in the axial direction. The springs 244a, 244b are wound helically around the grooves. Further, the plurality of internal gear lock receiving sections 230a to 230d, 231a to 231d, which protrude respectively, are formed at the cylindrical ends of the internal gear 220. In the third automatic speed reducing ratio-switching apparatus 210B, the springs 244a, 244b are used. However, there is no limitation to the spring members provided that elastic members are used. For example, it is also possible to use rubber or the like. A magnet may be used as the internal gear lock release mechanism 240 in order to secure the function equivalent to that of the elastic force of the elastic member.

Figure 51:
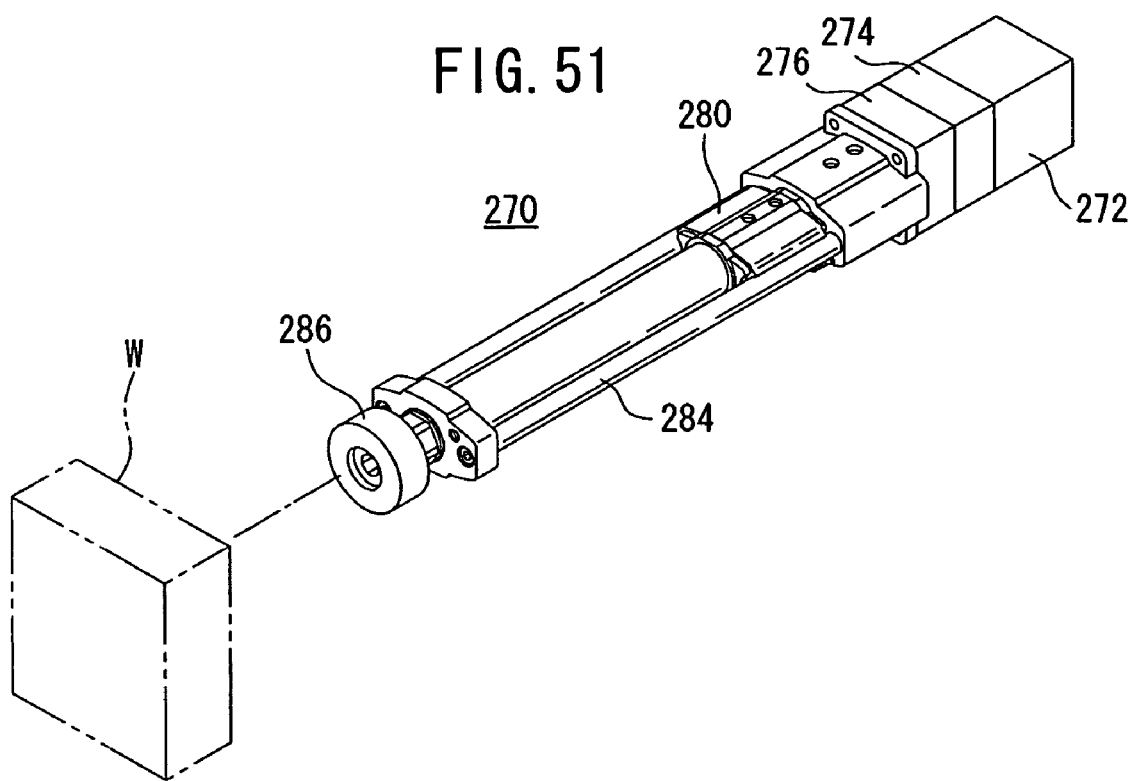
FIG. 51 is a perspective view illustrating a state in which a displacement member of an actuator is disposed at the initial position.
Figure 52:
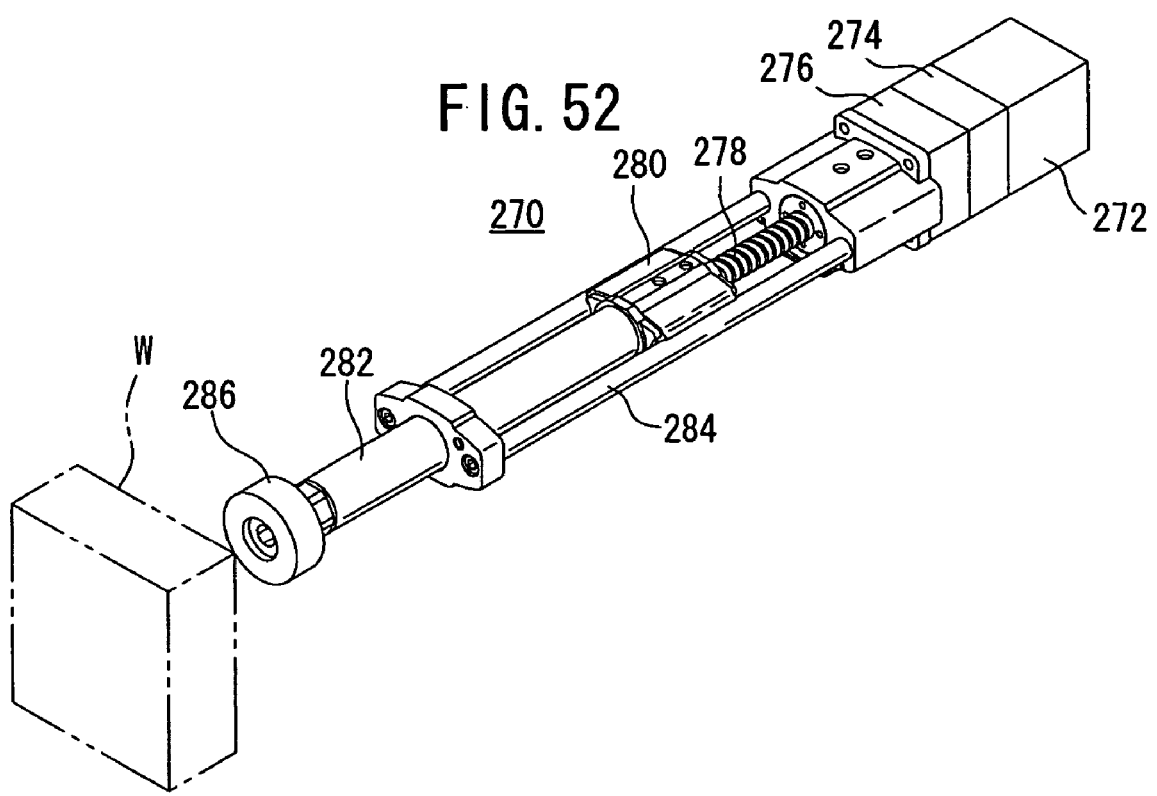
FIG. 52 is a perspective view illustrating a state in which the displacement member of the actuator is displaced toward a workpiece.

Accordingly, the third automatic speed reducing ratio-switching apparatus 210B may be incorporated into the pressing apparatus 270 shown in FIGS. 51 to 53. Starting from the state shown in FIG. 52, when the pressing section 286 is displaced by a predetermined distance toward the workpiece W to make abutment against the workpiece W, and the load, which exceeds the preset torque, is applied from the pressing apparatus 270 via the output shaft 228 to the carrier 222, then the planet gears 218a, 218b, 218c make rotation in the counterclockwise direction which is opposite to the direction of the sun gear 216 without making revolution in accordance with the rotation of the sun gear 216, and the internal gear 220A, which is meshed with the planet gears 218, is rotated in the counterclockwise direction (see FIG. 43). As a result, the thrust force acts on the internal gear 220A, and the internal gear 220A makes parallel displacement in the Z1 direction.

The internal gear 220A makes the parallel displacement in the Z1 direction, the internal gear lock receiving sections 231 are meshed with the lock sections 233, and the internal gear 220A is in the locked state. When the internal gear 220A is in the locked state, the planet gears 218 make revolution in the clockwise direction together with the carrier 222 while making rotation in the counterclockwise direction in accordance with the rotation of the sun gear 216 (see FIG. 45). The increased torque is transmitted via the output shaft 228 to the pressing section 286 of the pressing apparatus 270. Accordingly, the workpiece W is pressed by the pressing section 286 (see FIG. 53).

Subsequently, the polarity of the current supplied to the electric motor 272 is reversed after pressing the workpiece W by the pressing section 286. Accordingly, the sun gear 216 is rotated in the counterclockwise direction by the input shaft 226. The planet gears 218 make revolution in the counterclockwise direction together with the carrier 222 while making rotation in the clockwise direction in accordance with the rotation of the sun gear 216 (see FIG. 46).

As a result, the thrust force acts on the internal gear 220A. The internal gear 220A makes parallel displacement in the direction opposite to the Z1 direction while making rotation in the clockwise direction. The internal gear lock receiving sections 231 of the internal gear 220A are separated from the lock sections 233 of the housing 212b, and the internal gear 220A is released from the locked state.

According to the third automatic speed reducing ratio-switching apparatus 210B, the internal gear lock receiving sections 230, 231 and the lock sections 232, 233 can be quickly released from the locked state by providing the internal gear lock release mechanism 240 for the internal gear 220A.

Figure 57:
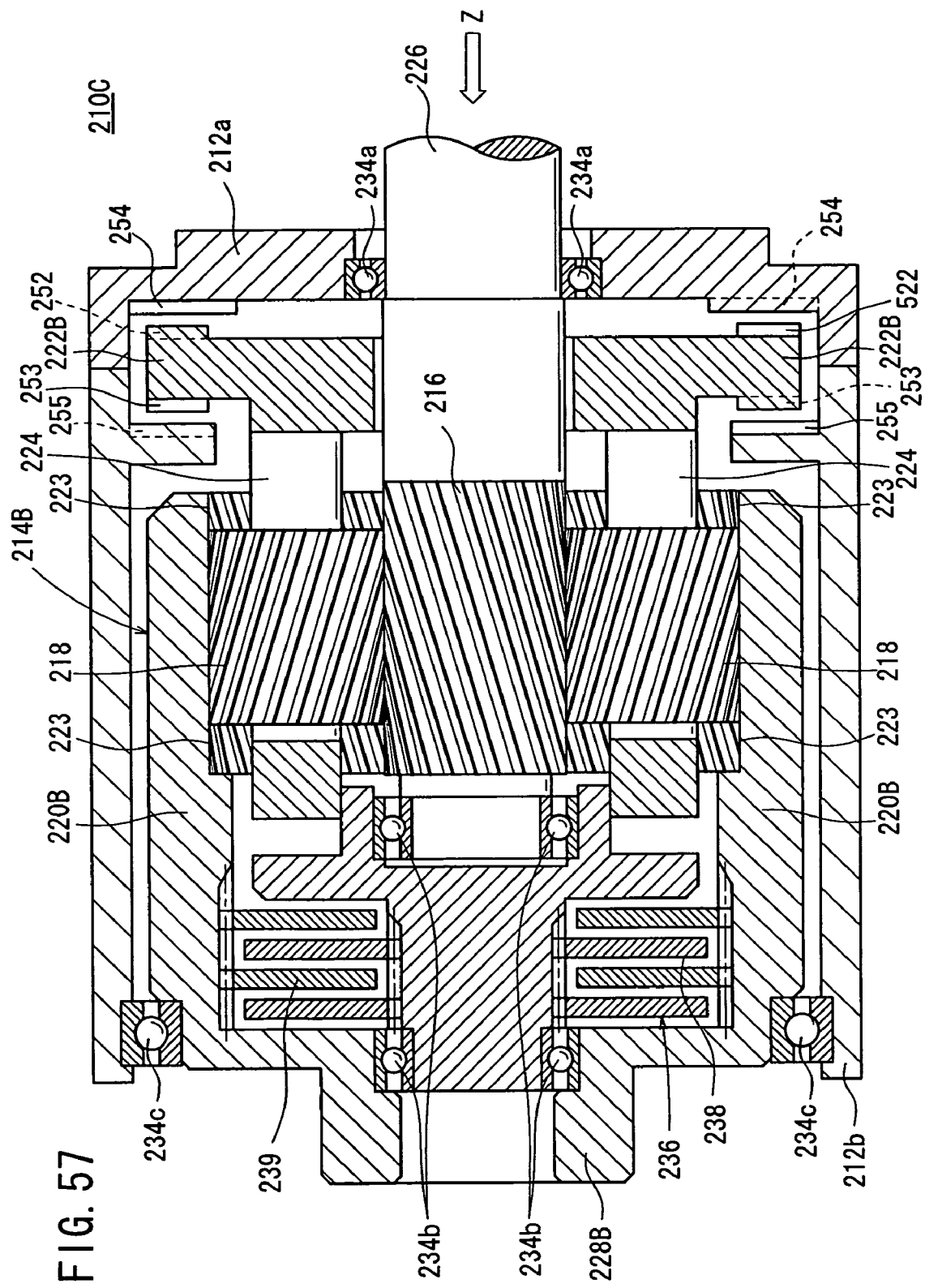
FIG. 57 is a longitudinal sectional view illustrating a fourth automatic speed reducing ratio-switching apparatus.

Next, FIG. 57 shows a fourth automatic speed reducing ratio-switching apparatus 210C. As shown in FIG. 57, the fourth automatic speed reducing ratio-switching apparatus 210C comprises housings 212a, 212b and a planetary gear mechanism 214B. The planetary gear mechanism 214B is accommodated in the housings 212a, 212b.

Lock sections 254 having projecting shapes, which are engageable with carrier lock receiving sections 252 as described later on when a carrier 222B makes parallel displacement in the direction toward the input shaft 226, are formed for the housing 212a therein. Lock sections 255 having projecting shapes, which are engageable with carrier lock receiving sections 253 as described later on when the carrier 222 makes parallel displacement in the direction toward the output shaft 228B, are formed for the housing 212b therein. The lock sections 254, 255 have projecting shapes to depict curves in the circumferential direction. A bearing section 234c is provided in order to rotatably support an internal gear 220B.

The planetary gear mechanism 214B comprises the sun gear 216 which is formed integrally with the input shaft 226, the planet gears 218a, 218b, 218c which are meshed with the sun gear 216 while being separated from each other by angles of about 120 degrees in the circumferential direction of the sun gear 216 to make revolution and rotation, the internal gear 220B, and the carrier 222B. The carrier 222B has a cylindrical inner section 223B which has a large diameter, and the input shaft 226 which protrudes in the same direction as that of the inner section 223B. The sun gear 216 having a small diameter is inserted into the inner section 223B, and the planet gears 218a, 218b, 218c face the windows 221 provided for the carrier 222B. The large diameter internal gear 220B, which is integrally provided with the output shaft 228B, is provided on the outer circumferential side of the planet gears 218a, 218b, 218c. The planet gears 218a, 218b, 218c are also meshed with the inner teeth engraved on the inner circumference of the internal gear 220B.

A plurality of carrier lock receiving sections 252, 253, each of which protrudes from the end of the cylindrical carrier 222B, are formed. The carrier lock receiving sections 252, 253 have projecting shapes to depict curves in the circumferential direction corresponding to the lock sections 254, 255. The carrier lock receiving sections 252, 253 and the lock sections 254, 255 function as the carrier lock means.

Next, the operation of the fourth automatic speed reducing ratio-switching apparatus 210C will be explained. The electric motor 272 is driven, and the rotational force of the electric motor 272 at the low load rotates the sun gear 216. As a result, the planet gears 218, the internal gear 220B, and the carrier 222B integrally make revolution in the clockwise direction around the sun gear 216 (see FIG. 42). As a result, the number of rotations, which corresponds to the number of rotations of the input shaft 226, is transmitted to the output shaft 228B to make rotation at a high speed. The feed screw shaft 278 is rotated via the fixed speed reducing ratio speed reducing unit 276 by the output shaft 228B. The feed nut of the movable member 280, which has the screw groove, is moved in the axial direction of the feed screw shaft 278 while being guided by the guide 284. Accordingly, the pressing section 286 is displaced from the initial position shown in FIG. 51 at a high speed in the direction to make approach to the workpiece W (see FIG. 52).

Figure 43:
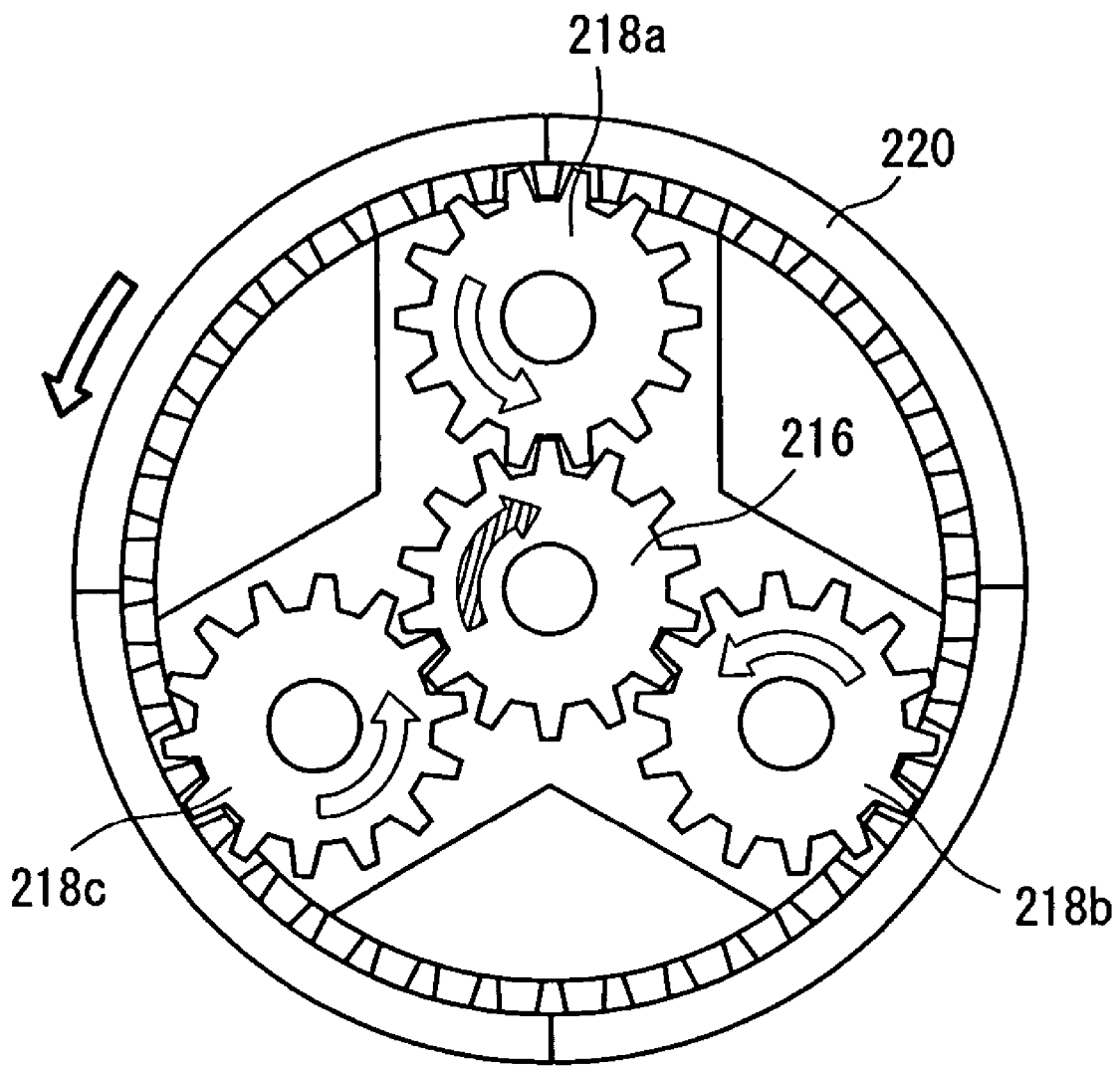
FIG. 43 is a plan view illustrating the directions of rotation of the sun gear, the planet gears, and the internal gear when a load, which exceeds a preset torque, is applied to a carrier.

As shown in FIG. 53, when the pressing section 286 abuts against the workpiece W, and the load, which exceeds the preset torque, is applied from the pressing apparatus 270 via the output shaft 228B to the internal gear 220B, then the planet gears 218a, 218b, 218c make rotation in the counterclockwise direction which is opposite to the direction of the sun gear 216 while the planet gears 218a, 218b, 218c do not make revolution as the sun gear 216 is rotated, and the internal gear 220B, which is meshed with the planet gears 218a, 218b, 218c, is rotated in the counterclockwise direction (see FIG. 43). As a result, the thrust force acts on the carrier 222B, and the carrier 222B makes parallel displacement in the Z direction.

The carrier 222B makes the parallel displacement in the Z direction, the carrier lock receiving sections 253 are meshed with the lock sections 255, and the locked state is given. When the carrier 222B is in the locked state, the planet gears 218a, 218b, 218c make revolution together with the carrier 222B while making rotation in the counterclockwise direction in accordance with the rotation of the sun gear 216 (see FIG. 45). The increased torque is transmitted via the output shaft 228B to the pressing section 286 of the pressing apparatus 270, and thus the workpiece W is pressed by the pressing section 286 (see FIG. 53).

Subsequently, when the polarity of the current supplied to the electric motor 272 is reversed after pressing the workpiece W by the pressing section 286, the sun gear 216 is rotated in the counterclockwise direction via the input shaft 226. As the sun gear 216 is rotated, the planet gears 218a, 218b, 218c make revolution in the counterclockwise direction together with the carrier 222B while making rotation in the clockwise direction (see FIG. 46). As a result, the thrust force acts on the carrier 222B. The carrier 222B makes parallel displacement in the direction opposite to the Z direction while making rotation in the clockwise direction. The carrier lock receiving sections 253 of the carrier 222B are separated from the lock sections 255, and the carrier 222B is released from the locked state.

When the carrier 222B is released from the locked state, the planet gears 218a, 218b, 218c, the internal gear 220B, and the carrier 222B again make revolution integrally in the counterclockwise direction around the sun gear 216 in conformity with the rotation of the sun gear 216 in the counterclockwise direction (see FIG. 47). As a result, the rotation speed, which corresponds to that of the input shaft 226, is directly transmitted to the output shaft 228B to cause the high speed rotation. The pressing section 286 is moved at a high speed while being guided by the guide 284 in the direction to make separation from the workpiece W to successfully make restoration to the initial position shown in FIG. 51.

According to the fourth automatic speed reducing ratio-switching apparatus 210C, when the load, which exceeds the preset torque, is applied from the actuator via the output shaft 228B to the internal gear 220B, the planet gears 218a, 218b, 218c and the carrier 222B, which have been rotated in the same direction of rotation as that of the sun gear 216, are rotated in the direction different from that of the sun gear 216. Accordingly, the carrier lock receiving sections 252, 253 are meshed with the lock sections 254, 255, and the rotation of the carrier 222B is stopped to effect the lock.

When the carrier 222B is in the locked state, the speed reducing ratio, which is transmitted via the internal gear 220B, is automatically switched. The displacement member, which constitutes the actuator, is displaced at a high torque and a low speed in the vicinity of the terminal end position of the outgoing route. On the other hand, when the displacement member is displaced from the outgoing route to the returning route, then the polarity of the current of the rotary driving source is reversed, and the sun gear 216 is reversed to release the carrier 222B from the locked state. Therefore, the speed reducing ratio, which is transmitted from the output shaft 228B to the displacement member of the actuator, is automatically switched. The displacement member, which constitutes the actuator, can be displaced along the returning route at a low torque and a high speed.

Figure 58:
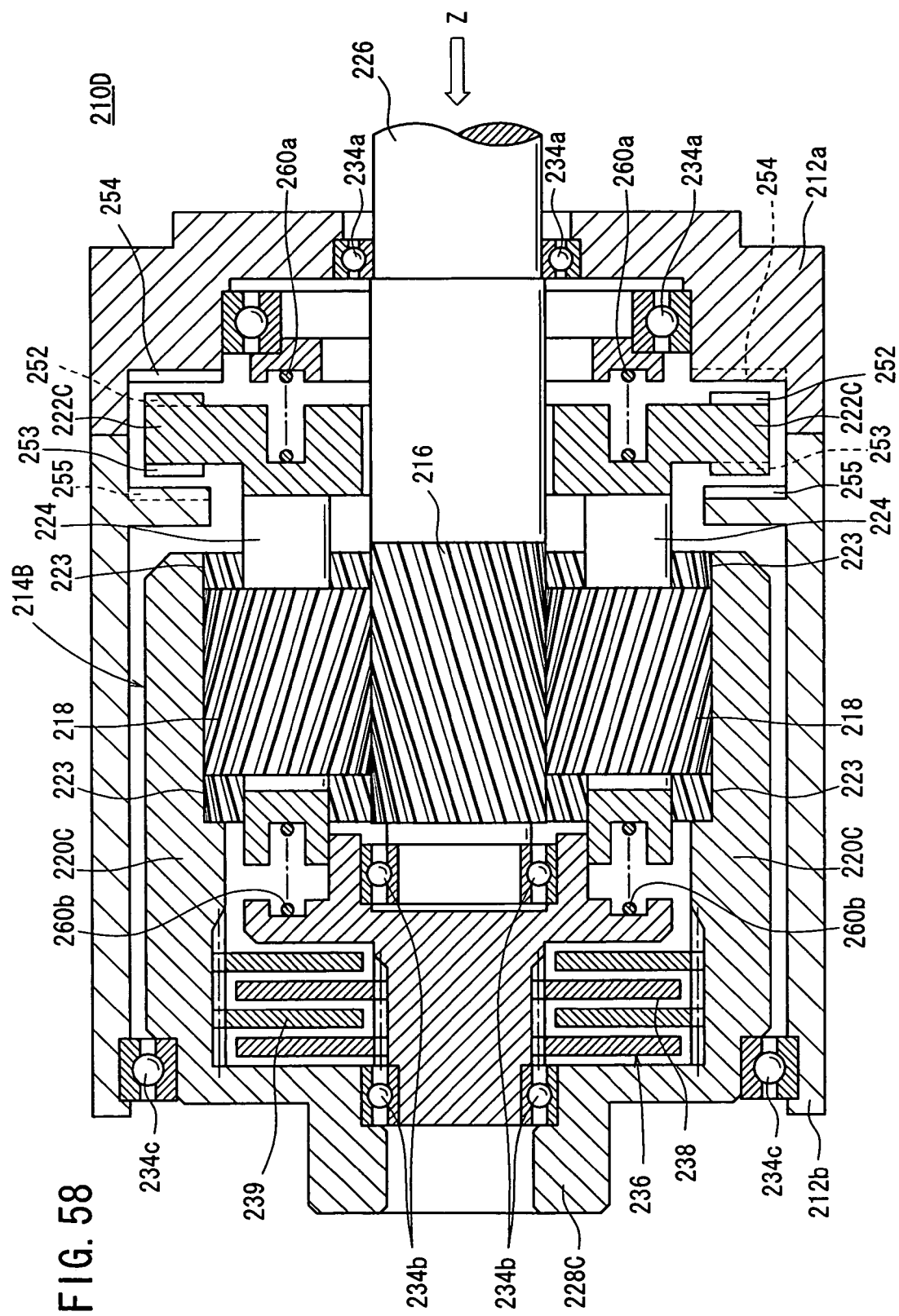
FIG. 58 is a longitudinal sectional view illustrating a fifth automatic speed reducing ratio-switching apparatus.

Next, FIG. 58 shows a fifth automatic speed reducing ratio-switching apparatus 210D. As shown in FIG. 58, in the fifth automatic speed reducing ratio-switching apparatus 210D, annular grooves are provided at circumferential edge portions of a carrier 222C, and annular springs 260a, 260b are provided in the grooves as compared with the fourth automatic speed reducing ratio-switching apparatus 210C.

Accordingly, when the fifth automatic speed reducing ratio-switching apparatus 210D is incorporated into the pressing apparatus 270, the pressing section 286 is displaced by a predetermined distance toward the workpiece W in the state shown in FIG. 52 to make abutment against the workpiece W. When the load, which exceeds the preset torque, is applied from the pressing apparatus 270 via the output shaft 228C to the internal gear 220C, then the sun gear 216 is rotated, and thus the planet gears 218 make rotation in the counterclockwise direction which is opposite to the direction of the sun gear 216 without making revolution. The internal gear 220C, which is meshed with the planet gears 218a, 218b, 218c, is rotated in the counterclockwise direction (see FIG. 43). As a result, the thrust force acts on the carrier 222C, and the carrier 222C makes parallel displacement in the Z direction.

The carrier 222C makes the parallel displacement in the Z direction, the carrier lock receiving sections 253 are meshed with the lock sections 255, and the carrier 222C is in the locked state. When the carrier 222C is in the locked state, the planet gears 218a, 218b, 218c make revolution together with the carrier 222C while making rotation in the counterclockwise direction in accordance with the rotation of the sun gear 216 (see FIG. 45). The increased torque is transmitted via the output shaft 228C to the pressing section 286 of the pressing apparatus 270, and thus the workpiece W is pressed by the pressing section 286 (see FIG. 53).

Subsequently, when the polarity of the current supplied to the electric motor 272 is reversed after pressing the workpiece W by the pressing section 286, the sun gear 216 is rotated in the counterclockwise direction via the input shaft 226. As the sun gear 216 is rotated, the planet gears 218a, 218b, 218c make revolution in the counterclockwise direction together with the carrier 222C while making rotation in the clockwise direction (see FIG. 46).

As a result, the thrust force acts on the carrier 222C. The carrier 222C makes parallel displacement in the direction opposite to the Z direction while making rotation in the clockwise direction. The carrier lock receiving sections 253 of the carrier 222C are separated from the lock sections 255, and the carrier 222C is released from the locked state. The carrier lock receiving sections 253 of the carrier 222C are separated from the lock sections 255 of the housing 212b, and the carrier 222C is released from the locked state. During this process, the carrier 222C is subjected to the parallel displacement in the direction opposite to the Z1 direction by the elastic force of the spring 260b. The carrier 222C is quickly released from the locked state.

According to the fifth automatic speed reducing ratio-switching apparatus 210D, the springs 260a, 260b are provided for the carrier 222C, and thus it is possible to quickly release the locked state of the carrier lock receiving sections 252, 253 and the lock sections 254, 255.

Figure 59:
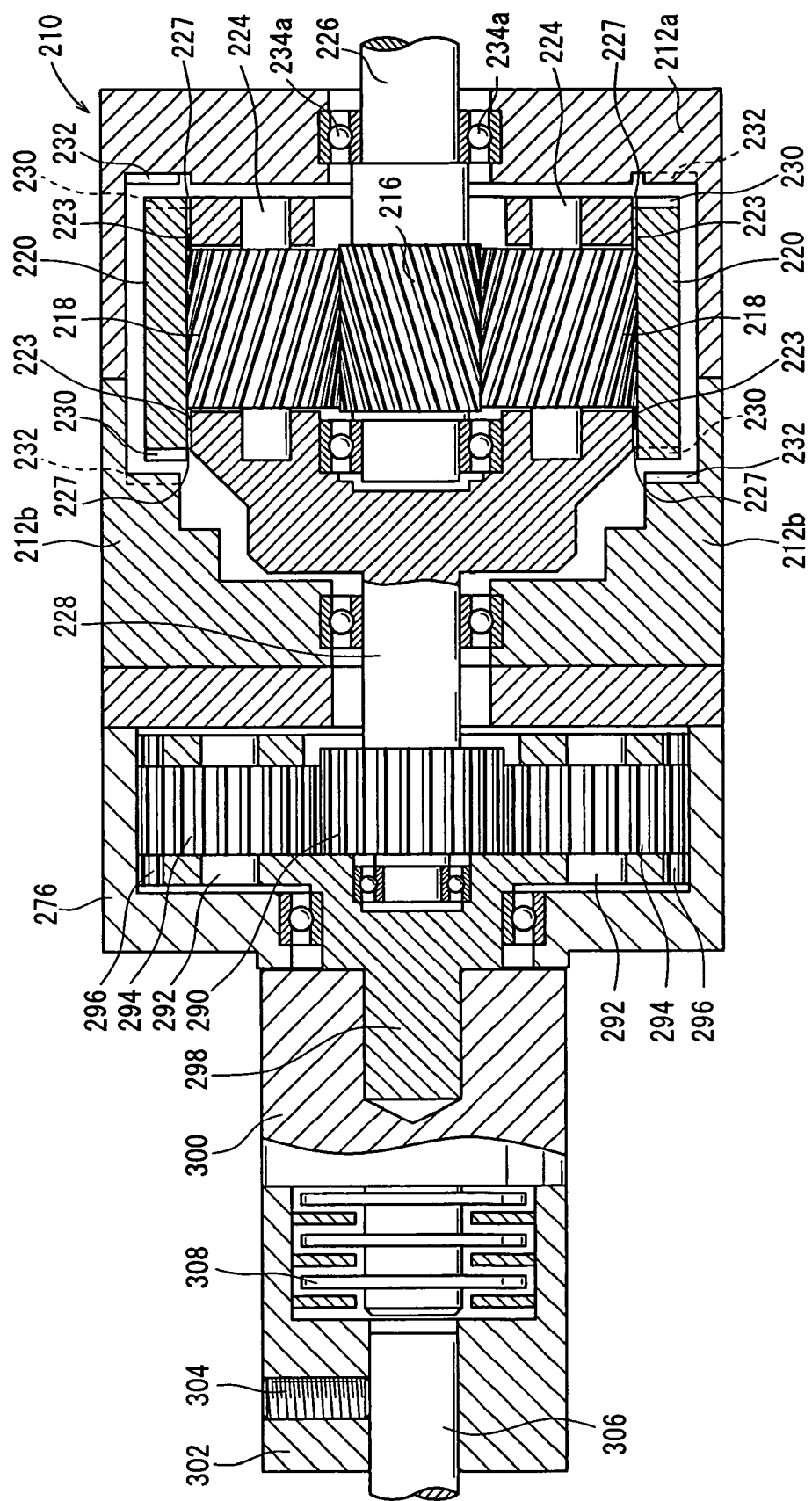
FIG. 59 is a longitudinal sectional view illustrating a state in which an automatic speed reducing unit and a fixed speed reducing ratio speed reducing unit are coupled to one another.

A wide range speed reducing ratio can be obtained by using the fifth automatic speed reducing ratio-switching apparatus 210D and a fixed speed reducing ratio speed reducing unit 276 in combination. For example, when the speed reducing ratio of the automatic speed reducing unit 274 is 1:4, and the speed reducing ratio of the fixed speed reducing ratio speed reducing unit 276 is 1:4, then the speed reducing ratio can be changed within a range from 1:4 to 1:16 with respect to the input from planet gears 294. FIG. 59 shows a longitudinal sectional view illustrating a state in which the automatic speed reducing unit 274 and the fixed speed reducing ratio speed reducing unit 276 are connected to one another.

Accordingly, in the pressing apparatus 270, the rotary motion of the electric motor 272 is transmitted from the output shaft 228 to the fixed speed reducing ratio speed reducing unit 276 by the first automatic speed reducing ratio-switching apparatus 210. As shown in FIG. 59, in the fixed speed reducing ratio speed reducing unit 276, a sun gear 290, which is engaged with the output shaft 228, is rotated to rotate the planet gears 294 which are rotatably supported by pins 292 and which are meshed with the sun gear 290. Also, an internal gear 296 which is meshed with the planet gears 294 is rotated. The rotation speed, which is transmitted to the internal gear 296, is transmitted to an output shaft 302 via an output shaft 298 and a coupling 300. The coupling 300 and the output shaft 302 are connected to one another by a viscous coupling section 308. The output shaft 302 is screwed to a shaft 306 by screws 304.

In this arrangement, the actuator, which is connected to the output shaft 228, is not limited to the pressing apparatus 270. It is a matter of course that the actuator includes mechanisms to reciprocate linearly or rotationally, such as an unillustrated fluid pressure cylinder in which a piston rod (displacement member) reciprocates, a linear actuator in which a slider (displacement member) reciprocates, a rotary actuator, and a clamp apparatus in which a clamp arm (displacement member) reciprocates. Also, the actuator is not limited to these, either.

Figure 60:
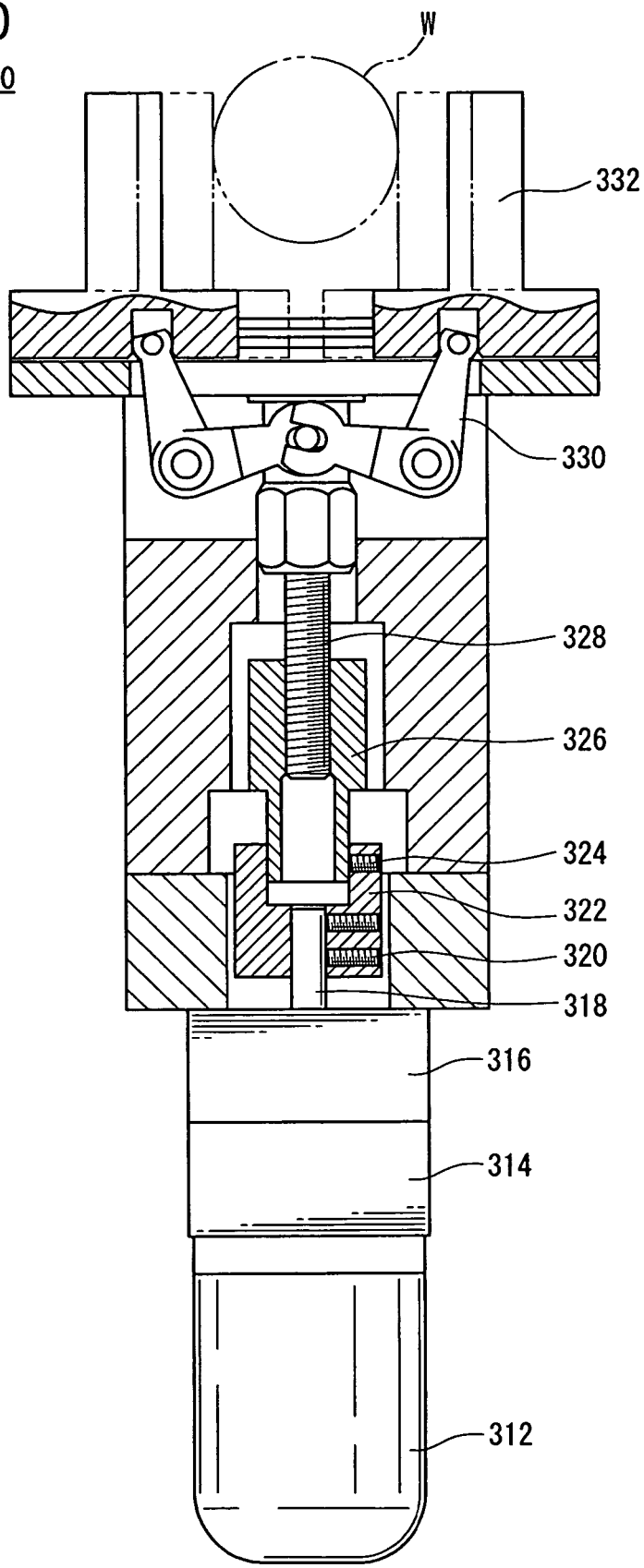
FIG. 60 is a partial longitudinal sectional view illustrating a chuck apparatus to which the first automatic speed reducing ratio-switching apparatus is applied.

FIG. 60 shows a chuck apparatus 310 as a kind of the clamp apparatus. The rotary driving force, which is supplied from an electric motor 312, is transmitted to an output shaft 318 via an automatic speed reducing unit 314 incorporated with the first automatic speed reducing ratio-switching apparatus 210 and a fixed speed reducing ratio speed reducing unit 316. When the output shaft 318 is rotated, a coupling 322 screwed to a screw 320 and a feed nut 326 screwed to a screw 324 are rotated. When the feed nut 326 is rotated, a feed screw shaft 328, which is screwed to the feed nut 326, is moved in the axial direction. When the feed screw shaft 328 is moved, a gripping section 332 can grip a workpiece W by arms 330.

Figure 61:
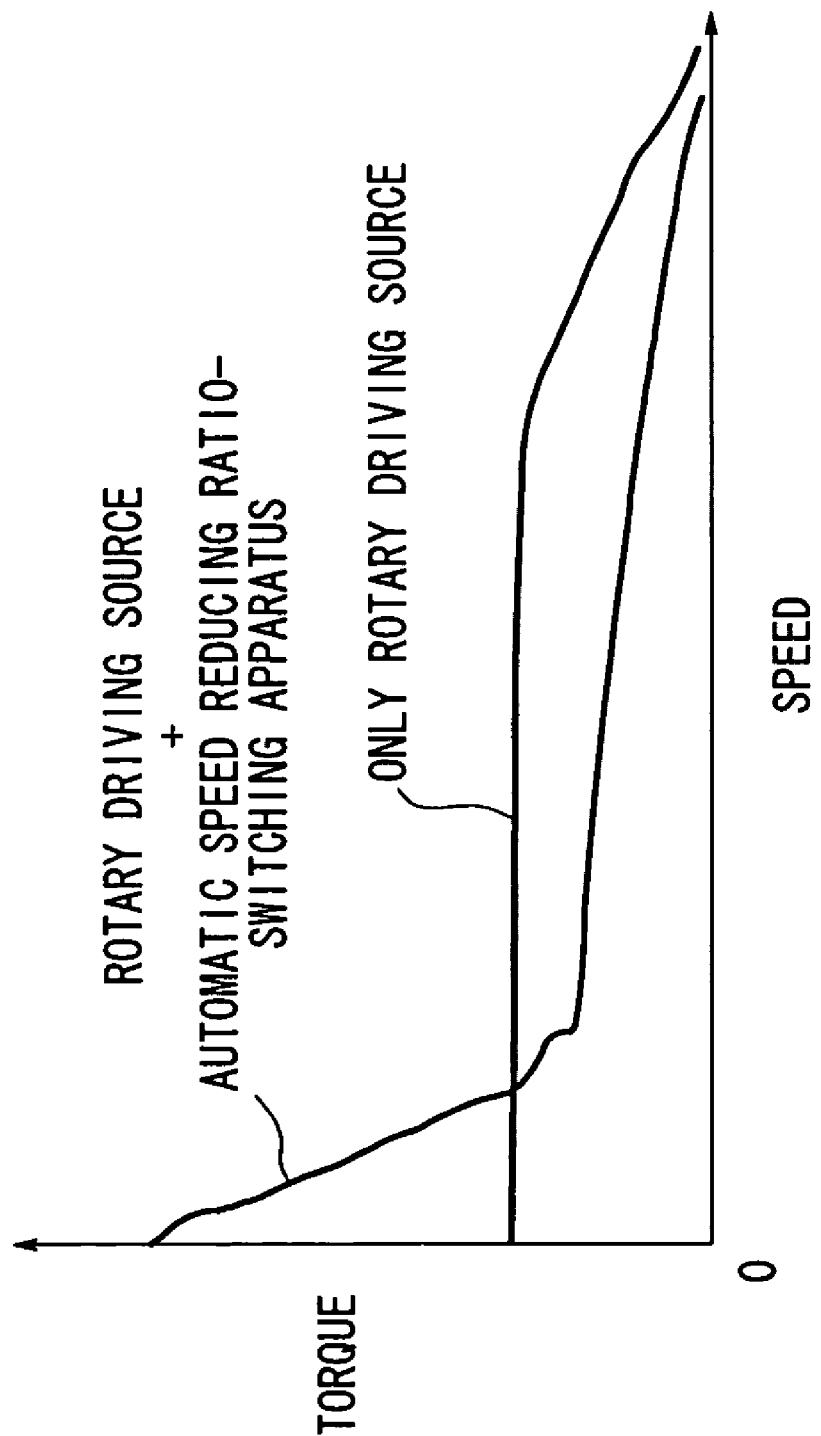
FIG. 61 is a characteristic chart of the torque with respect to the speed obtained when only the rotary driving source is provided and when the speed reducing unit is added to the rotary driving source.

FIG. 61 shows characteristics of the torque with respect to the speed obtained when only the rotary driving source 14 is provided and when the rotary driving source 14 is equipped with the automatic speed reducing ratio-switching apparatus (for example, first automatic speed reducing ratio-switching apparatus 210). As clearly understood from FIG. 61, the torque can be controlled easily with respect to the speed when the rotary driving source 14 is equipped with the automatic speed reducing ratio-switching apparatus as compared with the case in which only the rotary driving source 14 is provided.

Figure 62:
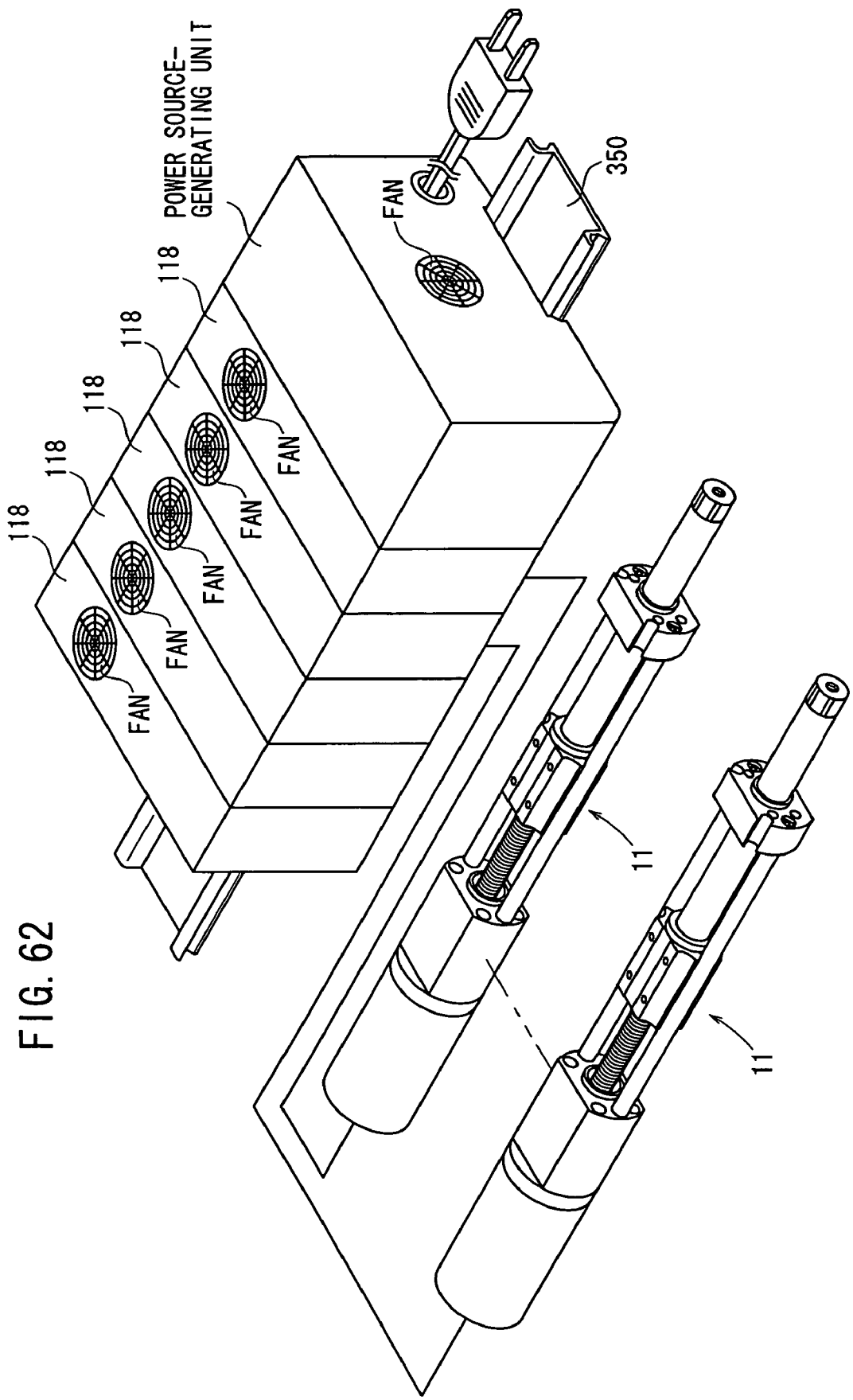
FIG. 62 is a perspective view illustrating a state in which a plurality of direction control drivers are assembled into a manifold.
Figure 63:
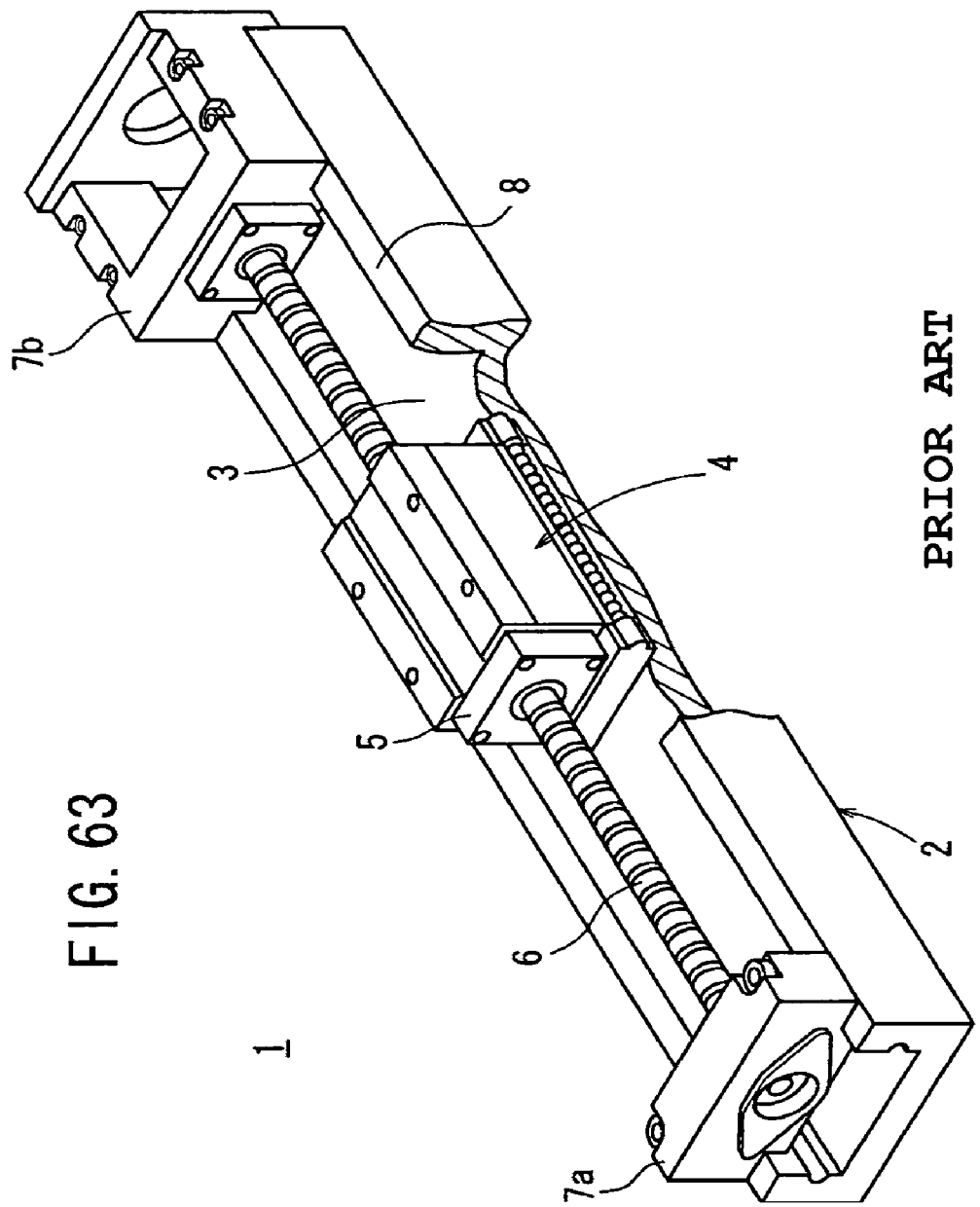
FIG. 63 is, with partial cutout, a perspective view illustrating an electric actuator concerning the conventional technique.
Figure 64:
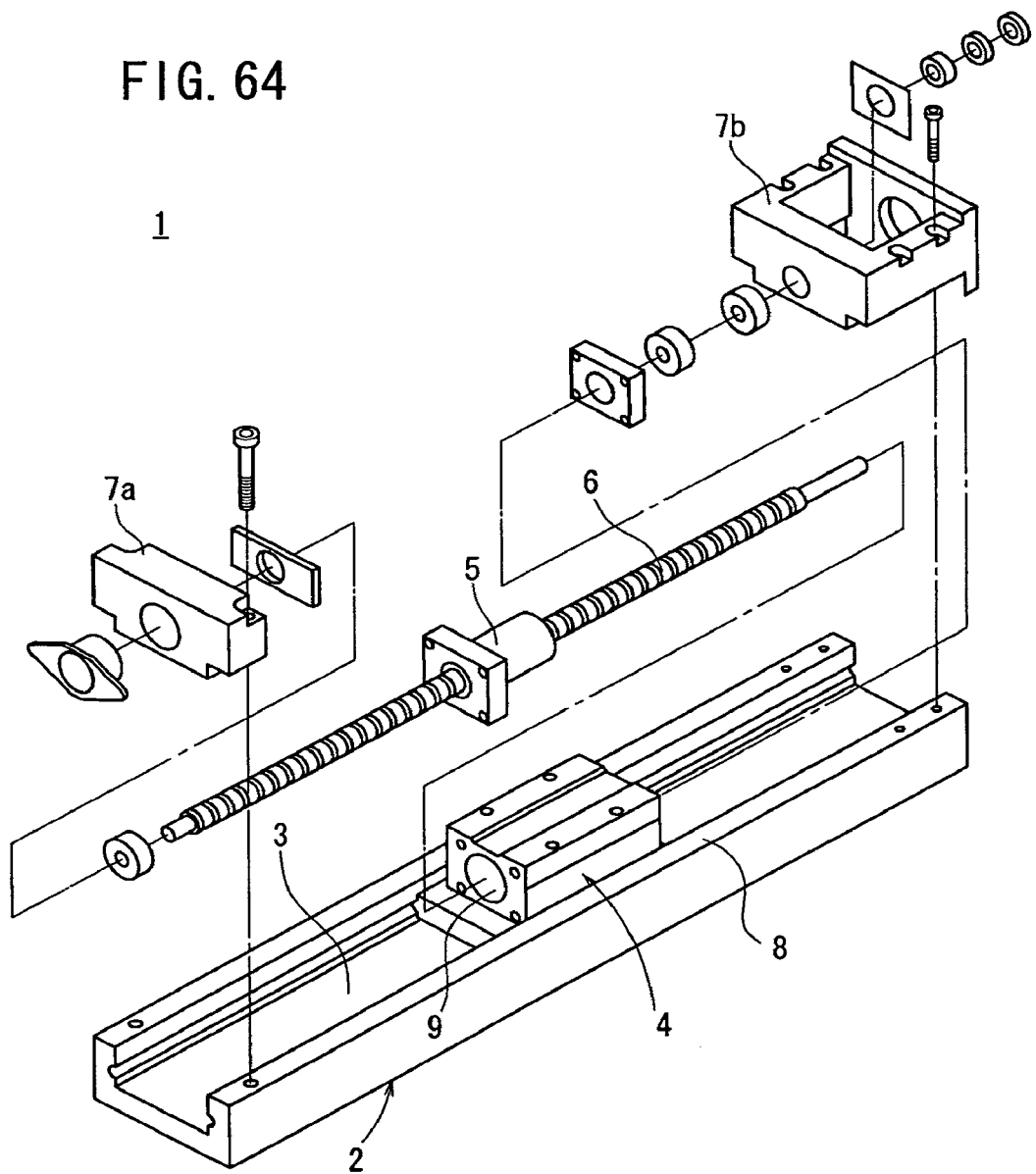
FIG. 64 is an exploded perspective view illustrating the electric actuator shown in FIG. 63.

FIG. 62 shows a perspective view illustrating a driver manifold for the direction control.

A plurality of drivers 118 for the direction control, which are connected to a plurality of electric actuators 11 (electric cylinders), can be continuously stacked to provide the manifold. In this arrangement, the plurality of drivers 118 for the direction control are bus-coupled by unillustrated connectors for transmitting electric signals (for example, serial signals). It is preferable that a unit is additionally provided to generate, for example, AC 100 to 200 V or DC 24 V for electric supply. The plurality of drivers 118 for the direction control are detachably stacked continuously by means of a long rail member 350. It is preferable that fans are provided for the drivers 118 and the power source-generating unit respectively.

Although certain preferred embodiments of the present invention have been shown and described in detail, it should be understood that various changes and modifications may be made therein without departing from the scope of the appended claims.

What is claimed is:

1. An actuator control system comprising an electric actuator which has a displacement member displaced by a rotary driving force of a rotary driving source transmitted via a driving force-transmitting shaft, and a control unit which is provided for said electric actuator, wherein said electric actuator is provided with a buffering mechanism which absorbs impact applied to said displacement member; and said control unit comprises current-detecting means which detects a current supplied to said rotary driving source, comparing means which compares a detection signal from said current-detecting means with a preset reference current, and current-limiting means which, without cutting off supply of said current to said rotary driving source, limits said current so that said current supplied to said rotary driving source does not exceed said reference current when a load is applied to said rotary driving source while maintaining an energized state and a drive shaft of said rotary driving source is stopped to give a restricted state.

2. The actuator control system according to claim 1, wherein said displacement member includes a piston and a sliding nut which is retained in a hole of said piston in an axial direction of said piston and which is displaceable integrally with said piston under a screw-rotating action of said driving force-transmitting shaft; and said buffering mechanism includes piston dampers which are elastic members provided at both ends in an axial direction of said sliding nut respectively and which absorb impact applied to said piston, wherein said sliding nut and said piston are provided relatively displaceably in an axial direction of said driving force-transmitting shaft when said impact is absorbed by said piston dampers.

3. The actuator control system according to claim 1, wherein said buffering mechanism includes a first end damper which is formed of an elastic member and which is provided at an end of a housing facing said piston, and a second end damper which is provided for a rod cover separated from said housing by a predetermined distance.

4. The actuator control system according to claim 1, further comprising a speed reducing ratio-switching apparatus which automatically switches a speed reducing ratio in response to said load applied to said rotary driving source.

5. The actuator control system according to claim 1, further comprising a flexible coupling mechanism provided between said driving force-transmitting shaft of said electric actuator and said rotary driving source, wherein said flexible coupling mechanism has an eccentric deviation-permitting function to permit displacement in a parallel direction between an axis of said driving force-transmitting shaft and an axis of said drive shaft of said rotary driving source, and an angular deviation-permitting function to permit intersection between said axis of said driving force-transmitting shaft and said axis of said drive shaft of said rotary driving source.

6. The actuator control system according to claim 5, wherein said flexible coupling mechanism comprises a pair of hubs which are formed of a metal material and have an identical shape and which are assembled with phases being deviated by a predetermined angle in a circumferential direction, and an elastic member which has a cross-shaped vertical cross section, which is formed of an elastic material, and which is provided rotatably between said pair of hubs.

7. The actuator control system according to claim 1, wherein a ring member, which avoids any deflection, is installed to one end of said driving force-transmitting shaft of said electric actuator.

8. The actuator control system according to claim 2, wherein a lubricating oil-retaining member is provided at a sliding portion between said sliding nut and said driving force-transmitting shaft.

* * * * *